US006838540B2

(12) United States Patent
Mitani et al.

(10) Patent No.: US 6,838,540 B2
(45) Date of Patent: Jan. 4, 2005

(54) OLEFIN POLYMER AND PRODUCTION PROCESSES THEREOF

(75) Inventors: Makoto Mitani, Sodegaura (JP); Yasunori Yoshida, Sodegaura (JP); Junichi Mohri, Sodegaura (JP); Kazutaka Tsuru, Sodegaura (JP); Seiichi Ishii, Sodegaura (JP); Shinichi Kojoh, Sodegaura (JP); Tomoaki Matsugi, Sodegaura (JP); Junji Saito, Sodegaura (JP); Naoto Matsukawa, Sodegaura (JP); Shigekazu Matsui, Sodegaura (JP); Takashi Nakano, Sodegaura (JP); Hidetsugu Tanaka, Sodegaura (JP); Norio Kashiwa, Sodegaura (JP); Terunori Fujita, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/937,520

(22) PCT Filed: Jan. 26, 2001

(86) PCT No.: PCT/JP01/00522

§ 371 (c)(1), (2), (4) Date: Sep. 26, 2001

(87) PCT Pub. No.: WO01/55231

PCT Pub. Date: Aug. 2, 2001

(65) Prior Publication Data

US 2003/0114623 A1 Jun. 19, 2003

(30) Foreign Application Priority Data

Jan. 26, 2000 (JP) .................................... 2000-021813
Oct. 5, 2000 (JP) .................................... 2000-305915
Dec. 11, 2000 (JP) .................................... 2000-376032

(51) Int. Cl.[7] .................................... C08F 210/04
(52) U.S. Cl. ................ 526/348; 526/348.2; 526/348.6; 526/351; 526/161; 526/172
(58) Field of Search ................................ 526/351, 352, 526/352.2, 170

(56) References Cited

U.S. PATENT DOCUMENTS 4,695,557 A 9/1987 Suzuki et al. ............... 525/268
4,717,755 A * 1/1988 Doi et al. ................ 525/333.7
5,187,250 A * 2/1993 Asanuma et al. ........ 526/348.6
5,236,774 A * 8/1993 Tanaka et al. .............. 428/215
5,266,641 A * 11/1993 Asanuma et al. ........... 525/240
5,272,003 A * 12/1993 Peacock ..................... 428/357
5,321,106 A 6/1994 LaPointe .................... 526/126
5,340,848 A * 8/1994 Asanuma et al. ........... 522/157
5,340,917 A * 8/1994 Eckman et al. ............. 528/481
5,391,629 A 2/1995 Turner et al. ............... 502/103
5,391,672 A * 2/1995 Albizzati et al. ........ 526/348.4
5,449,724 A * 9/1995 Moffat et al. ............... 526/204
5,475,067 A * 12/1995 Schiffino ..................... 526/79
5,476,914 A * 12/1995 Ewen et al. ................ 526/351
5,534,595 A * 7/1996 Asanuma et al. ........ 525/326.5
H1583 H * 8/1996 Hwo et al. ............... 526/348.6
5,658,999 A * 8/1997 Inoue et al. ................ 526/351
5,723,560 A * 3/1998 Canich ....................... 526/351
5,902,684 A * 5/1999 Bullard et al. ............. 428/515
5,942,461 A * 8/1999 Brown et al. ............... 502/154
6,184,326 B1 * 2/2001 Razavi et al. .............. 526/351
2001/0041779 A1 * 11/2001 Shin et al. .................. 526/160

FOREIGN PATENT DOCUMENTS

CH 1199052 11/1998
DE 40 30 399 A1 * 4/1992 ........... C08F/10/06
EP 188915 7/1986
EP 206753 12/1986
EP 513216 11/1992
EP 603852 6/1994
EP 738290 10/1996
EP 874005 10/1998
EP 0 874 005 A1 * 10/1998 ........... C08F/10/00
EP 1 008 595 A2 * 6/2000 ............. C07F/7/00
EP 1 008 595 A3 6/2000
JP 61151202 7/1986

(List continued on next page.)

OTHER PUBLICATIONS

Aldrich Chemicals Catalgue 1998–1999, p. 1361–1362.*
"Block Polymerizations" *Copolymerizations* Boor, Ziegler-Natta Catalyst and Polymerization: Academic Press Co., 1979, pp. 587–601.

(List continued on next page.)

*Primary Examiner*—David W. Wu
*Assistant Examiner*—Rip A. Lee
(74) *Attorney, Agent, or Firm*—Birch, Stewart, Kolasch & Birch, LLP

(57) ABSTRACT

The present invention provides an olefin polymer having a narrow molecular weight distribution and a specific molecular weight, an olefin polymer having a functional group introduced at the terminal, a tapered polymer containing a segment wherein monomer composition continuously changes in the polymer chain, an olefin polymer having different segments which are bonded to each other, and a process for preparing these polymers. The olefin polymers of the invention are polymers of olefins of 2 to 20 carbon atoms and have a number-average molecular weight of not less than 500 and Mw/Mn of not more than 1.5. In the process for preparing an olefin polymer, an olefin of 2 to 20 carbon atoms is polymerized in the presence of an olefin polymerization catalyst comprising a transition metal compound represented by, for example, the following formula (I):

$$L_mMX_n \qquad (I)$$

wherein M is a transition metal atom of Group 3 to Group 11 of the periodic table, m is 1 to 5, n is a number satisfying a valence of M, L is a ligand coordinated to the central metal M and is a ligand containing a heteroatom having no direct bond to the central metal, and X is a halogen atom, a hydrocarbon group or the like.

17 Claims, 1 Drawing Sheet

FOREIGN PATENT DOCUMENTS

| | | | | | |
|---|---|---|---|---|---|
| JP | 61291603 | | | 12/1986 | |
| JP | A 1-501950 | | | 7/1989 | |
| JP | A 1-502036 | | | 7/1989 | |
| JP | A 2-78687 | | | 3/1990 | |
| JP | A 03-179005 | | | 8/1991 | |
| JP | A 03-179006 | | | 8/1991 | |
| JP | A 03-207703 | | | 9/1991 | |
| JP | A 03-207704 | | | 9/1991 | |
| JP | 3-285922 | A | * | 12/1991 | .............. C08J/5/00 |
| JP | 3-285923 | A | * | 12/1991 | .............. C08J/5/00 |
| JP | 5503546 | | | 6/1993 | |
| JP | 5-217802 | A | * | 8/1993 | ............ H01G/7/02 |
| JP | 718039 | | | 7/1995 | |
| JP | 9500150 | | | 1/1997 | |
| JP | 9-302038 | A | * | 9/1997 | ......... C08F/210/08 |
| JP | 50139890 | | | 11/1997 | |
| JP | 11315109 | | | 11/1999 | |
| JP | 2000119316 | | | 4/2000 | |
| JP | 2000-119316 | A1 | * | 4/2000 | ........... C08F/4/642 |
| KR | 98081756 | | | 8/1998 | |
| WO | 9112285 | | | 8/1991 | |
| WO | WO 91/12285 | | * | 8/1991 | ......... C08F/297/08 |
| WO | WO 94/21700 | | | 9/1994 | |
| WO | 9421700 | | | 9/1994 | |
| WO | WO 98/30612 | | | 7/1998 | |

OTHER PUBLICATIONS

Yoshiharu Doi et al., Macromolecules, 1986, vol. 19, pp. 2896–2900.

Hideaki Hagihara et al., Macromolecules, 1998, vol. 31, pp. 3184–3188.

F.A. Bovey et al., Macromolecules, 1974, vol. 7, p. 752.

James C. Randall, Macromolecules, 1978, vol. 11, No. 1, p. 33.

A. Zambelli et al., Macromolecules, 1979, vol. 12, No. 1, p. 154.

Y. Doi, Macromolecules, 1979, vol. 12, No. 2, p. 248.

Paolo Ammendola et al., Macromolecules, 1985, vol. 18, No. 7, p. 1407.

Christopher M. Killian et al.; Journal of American Chemical Society, 1996, vol. 118, No. 46, p. 11664.

John D. Scollard et al.; Journal of American Chemical Society, 1996, vol. 118, No. 41, p. 10008.

Kazushi Mashima et al.; Journal of American Chemical Society, 1993, vol. 115, No. 23, p. 10990.

Yoshifumi Fukui et al.; Macromolecule Rapid Communication, 1999, vol. 20, p. 637.

L.P. Lindeman et al.; Analytical Chemistry, Aug. 1971, vol. 43, No. 10, p. 1245.

Norio Kashiwa et al.; Polymer Bulletin, 1984, 12, pp. 105–109.

Toshiyuki Tsutsui et al.; Polymer, 1989, vol. 30, p. 428.

Toshiyuki Tsutsui et al.; Polymer, 1989, vol. 30, p. 1350.

Wolfgang Beck et al.; Chemical Review, 1988, vol. 88, p. 1405.

Steven H Strauss; Chemical Review, 1993, vol. 93, p. 927.

* cited by examiner

Fig. 1

Transition metal component

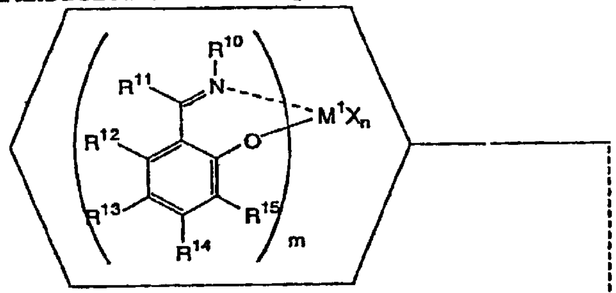

$M^1$: transition metal atom of Group 4 or Group 5 of the periodic table
m: 1 or 2
$R^{10}$: hydrocarbon group having one or more heteroatoms
$R^{11}$-$R^{14}$: hydrogen atom, hydrocarbon group or the like
$R^{15}$: hydrocarbon group, hydrocarbon-substituted silyl group
n: number satisfying a valence of M
X: halogen atom, hydrocarbon group or the like Organometallic component (Organometallic compound)

(Organoaluminum oxy-compound)

(Ionizing ionic compound)

Olefin living polymer

Third component (Carrier)

(Organic compound component)

OLEFIN POLYMER AND PRODUCTION PROCESSES THEREOF

This application is the national phase under 35 U.S.C. § 317 of PCT International Application No. PCT/JP01/00522 which has an International filing date of Jan. 26, 2001, which designated the United State of America.

TECHNICAL FIELD

The present invention relates to olefin polymers and processes for preparing the same. More particularly, the invention relates to an olefin polymer having an extremely narrow molecular weight distribution, an olefin polymer containing two kinds of specific polymer blocks, the above-mentioned olefin polymers having a functional group at the terminal, a block copolymer, and processes for preparing these olefin polymers.

BACKGROUND ART

Polymers having narrow molecular weight distribution and specific molecular weight, polymers having a functional group introduced at the terminal and block polymers having different segments bonded to each other exhibit various useful properties, so that they are very important from not only the academic viewpoint but also the industrial viewpoint.

It is generally well known that in the production of polymers having such specific structures, living polymerization wherein neither termination reaction nor chain transfer reaction substantially takes place during the polymerization is effective.

However, if the polymerization is carried out under usual conditions using a Ziegler catalyst or a metallocene catalyst that is generally used as an olefin polymerization catalyst to produce polymers having the above specific structures, chain transfer reactions of the glowing polymer chains frequently take place, and it is very difficult to produce olefin polymers by living polymerization For example, it has been made clear by analyses of molecular weight distribution, composition distribution, etc. that when a block copolymer is intended to be synthesized using a known catalyst system, a mixture of homopolymer and random copolymer is produced (Boor, "Ziegler-Natta Catalyst and Polymerization", Academic Press Co., 1979).

Under such circumstances, some researches of living polymerization of olefins have been reported.

For example, living polymerization of propylene using a specific vanadium catalyst has been reported by Doi, et al. (Macromolecules, vol 19, p. 2896, 1986). In this process, however, an extremely low polymerization temperature such as a temperature of −78° C. to −40° C. is necessary, and the polymerization activity is several tens g-polymer/mmol-M.h and is not commercially satisfactory. Further, the polymer type which can be synthesized is restricted to polypropylene or a propylene/ethylene copolymer having a low ethylene content (not more than 50% by mol), and it is difficult to produce commercially useful polyethylene and ethylene copolymers by living polymerization. Moreover, there is a problem of low stereoregularity (racemic diad: not more than 0.8) of the resulting polypropylene, and hence this process is industrially insufficient.

Brookhart, et al. and McConvill, et al. have reported living polymerization of higher α-olefins such as propylene and 1-hexene with specific nickel complex or titanium complex (Journal of American Chemical Society, vol. 118, p. 11664, 1996, Journal of American Chemical Society, vol. 118, p. 10008, 1996). Also in this process, low-temperature polymerization at a temperature of not higher than 0° C. is necessary in many cases, and the resulting polymer has an atactic structure having no stereoregularity. Moreover, it is difficult to produce polyethylene or an ethylene polymer by living polymerization using the nickel complex or the titanium complex.

Soga, Shiono, et al. have studied living polymerization of propylene using a metallocene catalyst, but in this process, an extremely low temperature such as a temperature of −78° C. to −60° C. is necessary, and the levels of polymerization activity and molecular weight of the resulting polymer are low (Macromolecule, vol. 31, p. 3184, 1998, Macromolecule Rapid Communication, vol. 20, p. 637, 1999).

As a synthesis of polyethylene by living polymerization, that is generally said be difficult, Nakamura, et al. have reported a process of using a niobium or tantalum complex, and Yasuda, et al. have reported a process of using a samarium complex. In these processes, however, there are defects that the activity is low, the molecular weight of the resulting polyethylene is limited to about 100,000, and copolymerization of comonomers other than ethylene is infeasible (Journal of American Chemical Society, vol. 115, p. 10990, 1993).

As a synthesis of a block polymer having different segments bonded to each other, a process of using a specific metallocene catalyst has been reported (International Patent Publication WO91/12285, WO94/21700). In this process, however, the activity is low, and low-temperature polymerization (−10° C. to 0° C.) is essential. Moreover, it is described that the blocking efficiency is decreased Lo less than 10% by increasing the polymerization temperature to 10° C. On this account, production of a block copolymer at an industrially usually used polymerization temperature (50° C. to 75° C.) is impossible. Also in case of low-temperature polymerization, the molecular weight distribution (Mw/Mn), that is an indication of living polymerizability, of the block copolymer is not less than 1.35 and is not narrow, so that this polymerization is not living polymerization sufficiently controlled. Therefore, most of the products contain large amounts of non-block polymers as by-products, and fractionation to remove the unnecessary polymers is essential as a post treatment. Thus, there are many industrial restrictions.

Accordingly, development of a process wherein living polymerization of olefins can be carried out at an industrially available which temperature with high polymerization activity is of industrially very great value.

Under such circumstances, the present applicant has found, as novel olefin polymerization catalysts, transition metal compounds having a salicylaldimine ligand, and has also found that when a transition metal compound having a specific structure selected from the transition metal compounds having a salicylaldimine ligand is used, living polymerization proceeds at an industrially available high temperature with activity extremely higher than that of hitherto known living polymerization, and production of polyolefins having high molecular weight and narrow molecular weight distribution and polyolefins or block copolymers having functional groups quantitatively introduced at the terminals is feasible. Based on the finding, the present invention has been accomplished. The present applicant has furthermore found a process for efficiently producing such polymers, and accomplished the present invention.

It is an object of the invention to provide olefin polymers exhibiting various useful properties, such as a polymer having a narrow molecular weight distribution and a specific molecular weight, a polymer having a functional group introduced at the terminal and a block polymer having different segments bonded to each other. It is another object of the invention to provide processes for preparing these olefin polymers. It is a further object of the invention to provide processes for efficiently preparing such polymers.

DISCLOSURE OF THE INVENTION

The olefin polymer according to the invention is a polymer of at least one olefin selected from olefins of 2 to 20 carbon atoms and has a number-average molecular weight of not less than 500 and Mw/Mn (Mw: weight-average molecular weight, Mn: number-average molecular weight) of not more than 1.5. Such a polymer is sometimes referred to as a "monodisperse polyolefin" hereinafter.

The monodisperse polyolefin of the invention is, for example, polyethylene, high-density polyethylene (referred to as "HDPE" hereinafter), linear low-density polyethylene (referred to as "LLDPE" hereinafter), polybutene, a copolymer of ethylene and at least one olefin selected from olefins of 4 to 20 carbon atoms, dienes and cycloolefins, or a copolymer of propylene and at least one olefin selected from olefins of 4 to 20 carbon atoms, dienes and cycloolefins.

The monodisperse polyolefin of she invention is, for example, a polymer of ethylene, which has a number-average molecular weight of not less than 110,000 and Mw/Mn of not more than 1.5, or a polymer of a least one olefin selected from olefins of 3 to 20 carbon atoms, which has a number-average molecular weight of not less than 500, Mn/Mn of not more than 1.5 and a melting point of not lower than 70° C.

The monodisperse polyolefin of the invention is, for example, an olefin polymer which is a polymer of propylene or butene and has a racemic diad (r), as measured by $^{13}$C-NMR, of not less than 0.85, or a polymer which is an ethylene/propylene copolymer and has an ethylene content of not less than 60% by mol.

The olefin polymer according to the invention is, for example, an olefin polymer which is an olefin copolymer of at least two olefins selected from olefins of 2 to 20 carbon atoms, has a number-average molecular weight of not less than 500 and is a tapered polymer containing a segment wherein composition of two or more monomers continuously changes in the polymer chain. A tapered polymer having Mw/Mn of not more than 2.5 and a tapered polymer having an ethylene content of not less than 30% by mol are also available.

The olefin polymer according to the invention is, for example, an olefin copolymer which comprises a monomer unit $M_1$ derived from an olefin of 2 to 20 carbon atoms and at least one monomer unit $M_2$ that is different from the monomer unit $M_1$, and has the following properties:

$[M_1 \cdot M_2]$, $[M_1 \cdot M_1]$, $[M_2 \cdot M_2]$, $[M_1]$ and $[M_2]$, as measured by $^{13}$C-NMR, satisfy the following relations:

$$1>[M_1 \cdot M_2]/(2\times[M_1]\times[M_2])$$

$$1>[M_1 \cdot M_2]^2/(4\times[M_1 \cdot M_1]\times[M_2 \cdot M_2])$$

wherein $[M_1]$ is a molar fraction of the monomer unit $M_1$, $[M_2]$ is a molar fraction of the monomer unit $M_2$, $[M_1 \cdot M_2]$ is a molar fraction of a unit in which the monomer unit $M_1$ and the monomer unit $M_2$ are adjacent to each other, $[M_1 \cdot M_1]$ is a molar fraction of a unit from which the monomer unit $M_1$ and the monomer unit $M_1$ are adjacent to each other, and $[M_2 \cdot M_2]$ is a molar fraction of a unit in which the monomer unit $M_2$ and the monomer unit $M_2$ are adjacent to each other.

The olefin polymer according to the invention is, for example, a polymer satisfying the above relations and having Mw/Mn of not more than 2.5, an olefin copolymer wherein an isolated monomer unit $M_1$ and a sequence of two or more continuous monomer units $M_1$ are both detected in the polymer chain by means of $^{13}$C-NMR, or an olefin copolymer wherein a sequence of two continuous monomer units $M_1$ and a sequence of three or more continuous monomer units $M_1$ are both detected in the polymer chain by means of $^{13}$C-NMR.

In the above polymers, the monomer unit $M_1$ is preferably an ethylene unit. An olefin copolymer wherein a sequence of two or more continuous methylene groups is detected by means of $^{13}$C-NMR and a sequence of two continuous methylene groups and a sequence of three or more continuous methylene groups are both detected is also available.

Another embodiment of the olefin polymer of the invention is an olefin block copolymer comprising:

(i) a polymer block obtained from at least one olefin selected from olefins of 2 to 20 carbon atoms, and (ii) a polymer block that is obtained from at least one olefin selected from olefins of 2 to 20 carbon atoms and is different from the polymer block (i).

The olefin block copolymer is, for example, a polymer comprising two or more polymer blocks, adjacent polymer blocks of which are different from each other, and having a number-average molecular weight of not less than 500 and Mw/Mn of not more than 2.5.

The olefin block copolymer is, for example, an olefin polymer which is a diblock copolymer comprising two polymer blocks and has Mw/Mn of less than 1.35, an olefin polymer which is a triblock copolymer comprising three polymer blocks and has Mw/Mn of less than 1.80, or a polymer which is a multiblock copolymer comprising four or more polymer blocks and has Mw/Mn of less than 2.00.

The above olefin block copolymer is, for example, a polymer wherein each polymer block is selected from polyethylene, HDPE, LLDPE, a copolymer of ethylene and at least one olefin selected from olefins of 3 to 20 carbon atoms, dienes and cycloolefins, atactic polypropylene (referred to as "ata-polypropylene" hereinafter), isotactic polypropylene (referred to as "iso-polypropylene" hereinafter), syndiotactic polypropylene (referred to as "syn-polypropylene" hereinafter), a copolymer of propylene and at least one olefin selected from olefins of 3 to 20 carbon atoms, dienes and cycloolefins, and the aforesaid tapered polymer Also available is a diblock copolymer or a triblock copolymer wherein each polymer block is selected from polyethylene, HDPE, LLDPE, an ethylene/propylene copolymer, an ethylene/butene copolymer, an ethylene/hexene copolymer, an ethylene/octene copolymer, ata-polypropylene, syn-polypropylene, a propylene/butene copolymer and a propylene/hexene copolymer.

The polymer block (i) and the polymer block (ii) are each selected from, for example, the following polymer blocks (a), (b) and (c):

(a) a polymer block obtained from ethylene, (b) a polymer block obtained from one α-olefin selected from α-olefins of 3 to 20 carbon atoms, and (c) a polymer block obtained from two or more α-olefins selected from α-olefins of 2 to 20 carbon atoms.

The olefin block copolymer is, for example, a polymer containing at least one of the polymer block (a) which has a number-average molecular weight of 110,000 to 10,000,000 and Mw/Mn of not mere than 1.5.

A further embodiment of the olefin polymer according to the invention is an olefin polymer having a functional group at the terminal of the main chain of the aforesaid monodisperse polyolefin, tapered polymer, olefin copolymer or olefin block copolymer.

The molded product according to the invention comprises the monodisperse polyolefin, the tapered polymer, the olefin copolymer or the olefin block copolymer.

The process for preparing an olefin polymer according to the invention comprises polymerizing an olefin of 2 to 20 carbon atoms in the presence of an olefin polymerization catalyst comprising a transition metal compound which is represented by the following formula (I) and has properties that, in a β-agostic structure of a cationic complex wherein one of X in the formula (I) is replaced with a n-propyl group, said structure being measured by a density functional method, the distance between the heteroatom, which has no direct bond to the central metal M and is nearest to the central metal M, and hydrogen at the β-position is not more than 3.0 Å and the electrostatic energy is not more than 10 kJ/mol, to prepare the monodisperse polyolefin, the olefin copolymer, the tapered polymer or the olefin block copolymer;

$$L_mMX_n \quad (I)$$

wherein

M is a transition metal atom selected from Group 3 to Group 11 of the periodic table, m is an integer of 1 to 5, n is a number satisfying a valence of M, L is a ligand coordinated to the central metal M and is a ligand having a heteroatom which has no direct bond to the central metal M, and X is an oxygen atom, a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or greater, plural groups indicated by X may be the same or different, and plural groups indicated by X may be bonded to form a ring.

The transition metal compound is, for example, a transition metal compound represented by the following formula (II-a) or (II-b);

(II-a)

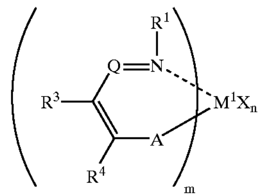

wherein $M^1$ is a transition metal atom selected from Group 3 to Group 11 of the periodic table, m is an integer of 1 to 5, Q is a nitrogen atom or a carbon atom having a substituent $R^2$, A is an oxygen atom, a sulfur atom, a selenium atom or a nitrogen atom having a substituent $R^5$, $R^1$ is a hydrocarbon group having one or more heteroatoms or a hydrocarbon group having one or more heteroatom-containing groups, $R^2$ to $R^5$ may be the same or different and are each a hydrocarbon group, a halogen atom, a hydrogen atom, a hydrocarbon-substituted silyl group, an oxygen-containing group, a nitrogen-containing group, a sulfur-containing group, a boron-containing group, an aluminum-containing group, a phosphorus-containing group, a halogen-containing group, a heterocyclic compound residue, a silicon-containing group, a germanium-containing group or a tin-containing group, two or more of $R^2$ to $R^5$ may be bonded to form a ring, and when m is 2 or greater, $R^1$s, $R^2$s, $R^3$s, $R^4$s and $R^5$s may be the same or different, and one group of $R^2$ to $R^5$ contained in one ligand and one group of $R^2$ to $R^5$ contained in other ligands may be bonded, n is a number satisfying a valence of $M_1$, and X has the same meaning as that of X in the aforesaid formula (I);

(II-b)

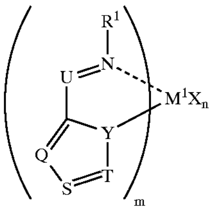

wherein $M_1$ is a transition metal atom selected from Group 3 to Group 11 of the periodic table, m is an integer of 1 to 5, Y is a nitrogen atom or a phosphorus atom, U is a carbon atom having a substituent $R^6$, a nitrogen atom or a phosphorus atom, Q is a carbon atom having a substituent $R^7$, a nitrogen atom or a phosphorus atom, S is a carbon atom having a substituent $R^8$, a nitrogen atom or a phosphorus atom, T is a carbon atom having a substituent $R^9$, a nitrogen atom or a phosphorus atom, $R^1$ and $R^6$ to $R^9$ are each the same atom or group as described with respect to $R^1$ and $R^2$ to $R^5$ in the formula (II-a), and when m is 2 or greater, $R^1$s, $R^6$s, $R^7$s, $R^8$s and $R^9$s nay be the same or different, and one group of $R^6$ to $R^9$ contained in one ligand and one group of $R^6$ to $R^9$ contained in other ligands may be bonded, n is a number satisfying a valence of $M_1$, and X has the same meaning as that of X in the aforesaid formula (I).

Similarly to the transition metal compound represented by the formula (I), the transition metal compound represented by the formula (II-a) or (II-b) preferably has properties that the distance between the heteroatom, which has no direct bond to the central metal M and is nearest to the central metal M, and hydrogen at the β-position is not more than 3.0 Å and the electrostatic energy is not more than 10 kJ/mol.

The transition metal compound represented by the formula (II-a) or (II-b) is preferably a compound wherein $R^1$ is an aromatic hydrocarbon group, an aliphatic hydrocarbon group or an alicyclic hydrocarbon group, selected from a phenyl group having, at at least one position of the 2-position and the 6-position, when the position of the carbon atom bonded to nitrogen is the 1-position, one or more substituents selected from a heteroatom and a heteroatom-containing group, or has, at at least one position of the 3-position, the 4-position and the 5-position, at least one substituent selected from a heteroatom other than a fluorine atom, a fluorine-containing group having one carbon atom and not more than two fluorine atoms, a fluorine-containing group having two or more carbon atoms, and a group containing a heteroatom other than a fluorine atom, and when $R^1$ is an aromatic hydrocarbon group other than a phenyl group, an aliphatic hydrocarbon group or an alicyclic hydrocarbon group, this group has at least one substituent selected from a heteroatom and a heteroatom-containing group.

In the transition metal compound represented by the formula (II-a) or (II-b), when the position of the carbon atom bonded to nitrogen is the 1-position, $R^1$ is preferably a halogen-containing hydrocarbon group of 1 to 30 carbon atoms selected from a phenyl group having, at at least one position of the 2-position and the 6-position, one or more substituents selected from a halogen atom and a halogen-containing group, a phenyl group having, at at least one position of the 3-position, the 4-position and the 5-position, at least one substituent selected from a fluorine-containing group having one carbon atom and not more than two fluorine atoms, a fluorine-containing group having two or more carbon atoms, a chlorine atom, a bromine atom, an iodine atom, a chlorine-containing group, a bromine-containing group and an iodine-containing group, an aromatic hydrocarbon croup other than a phenyl group having at least one substituent selected from a halogen atom and a halogen-containing group, an aliphatic hydrocarbon group having at least one substituent selected from a halogen atom and a halogen-containing group, and an alicyclic hydrocarbon group having at least one substituent selected from a halogen atom and a halogen-containing group.

The transition metal compound is, for example, a transition metal compound represented by the following formula (III):

(III)

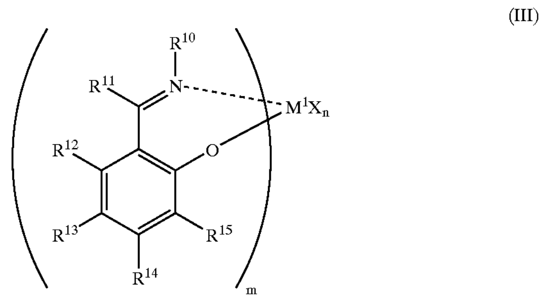

wherein $M^1$ is a transition metal atom selected from Group 4 to Group 5 of the periodic table, m is 1 or 2, $R^{10}$ is an aromatic hydrocarbon group, an aliphatic hydrocarbon group or an alicyclic hydrocarbon group, when $R^1$ is a phenyl group and the position of the carbon atom bonded to nitrogen is the 1-position, this phenyl group has, at at least ore position of the 2-position and the 6-position, one or more substituents selected from a heteroatom and a heteroatom-containing group, or has, at at least one position of the 3-position, the 4-position and the 5-position, at least one substituent selected from a heteroatom other than a fluorine atom, a fluorine-containing group having one carbon atom and not more than two fluorine atoms, a fluorine-containing group having two or more carbon atoms, and a group containing a heteroatom other than a fluorine atom, and when $R^{10}$ is an aromatic hydrocarbon group other than a phenyl group, an aliphatic hydrocarbon group or an alicyclic group, this group has at least one substituent selected from a heteroatom and a heteroatom-containing group, $R^{11}$ to $R^{14}$ may be the same or different and are each a hydrogen atom, a halogen atom, a halogen-containing group, a hydrocarbon group, a hydrocarbon-substituted silyl group, an oxygen-containing group, a nitrogen-containing group or a sulfur-containing group, $R^{15}$ is a halogen atom, a halogen-containing group, a hydrocarbon group or a hydrocarbon-substituted silyl group, n is a number satisfying a valence of M, and X has the same meaning as that of X in the aforesaid formula (I).

In the transition metal compound represented by the formula (III), when the position of the carbon atom bonded to nitrogen is the 1-position, $R^{10}$ is preferably a halogen-containing hydrocarbon group of 1 to 30 carbon atoms selected from a phenyl group having, at at least one position of the 2-position and the 6-position, one or more substituents selected from a halogen atom and a halogen-containing group, a phenyl group having, at at least one position of the 3-position, the 4-position and the 5-position, at least one substituent selected from a fluorine-containing group having one carbon atom and not more than two fluorine atoms, a fluorine-containing group having two or more carbon atoms, a chlorine atom, a bromine atom, an iodine atom, a chlorine-containing group, a bromine-containing group and an iodine-containing group, an aromatic hydrocarbon group other than a phenyl group having at least one substituent selected from a halogen atom and a halogen-containing group, an aliphatic hydrocarbon group having at least one substituent selected from a halogen atom and a halogen-containing group, and an alicyclic hydrocarbon group having at least one substituent selected from a halogen atom and a halogen-containing group.

By the above process, for example, the monodisperse polyolefin, the tapered polymer or the olefin block copolymer can be prepared.

Another embodiment of the process for preparing an olefin polymer according to the invention comprises polymerizing an olefin of 2 to 20 carbon atoms in the presence of an olefin polymerization catalyst comprising the above-mentioned transition metal compound to prepare a polymer and then bringing the polymer into contact with a functional group-containing compound to prepare an olefin polymer having a functional group at the terminal.

A further embodiment of the process for preparing an olefin polymer according to the invention comprises polymerizing at least two olefins which are selected from olefins of 2 to 20 carbon atoms and have different polymerization reactivities, in the presence of an olefin polymerization catalyst comprising the above-mentioned transition metal compound to prepare a tapered polymer containing a segment wherein composition of two or more monomers continuously changes.

A still further embodiment of the process for preparing an olefin polymer according to the invention comprises conducting the following step (1), the following step (2), and optionally, the following step (3) of an arbitrary number of times, to prepare an olefin block copolymer comprising plural polymer blocks;

(1) a step of polymerizing at least one olefin selected from olefins of 2 to 20 carbon atoms in the presence of an olefin polymerization catalyst comprising the above-mentioned transition metal compound to prepare a polymer block, (2) a step of polymerizing at least one olefin selected from olefins of 2 to 20 carbon atoms in the presence of the polymer block prepared in the step (1) to prepare a polymer block which is different from the polymer block prepared in the step (1), and (3) a step of polymerizing at least one olefin selected from olefins of 2 to 20 carbon atoms in the presence of the polymer block prepared in the step (1) and the polymer block prepared in the step (2) to prepare a polymer block which is different from the polymer blocks prepared in the previous step.

A still further embodiment of the process for preparing an olefin polymer according to the invention comprises preparing a tapered polymer or an olefin block copolymer by the above process and when bringing the resulting (co)polymer into contact with a functional group-containing compound to prepare a tapered polymer or an olefin block copolymer having a functional group at the terminal.

A still further embodiment of the process for preparing an olefin polymer according to the invention comprises polymerizing an olefin in the presence of a polymerization catalyst which promotes living polymerization of an olefin and further conducting olefin polymerization by the use of a catalyst obtained by cleaving a bond produced in the system between the catalyst and the resulting polymer chain by means of chain transfer reaction.

The chain transfer reaction can be promoted by the use of at least one compound selected from, for example, hydrogen, an organoaluminum compound, an organoboron compound, an organozinc compound, an organosilicon compound, an organocadmium compound and an organolead compound.

The olefin polymerization catalyst used in the above process is, for example, an olefin polymerization catalyst comprising the above-mentioned transition metal compound. The polymer produced in the above process is, for example, the monodisperse polyolefin, the olefin copolymer, the tapered polymer or the olefin block copolymer.

In the process for preparing an olefin polymer, it is preferable that the olefin polymer obtained before the chain transfer reaction and/or the olefin polymer obtained after the chain transfer reaction is the monodisperse polyolefin, the olefin copolymer, the tapered polymer or the olefin block copolymer, and it is more preferable that the olefin polymer obtained before the chain transfer reaction and the olefin polymer obtained after the chain transfer reaction are each the monodisperse polyolefin, the olefin copolymer, the tapered polymer or the olefin block copolymer. The olefin polymer obtained before the chain transfer reaction and the olefin polymer obtained after the chain transfer reaction may be the same as each other.

BRIEF DESCRIPTION OF THE DRAWING

FIG. 1 is an explanatory view showing steps for preparing an olefin polymerization catalyst which is occasionally used in the present invention.

BEST MODE FOR CARRYING OUT THE INVENTION

The olefin polymers according to the invention and the processes for preparing the polymers are described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

The olefin polymer (monodisperse polyolefin) in one embodiment of the invention is a polymer of at least one olefin selected from olefins of 2 to 20 carbon atoms (sometimes referred to as "olefins" hereinafter). This olefin polymer may be a polymer of one olefin selected from olefins of 2 to 20 carbon atoms or may be a random copolymer or a block copolymer of two or more olefins selected from olefins of 2 to 20 carbon atoms.

Examples of the olefins of 2 to 20 carbon atoms include:

straight-chain or branched α-olefins of 2 to 20 carbon atoms, such as ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; and cycloolefins of 3 to 20 carbon atoms, such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene.

Vinylcyclohexane, dienes and polyenes are also employable as the olefins of 2 to 20 carbon atoms.

As the dienes or the polyenes, cyclic or chain compounds having 4 to 20 carbon atoms and two or more double bonds can be mentioned. Examples of such compounds include butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene and 5,9-dimethyl-1,4,8-decatriene.

Aromatic compounds are also employable as the olefins, and examples thereof include mono or polyalkylstyrenes, such as styrene, o-methylstyrene, m-methylstyrene, p-methylstyrene, o,p-dimethylstyrene, o-ethylstyrene, m-ethylstyrene and p-ethylstyrene, 3-phenylpropylene, 4-phenylpropylene and α-methylstyrene.

The above olefins can be used singly or in combination of two or more kinds.

As the olefins, monomers having atoms other than carbon and hydrogen are also employable in the invention.

Examples of such monomers include:

α,β-unsaturated carboxylic acids, such as acrylic acid, methacrylic acid, fumaric acid, maleic anhydride, itaconic acid and iaconic anhydride, cycloolefin carboxylic acids or anhydrides thereof, such as bicyclo(2,2,1)-5-heptene-2,3-dicarboxylic acid, and metallic salts thereof, such as sodium salts, potassium salts, lithium salts, zinc salts, magnesium salts and calcium salts thereof;

α,β-unsaturated carboxylic esters, such as methyl acrylate, ethyl acrylate, n-propyl acrylate, isopropyl acrylate, n-butyl acrylate, isobutyl acrylate, tert-butyl acrylate, 2-ethylhexyl acrylate, methyl methacrylate, ethyl methacrylate, n-propyl methacrylate, isopropyl methacrylate, n-butyl methacrylate and isobutyl methacrylate;

vinyl esters, such as vinyl acetate, vinyl propionate, vinyl caproate, vinyl caprate, vinyl laurate, vinyl stearate and vinyl trifluoroacetate;

unsaturated glycidyls, such as glycidyl acrylate, glycidyl methacrylate and monoglycidyl itaconate;

halogenated olefins, such as vinyl fluoride, vinyl chloride, vinylidene chloride, vinyl bromide and vinyl iodide;

unsaturated cyano compounds, such as acrylonitrile and methacrylonitrile;

unsaturated amides, such as acrylamide, methacrylamide and N,N-dimethylacrylamide;

unsaturated ketones, such as vinyl methyl ketone and vinyl ethyl ketone;

unsaturated ethers, such as methyl vinyl ether and ethyl vinyl ether;

functional group-containing styrene derivatives, such as methoxystyrene, ethoxystyrene, vinyl benzoate, methylvinyl benzoate, vinylbenzyl acetate, hydroxystyrene, o-chlorostyrene, p-chlorostyrene and divinylbenzene; and vinyl group-containing heterocyclic compounds, such as N-vinylpyrrolidone, N-vinylcarbozole and vinylpyridine.

At least one olefin selected from the olefins employable in the invention is an olefin consisting of only carbon and hydrogen. There is no specific limitation on the quantity ratio of the olefin consisting of only carbon and hydrogen to the whole olefins, but for example, the ratio is not less than 5% by mol and not more than 100% by mol based on the whole olefins. By the expression "at least one olefin" is meant that at least one kind of an olefin consisting of only carbon and hydrogen is contained in the whole olefin polymer of the invention, and in case of, for example, an olefin polymer composed of plural polymer blocks, the olefin consisting of only carbon and hydrogen may be contained in any one of the polymer blocks.

The monodisperse polyolefin desirably has a number-average molecular weight of not less than 500, preferably 500 to 10,000,000, more preferably 1,000 to 5,000,000, and Mw/Mn of not more than 1.5, preferably not more than 1.3.

The weight-average molecular weight, number-average molecular weight and Mw/Mn (Mw: weight-average molecular weight, Mn: number-average molecular weight) are measured in an orthodichlorobenzene solvent at 140° C. by means of GPC (gel permeation chromatography). The polymer molecular weight obtained is converted to a molecular weight in terms of polystyrene by a universal method. When the resulting polymer is monodisperse polyethylene or a monodisperse ethylene/propylene copolymer, the molecular weight is calculated in terms of polyethylene, and when the resulting polymer is another polymer (tapered polymer, olefin block copolymer), the molecular weight is calculated in terms of polypropylene. The parameters used are as follows.

Polystyrene standard sample: K=0.000137, $\alpha$=0.686

Polyethylene: K=0.000326, $\alpha$=0.77

Polypropylene: K=0.0001, $\alpha$=0.8

The melting point of the resulting polymer is measured in a stream of nitrogen under the heating rate conditions of 10° C./min using a differential scanning calorimeter (DSC).

The $^{13}$C-NMR measurement and analysis can be carried out in accordance with a method hitherto known. Literatures on the $^{13}$C-NMR measurement and analysis are given below.

1) L. P. Lindeman, J. Q. Adams, Anal. Chem., 43, 1245 (1971)

2) F. A. Bovey, M. C. Sacchi, A. Zambelli, Macromolecules, 7, 752 (1974)

3) J. C. Randall, Macromolecules, 11, 33 (1978)

4) A. Zambelli, P. Locatelli, G. Bajo, Macromolecules, 12, 154 (1979)

5) Y. Doi, Macromolecules, 12, 248 (1979)

6) N. Kashiwa, A. Mizuno, S. Minami, Polym. Bull., 12, 105 (1984)

7) P. Ammendola, L. Oliva, G. Gianotti, A. Zambelli, Macromolecules, 18, 1407 (1985)

8) T. Tsutsui, A. Mizuno, N. Kashiwa, Polymer, 30, 428 (1989)

9) T. Tsutsui, N. Ishimaru, A. Mizuno, A. Toyota, N. Kashiwa, Polymer, 30, 1350 (1989)

Preferred examples of the monodisperse polyolefins according to the invention include polyethylene, HDPE, LLDPE, polypropylene, polybutene, a homopolymer of 1-pentene, 1-hexene, 1-octene, 1-decene or the like, a copolymer of ethylene and propylene, a copolymer of ethylene and an olefin of 4 to 20 carbon atoms, and a copolymer of propylene and an olefin of 4 to 20 carbon atoms. In these examples, polyethylene is an ethylene polymer having a comonomer content of less than 0.01% by mol, HDPE is an ethylene copolymer containing as a comonomer component an olefin of 3 to 8 carbon atoms, preferably propylene, 1-butene or 1-hexene, in an amount of not less than 0.01% by mol and less than 3% by mol, and LLDPE is an ethylene copolymer containing as a comonomer component an olefin of 3 to 8 carbon atoms, preferably propylene, 1-butene or 1-hexene, in an amount of not less than 3% by mol and less than 10% by mol. Examples of the olefins of 4 to 20 carbon atoms include $\alpha$-olefins, such as 1-butene, 1-pentene, 1-hexene, 1-octene and 1-decene; dienes, such as butadiene, isoprene, 1,4-pentadiene, 1,5-hexadiene and 1,7-octadiene; aromatic vinyl compounds, such as styrene; and cycloolefin compounds, such as tetracyclododecene, norbornene and methyl norbornene. When the comonomer is an olefin of 3 to 8 carbon atoms, the comonomer content is not less than 10% by mol, and in other cases, the comonomer content is not less than 0.01% by mol.

Of the above examples, the copolymers may contain one comonomer or may contain two or more comonomers.

Of the above polyolefins, preferable are polyethylene, HDPE, LLDPE, polypropylene, polybutene, an ethylene/propylene copolymer, an ethylene/butene copolymer and ail ethylene/hexene copolymer, and particularly preferable are HDPE, LLDPE, polypropylene, polybutene, an ethylene/propylene copolymer, an ethylene/butene copolymer and an ethylene/hexene copolymer.

The monodisperse polyolefin of the invention is preferably a polymer of ethylene which has a number-average molecular weight of not less than 110,000, preferably 110,000 to 10,000,000, more preferably 150,000 to 5,000,000, and Mw/Mn of not more than 1.5, preferably not more than 1.3, or a polymer of at least one olefin selected from olefins of 3 to 20 carbon atoms which has a number-average molecular weight of not less than 500, preferably 500 to 10,000,000, more preferably 1,000 to 5,000,000, Mw/Mn of not more than 1.5, preferably not more than 1.3, and a melting point of not lower than 70° C.

In case of a polymer of propylene or 1-butene, this polymer preferably has a number-average molecular weight of not less than 500, preferably 500 to 10,000,000, more preferably 1,000 to 5,000,000, Mw/Mn of not more than 1.5, preferably not more than 1.3, and a racemic diad (r), as measured by $^{13}$C-NMR, of not less than 0.85, preferably not less than 0.90.

In case of an ethylene/propylene copolymer, the ethylene comment is preferably not less than 60% by mol, more preferably not less than 70% by mol.

The monodisperse polyolefin of the invention may be bonded to other structural parts within limits not detrimental to the objects of the invention. The polymer of the invention may be a graft modified polymer.

The olefin polymer according to the invention is, for example, a copolymer of at least two olefins selected from olefins of 2 to 20 carbon atoms, which has a number-average molecular weight of not less than 500, preferably 500 to 10,000,000, more preferably 1,000 to 5,000,000, and which is a so-called tapered polymer containing a segment wherein composition of two or more monomers continuously changes.

The "tapered polymer" used herein is a polymer in which the comonomer composition gradually changes from one end to the other end of the polymer chain. This polymer can be synthesized by polymerizing two or more monomers (e.g., ethylene and propylene) in a perfect living polymerization system wherein the chain transfer reaction does not substantially take place. When the living properties of the polymerization system is insufficient, obtainable is not a perfect tapered polymer but a mixture of copolymers having different compositions. The living properties of the polymerization system is judged by a molecular weight distribution (Mw/Mn) of the resulting polymer. When the living properties of the polymerization system is high and a perfect tapered polymer is produced, the value of Mw/Mn is preferably not more than 2.5, more preferably not more than 1.8, still more preferably not more than 1.5.

In the above polymer, the two or more monomers are selected from olefins of 2 to 20 carbon atoms. Specifically, they are preferably selected from ethylene, propylene, 1-butene, 1-pentene, 1-hexene, 1-heptene and 1-octene, and they are more preferably selected from ethylene, propylene and 1-butene. One of the monomers is still more preferably ethylene, and the ethylene content is particularly preferably not less than 30% by mol.

Examples of the tapered polymers include an ethylene/propylene tapered polymer, an ethylene/butene tapered polymer, an ethylene/hexene tapered polymer, a propylene/butene tapered polymer and a propylene/hexene tapered polymer.

The tapered polymer of the invention may be bonded to other structural parts within limits not detrimental to the objects of the invention, with the proviso that it has the above structure. The polymer of the invention may be a graft modified polymer.

The olefin polymer according to the invention is, for example, the following polymer.

An olefin polymer which is a polymer consisting of two or more kinds of monomer units, i.e., a monomer unit $M_1$ derived from an olefin of 2 to 20 carbon atoms and at least one monomer unit $M_2$ that is different from the monomer unit $M_1$, and which has the following properties: $[M_1 \cdot M_2]$, $[M_1 \cdot M_1]$, $[M_2 \cdot M_2]$, $[M_1]$ and $[M_2]$, as measured by $^{13}$C-NMR, satisfy the following relations:

$$1>[M_1 \cdot M_2]/(2\times[M_1]\times[M_2]) \quad (A)$$

$$1>[M_1 \cdot M_2]^2/(4\times[M_1 \cdot M_1]\times[M_2 \cdot M_2]) \quad (B)$$

wherein $[M_1]$ is a molar fraction of the monomer unit $M_1$, $[M_2]$ is a molar fraction of the monomer unit $M_2$, $[M_1 \cdot M_2]$ is a molar fraction of a unit in which the monomer unit $M_1$ and the monomer unit $M_2$ are adjacent to each other, $[M_1 \cdot M_1]$ is a molar fraction of a unit in which the monomer unit $M_1$ and the monomer unit $M_1$ are adjacent to each other, and $[M_2 \cdot M_2]$ is a molar fraction of a unit in which the monomer unit $M_2$ and the monomer unit $M_2$ are adjacent to each other, with the proviso that $[M_1]+[M_2]=1.0$ and $[M_1 \cdot M_2]+[M_1 \cdot M_1]+[M_2 \cdot M_2]=1.0$.

When the monomer unit $M_1$ and the monomer unit $M_2$ are contained in the polymer chain at statistically random, the probability of occurrence of $[M_1 \cdot M_2]$ becomes $2\times[M_1]\times[M_2]$. The reason of multiplication by 2 is that $[M_1 \cdot M_2]$ is strictly a molar fraction of units of the total of the $M_1$–$M_2$ units and the $M_2$–$M_1$ units. The relation (A) indicates that the units wherein the monomer unit $M_1$ and the monomer unit $M_2$ are adjacent are contained in amounts smaller than those in the case where they are contained at statistically random. This means that a portion of high content of the monomer units $M_1$ and a portion of high content of the monomer units $M_2$ coexist in one polymer chain, and this phenomenon is observed in a tapered polymer or a block polymer.

The structure of the olefin copolymer of the invention is precisely controlled, so that the Mw/Mn of the copolymer is usually not more than 2.5, preferably not more than 2.0, more preferably not more than 1.8, still more preferably not more than 1.6, particularly preferably not more than 1.5, most preferably not more than 1.3.

When a tapered polymer or a block polymer satisfying the relation (A) is intended to be synthesized by the prior technique, there is a possibility that a polymer apparently satisfying the relation (A) can be synthesized by changing the feed ratio between the monomer unit $M_1$ and the monomer unit $M_2$ with time during the polymerization. In this case, however, the polymerization reactivities of the monomer unit $M_1$ and the monomer unit $M_2$ are different from each other, and consequently the reactivities of the feed monomers change with time. As a result, a small value of Mw/Mn is not obtained, differently from the present invention.

On the other hand, when a polymer of small Mw/Mn is intended to be prepared by the prior technique, the feed ratio between the monomer unit $M_1$ and the monomer unit $M_2$ needs to be kept constant during the polymerization in order to prevent change of the reactivities of the feed monomers with time, so that the probability of occurrence of $[M_1 \cdot M_2]$ becomes equal to $2\times[M_1]\times[M_2]$, and it becomes impossible to satisfy the relation (A).

In the present invention, it is possible to precisely control the polymer structure even when the reactivities of the feed monomers change with time. The relation (A) is preferably the following relation (A-2), more preferably the following relation (A-3).

$$0.95\geqq[M_1 \cdot M_2]/(2\times[M_1]\times[M_2]) \quad (A-2)$$

$$0.90\geqq[M_1 \cdot M_2]/(2\times[M_1]\times[M_2]) \quad (A-3)$$

The relation (B) is a relation to verify the contents described with respect to the relation (A) with much higher accuracy.

As described above, $[M_1 \cdot M_2]$ is strictly a molar fraction of units of the total of the $M_1$–$M_2$ units and the $M_2$–$M_1$ units, so that the probability of occurrence of the $M_1$–$M_2$ unit wherein the monomer unit $M_1$ is followed by the monomer unit $M_2$ and the probability of occurrence of the $M_2$–$M_1$ unit wherein the monomer unit $M_2$ is followed by the monomer unit $M_1$ both become $[M_1 \cdot M_2]/2$. When the terminal of the polymer is the monomer unit $M_1$ and after this monomer unit the monomer unit $M_1$ or the monomer unit $M_2$ is inserted to produce a $M_1$–$M_1$ unit or a $M_1$–$M_2$ unit and besides when the polymerization proceeds at statistically random, the ratio between occurrences of those units agrees with the ratio between $[M_1]$ and $[M_2]$. That is, the molar fractions satisfy the following relation (B-0-1).

$$([M_1 \cdot M_2]/2)/[M_1 \cdot M_1]=[M_2]/[M_1] \quad (B-0-1)$$

On the other hand, when the terminal of the polymer is the monomer unit $M_2$ and after this monomer unit the monomer unit $M_1$ or the monomer unit $M_2$ is inserted to produce a $M_2$–$M_1$ unit or a $M_2$–$M_2$ unit and besides when the polymerization proceeds at statistically random, the ratio between occurrences of those units agrees with the ratio between $[M_1]$ and $[M_2]$. That is, the molar fractions satisfy the following relation (B-0-2).

$$([M_1 \cdot M_2]/2)/[M_2 \cdot M_2]=[M_1]/[M_2] \quad \text{(B-0-2)}$$

That is, when the polymerization proceeds at statistically random, the following relation (B-0) wherein both sides of the relations (B-0-1) and (B-0-2) are multiplied is given.

$$1=[M_1 \cdot M_2]^2/(4\times[M_1 \cdot M_1]\times[M_2 \cdot M_2]) \quad \text{(B-0)}$$

The aforesaid relation (B) indicates that the units wherein the monomer unit $M_1$ and the monomer unit $M_2$ are adjacent are contained in amounts smaller than those in the case where they are produced at statistically random. This means that the probability of continuous insertion of the same kind of comonomers at the terminal of the polymer is higher than the probability of insertion of different kinds of comonomers at the terminal of the polymer and that a tapered polymer or a block polymer can be synthesized with precisely controlling the structure.

The structure of the olefin copolymer of the invention is precisely controlled, so that the Mw/Mn of the copolymer is usually not more than 2.5, preferably not more than 2.0, more preferably not more than 1.8, still more preferably not more than 1.6, particularly preferably not more than 1.5, most preferably not more than 1.4. The relation (B) is preferably the following relation (B-2), more preferably the following relation (B-3), still more preferably the following relation (B-4), much more preferably the following relation (B-5), particularly preferably the following relation (B-6), most preferably the following relation (B-7).

$$0.95>[M_1 \cdot M_2]^2/(4\times[M_1 \cdot M_1]\times[M_2 \cdot M_2]) \quad \text{(B-2)}$$

$$0.90>[M_1 \cdot M_2]^2/(4\times[M_1 \cdot M_1]\times[M_2 \cdot M_2]) \quad \text{(B-3)}$$

$$0.85>[M_1 \cdot M_2]^2/(4\times[M_1 \cdot M_1]\times[M_2 \cdot M_2]) \quad \text{(B-4)}$$

$$0.80>[M_1 \cdot M_2]^2/(4\times[M_1 \cdot M_1]\times[M_2 \cdot M_2]) \quad \text{(B-5)}$$

$$0.75>[M_1 \cdot M_2]^2/(4\times[M_1 \cdot M_1]\times[M_2 \cdot M_2]) \quad \text{(B-6)}$$

$$0.70>[M_1 \cdot M_2]^2/(4\times[M_1 \cdot M_1]\times[M_2 \cdot M_2]) \quad \text{(B-7)}$$

The reason why a polymer having a small Mw/Mn value and satisfying the relation (B), such as the tapered polymer of the invention, cannot be produced by the prior technique is the same as the reason why a polymer satisfying the relation (A) cannot by produced.

It is detected by $^{13}$C-NMR that in the tapered polymer out of the olefin copolymers satisfying the relations (A) and (B) and having Mw/Mn of not more than 2.5, an isolated monomer unit $M_1$ and a sequence of two or more continuous monomer units $M_1$ are both present in the polymer chain. Such a tapered polymer structure was not analyzed by $^{13}$C-NMR in the prior art, and it has been made clear for the first time by the technique of the present invention which is capable of promoting extremely precise polymerization.

On the other hand, in the block polymer the isolated monomer unit $M_1$ is not detected but only a sequence of two or more continuous monomer units $M_1$ is detected.

In the tapered polymer structure made clear by the present invention for the first time, it is preferable that a sequence of two continuous monomer units $M_1$ and a sequence of three or more continuous monomer units $M_1$ are detected. That is, it is preferable that three units of an isolated monomer unit $M_1$, a unit composed of two continuous monomer units $M_1$ and a unit composed of three or more monomer units $M_1$ are detected by $^{13}$C-NMR at the same time.

The monomer unit $M_1$ and the monomer unit $M_2$ are derived from the monomers previously given as examples of the olefins of 2 to 20 carbon atoms.

The monomer unit $M_1$ is preferably derived from ethylene, propylene, 1-butene, 1-pentene, 1-hexene, 1-heptene or 1-octene, and is more preferably derived from ethylene. The monomer unit $M_2$ is preferably derived from propylene, 1-butene, 1-pentene, 1-hexene, 1-heptene or 1-octene, and is more preferably derived from propylene or 1-butene.

When the monomer unit $M_1$ is an ethylene unit, it is preferable that three units of an isolated monomer unit $M_1$, a unit composed of two continuous monomer units $M_1$ and a unit composed of three or more monomer units $M_1$ are detected by $^{13}$C-NMR at the same time. It is also preferable that an isolated monomer unit $M_2$ and a unit composed of two or more continuous monomer units $M_2$ are detected at the same time. That is, it is preferable that a sequence of two or more continuous methylene groups is detected by $^{13}$C-NMR and sequences of one, two, three, four, five and six or more methylene groups are all detected. It is more preferable that the molar fractions of the sequences of one, two, three, four, five and six or more methylene groups are detected as different values.

The $^{13}$C-NMR measurement and analysis can be carried out in accordance with a method hitherto known, as previously described.

The olefin copolymer can be favorably used for various molding materials for films, sheets and blow molded products, various additives such as compatibilizing agent and modifier, coating materials and adhesives. The use application will be described later.

The process for preparing the olefin copolymer of the invention will be described later.

The olefin copolymer of the invention may have a functional group at the terminal of the main chain. The olefin copolymer of the invention may be bonded to other structural parts within limits not detrimental to the objects of the invention, with the proviso that it has the above structure. The polymer of the invention may be a graft modified polymer.

As the functional group, an aromatic hydrocarbon group, a halogen atom, an oxygen-containing group, a nitrogen-containing group, a sulfur-containing group, a phosphorus-containing group, a metal atom-containing group or the like is preferable.

Examples of the aromatic hydrocarbon groups include phenyl, naphthyl, tolyl, biphenylyl and anthryl.

Examples of the halogen atoms include fluorine, chlorine, bromine and iodine.

The oxygen-containing group is, for example, a group containing 1 to 5 oxygen atoms, but the later-described heterocyclic compound residue is not included in this group. A group containing a nitrogen atom, a sulfur atom, a phosphorus atom or a halogen atom, said atom being directly bonded to the oxygen atom, is not included either. Examples of the oxygen-containing groups include hydroxyl group; alkoxy groups, such as methoxy, ethoxy, propoxy and butoxy; aryloxy groups, such as phenoxy, methylphenoxy, dimethylphenoxy and naphthoxy; arylalkoxy groups, such as phenyl-methoxy and phenylethoxy; acetoxy group; carbonyl group; carboxyl group; ester group; and acetyl group. When the oxygen-containing group contains carbon atom, the number of carbon atoms is in the range of usually 1 to 30, preferably 1 to 20.

The nitrogen-containing group is, for example, a group containing 1 to 5 nitrogen atoms, but the later-described heterocyclic compound residue is not included in this group. Examples of the nitrogen-containing groups include amino group; alkylamino groups, such as methylamino, dimethylamino, ethylamino, propylamino, butylamino and cyclohexylamino; and arylamino groups, such as phenylamino, tolylamino and naphthylamino.

The sulfur-containing group is, for example, a group containing 1 to 5 sulfur atoms, but the later-described heterocyclic compound residue is not included in this group. Examples of the sulfur-containing groups include sulfonato groups, such as methylsulfonato, triflurومethanesulfonato, phenylsulfonato, benzylsulfonato, p-toluenesulfonato, trimethylbenzenesulfonato, triisobutylbenzenesulfonato, p-chlorobenzenesulfonato and pentafluorobenzene-sulfonato; sulfinato groups, such as methylsulfinato, phenylsulfinato, benzylsulfinato, p-toluenesulfinato, trimethylbenzenesulfinato and pentaflurobenzenesulfinato; alkylthio groups; and arylthio groups. When the sulfur-containing group contains carbon atom, the number of carbon atoms is in the range of usually 1 to 30, preferably 1 to 20.

The phosphorus-containing group as, for example, a group containing 1 to 5 phosphorus atoms, and examples thereof include trialkylphosphine groups, such as trimethylphosphine, tributylphosphine and tricyclohexylphosphine; triarylphosphine groups, such as triphenylphosphine and tritolylphosphine; phosphite groups (phosphido groups), such as methylphosphite, ethylphosphite and phenylphosphite; phosphonic acid group; and phosphonic acid group.

The metal atom-containing group is, for example, a group containing an atom of silicon, aluminum, boron, zinc or magnesium, or a metal atom such as lithium, and examples thereof include a silicon-containing group, an aluminum-containing group, a boron-containing group, a zinc-containing group, a magnesium-containing group and a lithium atom.

The silicon-containing group is, for example, a group containing 1 to 5 silicon atoms. Examples of the silicon-containing groups include hydrocarbon-substituted silyl groups, such as phenylsilyl, diphenylsilyl, trimethylsilyl, triethylsilyl, tripropylsilyl, tricyclohexylsilyl, triphenylsilyl, tritolylsilyl, trinaphthylsilyl and methyldiphenylsilyl; alkyl-substituted silyl ether groups, such as trimethylsilyl ether; silicon-substituted alkyl groups, such as trimethylsilylmethyl; silicon-substituted aryl groups, such as trimethysilylphenyl; and hydrocarbon-substituted siloxy groups, such as trimethylsiloxy. Of the hydrocarbon-substituted silyl groups, trialkylsilyl groups, such as trimethylsilyl, tripropylsilyl and tricyclohexylsilyl, are preferable.

The aluminum-containing group is, for example, a group containing 1 to 5 aluminum atoms. An example of the aluminum-containing group is —$AlR_2$ group (R is hydrogen, an alkyl group, an aryl group which may have a substituent, a halogen atom or the like).

The boron-containing group is, for example, a group containing 1 to 5 boron atoms. An example of the boron-containing group is —$BR_2$ group (R is hydrogen, an alkyl group, an aryl group which may have a substituent, a halogen atom or the like).

The zinc-containing group is, for example, a group containing 1 to 3 zinc atoms. An example of the zinc-containing group is —ZnR group (R is hydrogen, an alkyl group, an aryl group which may have a substituent, a halogen atom or the like).

The magnesium-containing group is a group containing 1 to 3 magnesium atoms. An example of the magnesium-containing group is —MgR group (R is hydrogen, an alkyl group, an aryl group which may have a substituent, a halogen atom or the like).

Examples of the olefin polymers having a functional group at the terminal of the main chain include polymers having a halogen atom, a phenyl group, a hydroxyl group, an alkoxy group, a carbonyl group, a carboxyl group, an ester group, an acetyl group, an alkylamino group, a trialkylsilyl group, a trimethylsiloxy group, a dialkylaluminum group, a dialkylboron group, an alkylzinc group, lithium or the like at the terminals of polyethylene, HDPE, LLDPE, polypropylene, polybutene, a homopolymer of 1-pentene, 1-hexene, 1-octene, 1-decene or the like, a copolymer of ethylene and propylene, a copolymer of ethylene and an olefin of 4 to 20 carbon atoms (e.g., α-olefins, such as 1-butene, 1-pentene, 1-hexene, 1-octene and 1-decene; dienes, such as butadiene, isoprene, 1,4-pentadiene, 1,5-hexadiene and 1,7-octadiene; aromatic vinyl compounds, such as styrene; cycloolefin compounds, such as tetracyclododecene, norbornene and methyl norbornene), a copolymer of propylene and the above-mentioned olefin of 4 to 20 carbon atoms, and the aforesaid tapered polymer.

Of these, particularly preferable are polymers having a chlorine atom, a bromine atom, an iodine atom, a hydroxyl group or an alkylzinc group at the terminals of polyethylene, HDPE, LLDPE, polypropylene, polybutene, an ethylene/propylene copolymer, an ethylene/butene copolymer and an ethylene/hexene copolymer.

The olefin polymer having a functional group at the terminal of the main chain can be favorably used for various additives such as compatibilizing agent and modifier, coating materials and adhesives. The use application of the polymer will be described later.

The process for preparing the olefin polymer having a functional group at the terminal of the main chain will be described later.

The olefin polymer in another embodiment of the invention is an olefin block copolymer comprising:

(i) a polymer block obtained from at least one olefin selected from olefins of 2 to 20 carbon atoms, and (ii) a polymer block that is obtained from at least one olefin selected from olefins of 2 to 20 carbon atoms and is different from the polymer block (i).

The polymer blocks different from each other are those different in at least one of primary structures of polymers, such as monomer type, comonomer type, comonomer composition, comonomer content, comonomer configuration and stereoregularity.

The polymer blocks (i) and (ii) may be each a polymer of one olefin selected from olefins of 2 to 20 carbon atoms or may be a random copolymer of two or more olefins selected from olefins of 2 to 20 carbon atoms.

The olefin block copolymer may further have single or plural polymer blocks (iii) in addition to the polymer block (i) and the polymer block (ii). In this case, the block copolymer takes a form of (i)-(ii)-(iii)n, wherein n is an integer of 1 or more, preferably 1 to 8, more preferably 1 to 3, and he adjacent polymer blocks are different from each other.

The polymer block (iii) may be a polymer of one olefin selected from olefins of 2 to 20 carbon atoms or may be a random copolymer of two or more olefins selected from olefins of 2 to 20 carbon atoms.

In the olefin block copolymer, the polymer block (i) and the polymer block (ii) are each preferably a polymer block selected from the following polymer blocks (a), (b) and (c);

(a) a polymer block obtained from ethylene, (b) a polymer block obtained from one α-olefin selected from α-olefins of 3 to 20 carbon atoms, and (c) a polymer block obtained from two or more α-olefins selected from α-olefins of 2 to 20 carbon atoms.

The polymer block (b) is preferably a block of a homopolymer of propylene, 1-butene, 1-hexene or 1-octene.

The polymer block (c) is preferably a block of an ethylene/propylene copolymer, an ethylene/1-butene copolymer, an ethylene/1-hexene copolymer or an ethylene/1-octene copolymer.

In the present invention, at least one polymer block (a) obtained from ethylene is contained, and the polymer block (a) desirably has a number-average molecular weight of not less than 110,000, preferably 110,000 to 10,000,000, more preferably 150,000 to 5,000,000, and Mw/Mn of not more than 1.5, preferably not more than 1.3.

The above-mentioned olefin polymer is, for example, a polymer wherein an arbitrary number of polymer blocks obtained from at least one olefin selected from olefins of 2 to 20 carbon atoms are bonded, the number-average molecular weight (Mn) of the whole polymers is not less than 500, preferably 500 to 10,000,000, more preferably 1,000 to 5,000,000, adjacent polymer blocks are different from each other, the number-average molecular weight of each polymer block is not less than 100, preferably 100 to 9,999,900, more preferably 500 to 4,999,500, and Mw/Mn of each polymer block is not more than 2.5.

In the present invention, the number of polymer blocks is an integer of 2 or more, usually 2 to 10, preferably 2 to 6, particularly preferably 2 to 4.

In case of a diblock polymer in which the number of polymer blocks is 2, Mw/Mn is preferably less than 1.35, more preferably less than 1.30.

In case of a triblock polymer in which the number of polymer blocks is 3, Mw/Mn is preferably less than 1.80, more preferably less than 1.50.

In case of a multiblock polymer An which the number of polymer blocks is 4 or more, Mw/Mn is preferably less than 2.00, more preferably less than 1.80.

In the above olefin block copolymers, each polymer block is preferably selected from polyethylene, HDPE, LLDPE, a copolymer of ethylene and an olefin selected from olefins of 3 to 20 carbon atoms (including dienes and cycloolefins), ata-polypropylene, iso-polypropylene, syn-polypropylene, a copolymer of propylene and a monomer selected from olefins of 4 to 20 carbon atoms (including dienes and cycloolefins), and the aforesaid tapered polymer.

Particularly preferable is a diblock polymer or a triblock polymer in which each polymer block is selected from polyethylene, HDPE, LLDPE, an ethylene/propylene copolymer, an ethylene/butene copolymer, an ethylene/hexene copolymer, an ethylene/octene copolymer, ata-polypropylene, syn-polypropylene, a propylene/butene copolymer, a propylene/hexene copolymer, and the aforesaid tapered polymer.

Examples of the block polymers are given below. In the following examples, polyethylene-HDPE means an olefin block copolymer wherein a polyethylene block and a HDPE block are bonded, and if the polymer block is a copolymer of two or more monomers, such as an ethylene/propylene copolymer, its monomer configuration may be that of a random copolymer or a tapered polymer. polyethylene-HDPE, polyethylene-LLDPE, polyethylene-ethylene/propylene copolymer, polyethylene-ethylene/butene copolymer, polyethylene-ethylene/hexene copolymer, polyethylene-ethylene/octene copolymer, polyethylene-ata-polypropylene, polyethylene-syn-polypropylene, polyethylene-propylene/butene copolymer, polyethylene-propylene/hexene copolymer, HDPE-LLDPE, HDPE-ethylene/propylene copolymer, HDPE-ethylene/butene copolymer, HDPE-ethylene/hexene copolymer, HDPE-ethylene/octene copolymer, HDPE-ata-polypropylene, HDPE-syn-polypropylene, HDPE-propylene/butene copolymer, HDPE-propylene/hexene copolymer, LLDPE-ethylene/propylene copolymer, LLDPE-ethylene/butene copolymer, LLDPE-ethylene/hexene copolymer, LLDPE-ethylene/octene copolymer, LLDPE-ata-polypropylene, LLDPE-syn-polypropylene, LLDPE-propylene/butene copolymer, LLDPE-propylene/hexene copolymer, ethylene/propylene copolymer-ethylene/butene copolymer, ethylene/propylene copolymer-ethylene/hexene copolymer, ethylene/propylene copolymer-ethylene/octene copolymer, ethylene/propylene copolymer-ata-polypropylene, ethylene/propylene copolymer-syn-polypropylene, ethylene/propylene copolymer-propylene/butene copolymer, ethylene/propylene copolymer-propylene/hexene copolymer, ethylene/butene copolymer-ethylene/hexene copolymer, ethylene/butene copolymer-ethylene/octene copolymer, ethylene/butene copolymer-ata-polypropylene, ethylene/butene copolymer-syn-polypropylene, ethylene/butene copolymer-propylene/butene copolymer, ethylene/butene copolymer-propylene/hexene copolymer, ethylene/hexene copolymer-ethylene/octene copolymer, ethylene/hexene copolymer-ata-polypropylene, ethylene/hexene copolymer-syn-polypropylene, ethylene/hexene copolymer-propylene/butene copolymer, ethylene/hexene copolymer-propylene/hexene copolymer, ethylene/octene copolymer-ata-polypropylene, ethylene/octene copolymer-syn-polypropylene, ethylene/octene copolymer-propylene/butene copolymer, ethylene/octene copolymer-propylene/hexene copolymer, ata-polypropylene-syn-polypropylene, ata-polypropylene-propylene/butene copolymer, ata-polypropylene-propylene/hexene copolymer, syn-polypropylene-propylene/butene copolymer, syn-polypropylene-propylene/hexene copolymer, proplylene/butene copolymer-propylene/hexene copolymer, polyethylene-HDPE-polyethylene, polyethylene-LLDPE-polyethylene, polyethylene-ethylene/propylene copolymer-polyethylene, polyethylene-ethylene/butene copolymer-polyethylene, polyethylene-ethylene/hexene copolymer-polyethylene, polyethylene-ethylene/octene copolymer-polyethylene, polyethylene-ata-polypropylene-polyethylene, polyethylene-syn-polypropylene-polyethylene, polyethylene-propylene/butene copolymer-polyethylene, polyethylene-propylene/hexene copolymer-polyethylene, HDPE-polyethylene-HDPE, HDPE-LLDPE-HDPE, HDPE-ethylene/propylene copolymer-HDPE, HDPE-ethylene/butene copolymer-HDPE, HDPE-ethylene/hexene copolymer-HDPE, HDPE-ethylene/octene copolymer-HDPE, HDPE-ata-polypropylene-HDPE, HDPE-syn-polypropylene-HDPE, HDPE-propylene/butene copolymer-HDPE, HDPE-propylene/hexene copolymer-HDPE, LLDPE-polyethylene-LLDPE, LLDPE-HDPE-LLDPE, LLDPE-ethylene/propylene copolymer-LLDPE, LLDPE-ethylene/butene copolymer-LLDPE, LLDPE-ethylene/hexene copolymer-LLDPE, LLDPE-ethylene/octene copolymer-LLDPE, LLDPE-ata-polypropylene-LLDPE, LLDPE-syn-polypropylene-LLDPE, LLDPE-propylene/butene copolymer-LLDPE, LLDPE-propylene/hexene copolymer-LLDPE, ethylene/propylene copolymer-polyethylene-ethylene/propylene copolymer, ethylene/propylene copolymer-EDPE-ethylene/propylene copolymer, ethylene/propylene copolymer-LLDPE-ethylene/propylene copolymer, ethylene/propylene copolymer-ethylene/butene copolymer-ethylene/propylene copolymer, ethylene,/ propylene copolymer-ethylene/hexene copolymer-ethylene/ propylene copolymer, ethylene/propylene copolymer-ethylene/octene copolymer-ethylene/propylene copolymer, ethylene/propylene copolymer-ata-polypropylene-ethylene/ propylene copolymer, ethylene/propylene copolymer-syn-polypropylene-ethylene/propylene copolymer, ethylene/ propylene copolymer-propylene/butene copolymer-ethylene/propylene copolymer, ethylene/propylene copolymer-propylene/hexene copolymer-ethylene/ propylene copolymer, ethylene/butene copolymer-polyethylene-ethylene/butene copolymer, ethylene/butene copolymer-HDPE-ethylene/butene copolymer, ethylene/ butene copolymer-LLDPE-ethylene/butene copolymer, ethylene/butene copolymer-ethylene/propylene copolymer-ethylene/butene copolymer, ethylene/butene copolymer-ethylene/hexene copolymer-ethylene/butene copolymer, ethylene/butene copolymer-ethylene/octene copolymer-ethylene/butene copolymer, ethylene/butene copolymer-ata-polypropylene-ethylene/butene copolymer, ethylene/butene copolymer-syn-polypropylene-ethylene/butene copolymer, ethylene/butene copolymer-propylene/butene copolymer-ethylene/butene copolymer, ethylene/butene copolymer-propylene/hexene copolymer-ethylene/butene copolymer, ethylene/hexene copolymer-polyethylene-ethylene/hexene copolymer, ethylene/hexene copolymer-HDPE-ethylene/ hexene copolymer, ethylene/hexene copolymer-LLDPE-ethylene/hexene copolymer, ethylene/hexene copolymer-ethylene/propylene copolymer-ethylene/hexene copolymer, ethylene/hexene copolymer-ethylene/butene copolymer-ethylene/hexene copolymer, ethylene/hexene copolymer-ethylene/octene copolymer-ethylene/hexene copolymer, ethylene/hexene copolymer-ata-polypropylene-ethylene/ hexene copolymer, ethylene/hexene copolymer-syn-polypropylene-ethylene/hexene copolymer, ethylene/hexene copolymer-propylene/butene copolymer-ethylene/hexene copolymer, ethylene/hexene copolymer-propylene/hexene copolymer-ethylene/hexene copolymer, ethylene/octene copolymer-polyethylene-ethylene/octene copolymer, ethylene/octene copolymer-HDPE-ethylene/octene copolymer, ethylene/octene copolymer-LLDPE-ethylene/ octene copolymer, ethylene/octene copolymer-ethylene/ propylene copolymer-ethylene/octene copolymer, ethylene/ octene copolymer-ethylene/butene copolymer-ethylene/ octene copolymer, ethylene/octene copolymer-ethylene/ hexene copolymer-ethylene/octene copolymer, ethylene/ octene copolymer-ata-polypropylene-ethylene/octene copolymer, ethylene/octene copolymer-syn-polypropylene-ethylene/octene copolymer, ethylene/octene copolymer-propylene/butene copolymer-ethylene/octene copolymer, ethylene/octene copolymer-propylene/hexene copolymer-ethylene/octene copolymer, ata-polypropylene-polyethylene-ata-polypropylene, ata-polypropylene-HDPE-ata-polypropylene, ata-polypropylene-LLDPE-ata-polypropylene, ata-polypropylene-ethylene/propylene copolymer-ata-polypropylene, ata-polypropylene-ethylene/ butene copolymer-ata-polypropylene, ata-polypropylene-ethylene/hexene copolymer-ata-polypropylene, ata-polypropylene-ethylene/octene copolymer-ata-polypropylene, ata-polypropylene-syn-polypropylene-ata-polypropylene, ata-polypropylene-propylene/butene copolymer-ata-polypropylene, ata-polypropylene-propylene/hexene copolymer-ata-polypropylene, syn-polypropylene-polyethylene-syn-polypropylene, syn-polypropylene-HDPE-syn-polypropylene, syn-polypropylene-LLDPE-syn-polypropylene, syn-polypropylene-ethylene/propylene copolymer-syn-polypropylene, syn-polypropylene-ethylene/butene copolymer-syn-polypropylene, syn-polypropylene-ethylene/hexene copolymer-syn-polypropylene, syn-polypropylene-ethylene/octene copolymer-syn-polypropylene, syn-polypropylene-ata-polypropylene-syn-polypropylene, syn-polypropylene-propylene/butene copolymer-syn-polypropylene, syn-polypropylene-propylene/hexene copolymer-syn-polypropylene, propylene/butene copolymer-polyethylene-propylene/ butene copolymer, propylene/butene copolymer-HDPE-propylene/butene copolymer, propylene/butene copolymer-LLDPE-propylene/butene copolymer, propylene/butene copolymer-ethylene/propylene copolymer-propylene/butene copolymer, propylene/butene copolymer-ethylene/butene copolymer-propylene/butene copolymer, propylene/butene copolymer-ethylene/hexene copolymer-propylene/butene copolymer, propylene/butene copolymer-ethylene/octene copolymer-propylene/butene copolymer, propylene/butene copolymer-ata polypropylene-propylene/butene copolymer, propylene/butene copolymer-syn-polypropylene-propylene/ butene copolymer, propylene/butene copolymer-propylene/ hexene copolymer-propylene/butene copolymer, propylene/ hexene copolymer-polyethylene-propylene/hexene copolymer, propylene/hexene copolymer-HDPE-propylene/ hexene copolymer, propylene/hexene copolymer-LLDPE-propylene/hexene copolymer, propylene/hexene copolymer-ethylene/propylene copolymer-propylene/hexene copolymer, propylene/hexene copolymer-ethylene/butene copolymer-propylene/hexene copolymer, propylene/hexene copolymer-ethylene/hexene copolymer-propylene/hexene copolymer, propylene/hexene copolymer-ethylene/octene copolymer-propylene/hexene copolymer, propylene/hexene copolymer-ata-polypropylene-propylene/hexene copolymer, propylene/hexene copolymer-syn-polypropylene-propylene/hexene copolymer, propylene/hexene copolymer-propylene/butene copolymer-propylene/hexene copolymer, polyethylene-HDPE-LLDPE, polyethylene-HDPE-ethylene/propylene copolymer, polyethylene-HDPE-ethylene/butene copolymer, polyethylene-HDPE-ethylene/ hexene copolymer, polyethylene-HDPE-ethylene/octene copolymer, polyethylene-HDPE-ata-polypropylene, polyethylene-HDPE-syn-polypropylene, polyethylene-HDPE-propylene/butene copolymer, polyethylene-HDPE-propylene/hexene copolymer, polyethylene-LLDPE-HDPE, polyethylene-LLDPE-ethylene/propylene copolymer, polyethylene-LLDPE-ethylene/butene copolymer, polyethylene-LLDPE-ethylene/hexene copolymer, polyethylene-LLDPE-ethylene/octene copolymer, polyethylene-LLDPE-ata-polypropylene, polyethylene-LLDPE-syn-polypropylene, polyethylene-LLDPE-propylene/butene copolymer, polyethylene-LLDPE-propylene/hexene copolymer, polyethylene-ethylene/ propylene copolymer-HDPE, polyethylene-ethylene/ propylene copolymer-LLDPE, polyethylene-ethylene/ propylene copolymer-ethylene/butene copolymer, polyethylene-ethylene/propylene copolymer-ethylene/ hexene copolymer, polyethylene-ethylene/propylene copolymer-ethylene/octene copolymer, polyethylene-ethylene/propylene copolymer-ata-polypropylene, polyethylene-ethylene/propylene copolymer-syn-polypropylene, polyethylene-ethylene/propylene copolymer-propylene/butene copolymer, polyethylene-ethylene/propylene copolymer-propylene/hexene copolymer, polyethylene-ethylene/butene copolymer-HDPE, polyethylene-ethylene/butene copolymer-LLDPE, polyethylene-ethylene/butene copolymer-ethylene/ propylene copolymer, polyethylene-ethylene/butene copolymer-ethylene/hexene copolymer, polyethylene-ethylene/butene copolymer-ethylene/octene copolymer, polyethylene-ethylene/butene copolymer-ata-polypropylene, polyethylene-ethylene/butene copolymer-syn-polypropylene, polyethylene-ethylene/butene copolymer-propylene/butene copolymer, polyethylene-ethylene/butene copolymer-propylene/hexane copolymer, polyethylene-ethylene/hexene copolymer-HDPE, polyethylene-ethylene/hexene copolymer-LLDPE, polyethylene-ethylene/hexene copolymer-ethylene/propylene copolymer, polyethylene-ethylene/hexene copolymer-ethylene/butene copolymer, polyethylene-ethylene/hexene copolymer-ethylene/octene copolymer, polyethylene-ethylene/hexene copolymer-ata-polypropylene, polyethylene-ethylene/hexene copolymer-syn-polypropylene, polyethylene-ethylene/hexene copolymer-propylene/butene copolymer, polyethylene-ethylene/hexene copolymer-propylene/hexene copolymer, polyethylene-ethylene/octene copolymer-HDPE, polyethylene-ethylene/octene copolymer-LLDPE, polyethylene-ethylene/octene copolymer-ethylene/propylene copolymer, polyethylene-ethylene/octene copolymer-ethylene/butene copolymer, polyethylene-ethylene/octene copolymer-ethylene/hexene copolymer, polyethylene-ethylene/octene copolymer-ata-polypropylene, polyethylene-ethylene/octene copolymer-syn-polypropylene, polyethylene-ethylene/octene copolymer-propylene/butene copolymer, polyethylene-ethylene/octene copolymer-propylene/hexene copolymer, polyethylene-ata-polypropylene-HDPE, polyethylene-ata-polypropylene-LLDPE, polyethylene-ata-polypropylene-ethylene/propylene copolymer, polyethylene-ata-polypropylene-ethylene/butene copolymer, polyethylene-ata-polypropylene-ethylene/hexene copolymer, polyethylene-ata-polypropylene-ethylene/octene copolymer, polyethylene-ata-polypropylene-syn-polypropylene, polyethylene-ata-polypropylene-propylene/butene copolymer, polyethylene-ata-polypropylene-propylene/hexene copolymer, polyethylene-syn-polypropylene-HDPE, polyethylene-syn-polypropylene-LLDPE, polyethylene-syn-polypropylene-ethylene/propylene copolymer, polyethylene-syn-polypropylene-ethylene/butene copolymer, polyethylene-syn-polypropylene-ethylene/hexene copolymer, polyethylene-syn-polypropylene-ethylene/octene copolymer, polyethylene-syn-polypropylene-ata-polypropylene, polyethylene-syn-polypropylene-propylene/butene copolymer, polyethylene-syn-polypropylene-propylene/hexene copolymer, polyethylene-propylene/butene copolymer-HDPE, polyethylene-propylene/butene copolymer-LLDPE, polyethylene-propylene/butene copolymer-ethylene/propylene copolymer, polyethylene-propylene/butene copolymer-ethylene/butene copolymer, polyethylene-propylene/butene copolymer-ethylene/hexene copolymer, polyethylene-propylene/butene copolymer-ethylene/octene copolymer, polyethylene-propylene/butene copolymer-ata-polypropylene, polyethylene-propylene/butene copolymer-syn-polypropylene, polyethylene-propylene/butene copolymer-propylene/hexene copolymer, polyethylene-propylene/hexene copolymer-HDPE, polyethylene-propylene/hexene copolymer-LLDPE, polyethylene-propylene/hexene copolymer-ethylene/propylene copolymer, polyethylene-propylene/hexene copolymer-ethylene/butene copolymer, polyethylene-propylene/hexene copolymer-ethylene/hexene copolymer, polyethylene-propylene/hexene copolymer-ethylene/octene copolymer, polyethylene-propylene/hexene copolymer-ata-polypropylene, polyethylene-propylene/hexene copolymer-syn-polypropylene, polyethylene-propylene/hexene copolymer-propylene/butene copolymer, HDPE-polyethylene-LLDPE, HDPE-polyethylene-ethylene/propylene copolymer, HDPE-polyethylene-ethylene/butene copolymer, HDPE-polyethylene-ethylene/hexene copolymer, HDPE-polyethylene-ethylene/octene copolymer, HDPE-polyethylene-ata-polypropylene, HDPE-polyethylene-syn-polypropylene, HDPE-polyethylene-propylene/butene copolymer, HDPE-polyethylene-propylene/hexene copolymer, HDPE-LLDPE-ethylene/propylene copolymer, HDPE-LLDPE-ethylene/butene copolymer, HDPE-LLDPE-ethylene/hexene copolymer, HDPE-LLDPE-ethylene/octene copolymer, HDPE-LLDPE-ata-polypropylene, HDPE-LLDPE-syn-polypropylene, HDPE-LLDPE-propylene/butene copolymer, HDPE-LLDPE-propylene/hexene copolymer, HDPE-ethylene/propylene copolymer-LLDPE, HDPE-ethylene/propylene copolymer-ethylene/butene copolymer, HDPE-ethylene/propylene copolymer-ethylene/hexene copolymer, HDPE-ethylene/propylene copolymer-ethylene/octene copolymer, HDPE-ethylene/propylene copolymer-ata-polypropylene, HDPE-ethylene/propylene copolymer-syn-polypropylene, HDPE-ethylene/propylene copolymer-propylene/butene copolymer, HDPE-ethylene/propylene copolymer-propylene/hexene copolymer, HDPE-ethylene/butene copolymer-LLDPE, HDPE-ethylene/butene copolymer-ethylene/propylene copolymer, HDPE-ethylene/butene copolymer-ethylene/hexene copolymer, HDPE-ethylene/butene copolymer-ethylene/octene copolymer, HDPE-ethylene/butene copolymer-ata-polypropylene, HDPE-ethylene/butene copolymer-syn-polypropylene, HDPE-ethylene/butene copolymer-propylene/butene copolymer, HDPE-ethylene/butene copolymer-propylene/hexene copolymer, HDPE-ethylene/hexene copolymer-LLDPE, HDPE-ethylene/hexene copolymer-ethylene/propylene copolymer, HDPE-ethylene/hexene copolymer-ethylene/butene copolymer, HDPE-ethylene/hexene copolymer-ethylene/octene copolymer, HDPE-ethylene/hexene copolymer-ata-polypropylene, HDPE-ethylene/hexene copolymer-syn-polypropylene, HDPE-ethylene/hexene copolymer-propylene/butene copolymer, HDPE-ethylene/hexene copolymer-propylene/hexene copolymer, HDPE-ethylene/octene copolymer-LLDPE, HDPE-ethylene/octene copolymer-ethylene/propylene copolymer, HDPE-ethylene/octene copolymer-ethylene/butene copolymer, HDPE-ethylene/octene copolymer-ethylene/hexene copolymer, HDPE-ethylene/octene copolymer-ata-polypropylene, HDPE-ethylene/octene copolymer-syn-polypropylene, HDPE-ethylene/octene copolymer-propylene/butene copolymer, HDPE-ethylene/octene copolymer-propylene/hexene copolymer, HDPE-ata-polypropylene-LLDPE, HDPE-ata-polypropylene-ethylene/propylene copolymer, HDPE-ata-polypropylene-ethylene/butene copolymer, HDPE-ata-polypropylene-ethylene/hexene copolymer, HDPE-ata-polypropylene-ethylene/octene copolymer, HDPE-ata-polypropylene-syn-polypropylene, HDPE-ata-polypropylene-propylene/butene copolymer, HDPE-ata-polypropylene-propylene/hexene copolymer, HDPE-syn-polypropylene-LLDPE, HDPE-syn-polypropylene-ethylene/propylene copolymer, HDPE-syn-polypropylene-ethylene/butene copolymer, HDPE-syn-polypropylene-ethylene/hexene copolymer, HDPE-syn-polypropylene-ethylene/octene copolymer, HDPE-syn-polypropylene-ata-polypropylene, HDPE-syn-polypropylene-propylene/butene copolymer, HDPE-syn-polypropylene-propylene/hexene copolymer, HDPE-propylene/butene copolymer-LLDPE, HDPE-propylene/butene copolymer-ethylene/propylene copolymer, HDPE-propylene/butene copolymer-ethylene/butene copolymer, HDPE-propylene/butene copolymer-ethylene/hexene copolymer, HDPE-propylene/butene copolymer-ethylene/octene copolymer, HDPE-propylene/butene copolymer-ata-polypropylene, HDPE-propylene/butene copolymer-syn-polypropylene, HDPE-propylene/butene copolymer-propylene/hexene copolymer, HDPE-propylene/hexene copolymer-LLDPE, HDPE-propylene/hexene copolymer-ethylene/propylene copolymer, HDPE-propylene/hexene copolymer-ethylene/butene copolymer, HDPE-propylene/hexene copolymer-ethylene/hexene copolymer, HDPE-propylene/hexene copolymer-ethylene/octene copolymer, HDPE-propylene/hexene copolymer-ata-polypropylene, HDPE-propylene/hexene copolymer-syn-polypropylene, HDPE-propylene/hexene copolymer-propylene/butene copolymer, LLDPE-polyethylene-ethylene/propylene copolymer, LLDPE-polyethylene-ethylene/butene copolymer, LLDPE-polyethylene-ethylene/hexene copolymer, LLDPE-polyethylene-ethylene/octene copolymer, LLDPE-polyethylene-ata-polypropylene, LLDPE-polyethylene-syn-polypropylene, LLDPE-polyethylene-propylene/butene copolymer, LLDPE-polyethylene-propylene/hexene copolymer, LLDPE-HDPE-ethylene/propylene copolymer, LLDPE-HDPE-ethylene/butene copolymer, LLDPE-HDPE-ethylene/hexene copolymer, LLDPE-HDPE-ethylene/octene copolymer, LLDPE-HDPE-ata-polypropylene, LLDPE-HDPE-syn-polypropylene, LLDPE-HDPE-propylene/butene copolymer, LLDPE-HDPE-propylene/hexene copolymer, LLDPE-ethylene/propylene copolymer-ethylene/butene copolymer, LLDPE-ethylene/propylene copolymer-ethylene/hexene copolymer, LLDPE-ethylene/propylene copolymer-ethylene/octene copolymer, LLDPE-ethylene/propylene copolymer-ata-polypropylene, LLDPE-ethylene/propylene copolymer-syn-polypropylene, LLDPE-ethylene/propylene copolymer-propylene/butene copolymer, LLDPE-ethylene/propylene copolymer-propylene/hexene copolymer, LLDPE-ethylene/butene copolymer-ethylene/propylene copolymer, LLDPE-ethylene/butene copolymer-ethylene/hexene copolymer, LLDPE-ethylene/butene copolymer-ethylene/octene copolymer, LLDPE-ethylene/butene copolymer-ata-polypropylene, LLDPE-ethylene/butene copolymer-syn-polypropylene, LLDPE-ethylene/butene copolymer-propylene butene copolymer, LLDPE-ethylene/butene copolymer-propylene hexene copolymer, LLDPE-ethylene/hexene copolymer-ethylene/propylene copolymer, LLDPE-ethylene/hexene copolymer-ethylene/butene copolymer, LLDPE-ethylene/hexene copolymer-ethylene/octene copolymer, LLDPE-ethylene/hexene copolymer-ata-polypropylene, LLDPE-ethylene/hexene copolymer-syn-polypropylene, LLDPE-ethylene/hexene copolymer-propylene butene copolymer, LLDPE-ethylene/hexene copolymer-propylene hexene copolymer, LLDPE-ethylene/octene copolymer-ethylene/propylene copolymer, LLDPE ethylene/octene copolymer-ethylene/butene copolymer, LLDPE-ethylene/octene copolymer-ethylene/hexene copolymer, LLDPE-ethylene/octene copolymer-ata-polypropylene, LLDPE-ethylene/octene copolymer-syn-polypropylene, LLDPE-ethylene/octene copolymer-propylene butene copolymer, LLDPE-ethylene/octene copolymer-propylene hexene copolymer, LLDPE-ata-polypropylene-ethylene/propylene copolymer, LLDPE-ata-polypropylene-ethylene/butene copolymer, LLDPE-ata-polypropylene-ethylene/hexene copolymer, LLDPE-ata-polypropylene-ethylene/octene copolymer, LLDPE-ata-polypropylene-syn-polypropylene, LLDPE-ata-polypropylene-propylene butene copolymer, LLDPE-ata-polypropylene-propylene hexene copolymer, LLDPE-syn-polypropylene-ethylene/propylene copolymer, LLDPE-syn-polypropylene-ethylene/butene copolymer, LLDPE-syn-polypropylene-ethylene/hexene copolymer, LLDPE-syn-polypropylene-ethylene/octene copolymer, LLDPE-syn-polypropylene-ata-polypropylene, LLDPE-syn-polypropylene-propylene octene copolymer, LLDPE-syn-polypropylene-propylene hexene copolymer, LLDPE-propylene/butene copolymer-ethylene/propylene copolymer, LLDPE-propylene/butene copolymer-ethylene/butene copolymer, LLDPE-propylene/butene copolymer-ethylene/hexene copolymer, LLDPE-propylene/butene copolymer-ethylene/octene copolymer, LLDPE-propylene/butene copolymer-ata-polypropylene, LLDPE-propylene/butene copolymer-syn-polypropylene, LLDPE-propylene/butene copolymer-propylene hexene copolymer, LLDPE-propylene/hexene copolymer-ethylene/propylene copolymer, LLDPE-propylene/hexene copolymer-ethylene/butene copolymer, LLDPE-propylene/hexene copolymer-ethylene/hexene copolymer, LLDPE-propylene/hexene copolymer-ethylene/octene copolymer, LLDPE-propylene/hexene copolymer-ata-polypropylene, LLDPE-propylene/hexene copolymer-syn-polypropylene, LLDPE-propylene/hexene copolymer-propylene butene copolymer, ethylene/butene copolymer-polyethylene-ethylene/hexene copolymer, ethylene/butene copolymer-polyethylene-ethylene/octene copolymer, ethylene/butene copolymer-polyethylene-ata-polypropylene, ethylene/butene copolymer-polyethylene-syn-polypropylene, ethylene/butene copolymer-polyethylene-propylene/butene copolymer, ethylene/butene copolymer-polyethylene-propylene/hexene copolymer, ethylene/butene copolymer-HDPE-ethylene/hexene copolymer, ethylene/butene copolymer-HDPE-ethylene/octene copolymer, ethylene/butene copolymer-HDPE-ata-polypropylene, ethylene/butene copolymer-HDPE-syn-polypropylene, ethylene/butene copolymer-HDPE-propylene/butene copolymer, ethylene/butene copolymer-HDPE-propylene/hexene copolymer, ethylene/butene copolymer-LLDPE-ethylene/hexene copolymer, ethylene/butene copolymer-LLDPE-ethylene/octene copolymer, ethylene/butene copolymer-LLDPE-ata-polypropylene, ethylene/butene copolymer-LLDPE-syn-polypropylene, ethylene/butene copolymer-LLDPE-propylene/butene copolymer, ethylene/butene copolymer-LLDPE-propylene/hexene copolymer, ethylene/butene copolymer-ethylene/propylene copolymer-ethylene/hexene copolymer, ethylene/butene copolymer-ethylene/propylene copolymer-ethylene/octene copolymer, ethylene/butene copolymer-ethylene/propylene copolymer-ata-polypropylene, ethylene/butene copolymer-ethylene/propylene copolymer-syn-polypropylene, ethylene/butene copolymer-ethylene/propylene copolymer-propylene/butene copolymer, ethylene/butene copolymer-ethylene/propylene copolymer-propylene/hexene copolymer, ethylene/butene copolymer-ethylene/hexene copolymer-ethylene/octene copolymer, ethylene/butene copolymer-ethylene/hexene copolymer-ata-polypropylene, ethylene/butene copolymer-ethylene/hexene copolymer-syn-polypropylene, ethylene/butene copolymer-ethylene/hexene copolymer-propylene/butene copolymer, ethylene/butene copolymer-ethylene/hexene copolymer-propylene/hexene copolymer, ethylene/butene copolymer-ethylene/octene copolymer-ethylene/hexene copolymer, ethylene/butene copolymer-ethylene/octene copolymer-ata-polypropylene, ethylene/butene copolymer-ethylene/octene copolymer-syn-polypropylene, ethylene/butene copolymer-ethylene/octene copolymer-propylene/butene copolymer, ethylene/butene copolymer-ethylene/octene copolymer-propylene/hexene copolymer, ethylene/butene copolymer-ata-polypropylene-ethylene/hexene copolymer, ethylene/butene copolymer-ata-polypropylene-ethylene/octene copolymer, ethylene/butene copolymer-ata-polypropylene-syn-polypropylene, ethylene/butene copolymer-ata-polypropylene-propylene/butene copolymer, ethylene/butene copolymer-ata-polypropylene-propylene/hexene copolymer, ethylene/butene copolymer-syn-polypropylene-ethylene/hexene copolymer, ethylene/butene copolymer-syn-polypropylene-ethylene/octene copolymer, ethylene/butene copolymer-syn-polypropylene-ata-polypropylene, ethylene/butene copolymer-syn-polypropylene-propylene/butene copolymer, ethylene/butene copolymer-syn-polypropylene-propylene/hexene copolymer, ethylene/butene copolymer-propylene/butene copolymer-ethylene/hexene copolymer, ethylene/butene copolymer-propylene/butene copolymer-ethylene/octene copolymer, ethylene/butene copolymer-propylene/butene copolymer-ata-polypropylene, ethylene/butene copolymer-propylene/butene copolymer-syn-polypropylene, ethylene/butene copolymer-propylene/butene copolymer-propylene/hexene copolymer, ethylene/butene copolymer-propylene/hexene copolymer-ethylene/hexene ethylene/hexene copolymer, ethylene/butene copolymer-propylene/hexene copolymer-ethylene/octene copolymer, ethylene/butene copolymer-propylene/hexene copolymer-ata-polypropylene, ethylene/butene copolymer-propylene/hexene copolymer-syn-polypropylene, ethylene/butene copolymer-propylene/hexene copolymer-propylene/butene copolymer, ethylene/hexene copolymer-polyethylene-ethylene/octene copolymer ethylene/hexene copolymer-polyethylene-ata-polypropylene, ethylene/hexene copolymer-polyethylene-syn-polypropylene, ethylene/hexene copolymer-polyethylene-propylene/butene copolymer, ethylene/hexene copolymer-polyethylene-propylene/hexene copolymer, ethylene/hexene copolymer-HDPE-ethylene/octene copolymer, ethylene/hexene copolymer-HDPE-ata-polypropylene, ethylene/hexene copolymer-HDPE-syn-polypropylene, ethylene/hexene copolymer-HDPE-propylene/butene copolymer, ethylene/hexene copolymer-HDPE-propylene/hexene copolymer, ethylene/hexene copolymer-LLDPE-ethylene/octene copolymer, ethylene/hexene copolymer-LLDPE-ata-polypropylene, ethylene/hexene copolymer-LLDPE-syn-polypropylene, ethylene/hexene copolymer-LLDPE-propylene/butene copolymer, ethylene/hexene copolymer-LLDPE-propylene/hexene copolymer, ethylene/hexene copolymer-ethylene/propylene copolymer-ethylene/octene copolymer, ethylene/hexene copolymer-ethylene/propylene copolymer-ata-polypropylene, ethylene/hexene copolymer-ethylene/propylene copolymer-syn-polypropylene, ethylene/hexene copolymer-ethylene/propylene copolymer-propylene/butene copolymer, ethylene/hexene copolymer-ethylene/propylene copolymer-propylene/hexene copolymer, ethylene/hexene copolymer-ethylene/butene copolymer-ethylene/octene copolymer, ethylene/hexene copolymer-ethylene/butene copolymer-ata-polypropylene, ethylene/hexene copolymer-ethylene/butene copolymer-syn-polypropylene, ethylene/hexene copolymer-ethylene/butene copolymer-propylene/butene copolymer, ethylene/hexene copolymer-ethylene/butene copolymer-propylene/hexene copolymer, ethylene/hexene copolymer-ethylene/octene copolymer-ata-polypropylene, ethylene/hexene copolymer-ethylene/octene copolymer-syn-polypropylene, ethylene/hexene copolymer-ethylene/octene copolymer-propylene/butene copolymer, ethylene/hexene copolymer-ethylene/octene copolymer-propylene/hexene copolymer, ethylene/hexene copolymer-ata-polypropylene-ethylene/octene copolymer, ethylene/hexene copolymer-ata-polypropylene-syn-polypropylene, ethylene/hexene copolymer-ata-polypropylene-propylene/butene copolymer, ethylene/hexene copolymer-ata-polypropylene-propylene/hexene copolymer, ethylene/hexene copolymer-syn-polypropylene-ethylene/octene copolymer, ethylene/hexene copolymer-syn-polypropylene-ata-polypropylene, ethylene/hexene copolymer-syn-polypropylene-propylene/butene copolymer, ethylene/hexene copolymer-syn-polypropylene-propylene/hexene copolymer, ethylene/hexene copolymer-polypropylene/butene copolymer-ethylene/octene copolymer, ethylene/hexene copolymer-polypropylene/butene copolymer-ata-polypropylene, ethylene/hexene copolymer-polypropylene/butene copolymer-syn-polypropylene, ethylene/hexene copolymer-polypropylene/butene copolymer-propylene/hexene copolymer, ethylene/hexene copolymer-polypropylene/hexene copolymer-ethylene/octene copolymer, ethylene/hexene copolymer-polypropylene/hexene copolymer-ata-polypropylene, ethylene/hexene copolymer-polypropylene/hexene copolymer-syn-polypropylene, ethylene/hexene copolymer-polypropylene/hexene copolymer-propylene/butene copolymer, ethylene/octene copolymer-polyethylene-ata-polypropylene, ethylene/octene copolymer-polyethylene-syn-polypropylene, ethylene/octene copolymer-polyethylene-propylene/butene copolymer, ethylene/octene copolymer-polyethylene-propylene/hexene copolymer, ethylene/octene copolymer-HDPE-ata-polypropylene, ethylene/octene copolymer-HDPE-syn-polypropylene, ethylene/octene copolymer-HDPE-propylene/butene copolymer, ethylene/octene copolymer-HDPE-propylene/hexene copolymer, ethylene/octene copolymer-LLDPE-ata-polypropylene, ethylene/octene copolymer-LLDPE-syn-polypropylene, ethylene/octene copolymer-LLDPE-propylene/butene copolymer, ethylene/octene copolymer-LLDPE-propylene/hexene copolymer, ethylene/octene copolymer-ethylene/propylene copolymer-ata-polypropylene, ethylene/octene copolymer-ethylene/propylene copolymer-syn-polypropylene, ethylene/octene copolymer-ethylene/propylene copolymer-propylene/butene copolymer, ethylene/octene copolymer-ethylene/propylene copolymer-propylene/hexene copolymer, ethylene/octene copolymer-ethylene/butene copolymer-ata-polypropylene, ethylene/octene copolymer-ethylene/butene copolymer-syn-polypropylene, ethylene/octene copolymer-ethylene/butene copolymer-propylene/butene copolymer, ethylene/octene copolymer-ethylene/butene copolymer-propylene/hexene copolymer, ethylene/octene copolymer-ethylene/hexene copolymer-ata-polypropylene, ethylene/octene copolymer-ethylene/hexene copolymer-syn-polypropylene, ethylene/octene copolymer-ethylene/hexene copolymer-propylene/butene copolymer, ethylene/octene copolymer-ethylene/hexene copolymer-propylene/hexene copolymer, ethylene/octene copolymer-ata-polypropylene-syn-polypropylene, ethylene/octene copolymer-ata-polypropylene-propylene/butene copolymer, ethylene/octene copolymer-ata-polypropylene-propylene/hexene copolymer, ethylene/octene copolymer-syn-polypropylene-ata-polypropylene, ethylene/octene copolymer-syn-polypropylene-propylene/butene copolymer, ethylene/octene copolymer-syn-polypropylene-propylene/hexene copolymer, ethylene/octene copolymer-propylene/butene copolymer-ata-polypropylene, ethylene/octene copolymer-propylene/butene copolymer-syn-polypropylene, ethylene/octene copolymer-propylene/butene copolymer-propylene/hexene copolymer, ethylene/octene copolymer-propylene/hexene copolymer-ata-polypropylene, ethylene/octene copolymer-propylene/hexene copolymer-syn-polypropylene, ethylene/octene copolymer-propylene/hexene copolymer-propylene/butene copolymer, ata-polypropylene-polyethylene-syn-polypropylene, ata-polypropylene-polyethylene-propylene/butene copolymer, ata-polypropylene-polyethylene-propylene/hexene copolymer, ata-polypropylene-HDPE-syn-polypropylene, ata-polypropylene-HDPE-propylene/butene copolymer, ata-polypropylene-HDPE-propylene/hexene copolymer, ata-polypropylene-ethylene/octene copolymer,syn-polypropylene, ata-polypropylene-ethylene/octene copolymer-propylene/butene copolymer, ata-polypropylene-ethylene/octene copolymer-propylene/hexene copolymer, ata-polypropylene-ethylene/propylene copolymer-syn-polypropylene, ata-polypropylene-ethylene/propylene copolymer-propylene/butene copolymer, ata-polypropylene-ethylene/propylene copolymer-propylene/hexene copolymer, ata-polypropylene-ethylene/butene copolymer-syn-polypropylene, ata-polypropylene-ethylene/butene copolymer-propylene/butene copolymer, ata-polypropylene-ethylene/butene copolymer-propylene/hexene copolymer, ata-polypropylene-ethylene/hexene copolymer-syn-polypropylene, ata-polypropylene-ethylene/hexene copolymer-propylene/butene copolymer, ata-polypropylene-ethylene/hexene copolymer-propylene/hexene copolymer, ata-polypropylene-ethylene/octene copolymer-syn-polypropylene, ata-polypropylene-ethylene/octene copolymer-propylene/butene copolymer, ata-polypropylene-ethylene/octene copolymer-propylene/hexene copolymer, ata-polypropylene-syn-polypropylene-propylene/butene copolymer, ata-polypropylene-syn-polypropylene-propylene/hexene copolymer, ata-polypropylene-propylene/butene copolymer-syn-polypropylene, ata-polypropylene-propylene/butene copolymer-propylene/hexene copolymer, ata-polypropylene-propylene/hexene copolymer-syn-polypropylene, ata-polypropylene-propylene/hexene copolymer-propylene/butene copolymer, syn-polypropylene-polyethylene-propylene/butene copolymer, syn-polypropylene-polyethylene-propylene/hexene copolymer, syn-polypropylene-HDPE-propylene/butene copolymer, syn-polypropylene-HDPE-propylene/hexene copolymer, syn-polypropylene-LLDPE-propylene/butene copolymer, syn-polypropylene-LLDPE-propylene/hexene copolymer, syn-polypropylene-ethylene/propylene copolymer-propylene/butene copolymer, syn-polypropylene-ethylene/propylene copolymer-propylene/hexene copolymer, syn-polypropylene-ethylene/butene copolymer-propylene/butene copolymer, syn-polypropylene-ethylene/butene copolymer-propylene/hexene copolymer, syn-polypropylene-ethylene/hexene copolymer-propylene/butene copolymer, syn-polypropylene-ethylene/hexene copolymer-propylene/hexene copolymer, syn-polypropylene-ethylene/octene copolymer-propylene/butene copolymer, syn-polypropylene-ethylene/octene copolymer-propylene/hexene copolymer, syn-polypropylene-ata-polypropylene-propylene/butene copolymer, syn-polypropylene-ata-polypropylene-propylene/hexene copolymer, syn-polypropylene-propylene/butene copolymer-propylene/hexene copolymer, syn-polypropylene-propylene/hexene copolymer-propylene/butene copolymer, propylene/butene copolymer-polyethylene-propylene/hexene copolymer, propylene/butene copolymer-HDPE-propylene/hexene copolymer, propylene/butene copolymer-LLDPE-propylene/hexene copolymer, propylene/butene copolymer-ethylene/propylene copolymer-propylene/hexene copolymer, propylene/butene copolymer-ethylene/butene copolymer-propylene/hexene copolymer, propylene/butene copolymer-ethylene/hexene copolymer-propylene/hexene copolymer, propylene/butene copolymer-ethylene/octene copolymer-propylene/hexene copolymer, propylene/butene copolymer-ata-polypropylene-propylene/hexene copolymer, and propylene/butene copolymer-syn-polypropylene-propylene/hexene copolymer.

Of these block copolymers, particularly preferable are polyethylene-polypropylene, polyethylene-ethylene/propylene copolymer, polyethylene-ethylene/propylene copolymer-polypropylene, polyethylene-ethylene/propylene copolymer-LLDPE, polyethylene-ethylene/butene copolymer, polyethylene-ethylene/butene copolymer-LLDPE, polypropylene-ethylene/propylene copolymer, and polyethylene-LLDPE-HDPE, polyethylene-LLDPE.

The olefin block copolymer of the invention may be bonded to other structural parts within limits not detrimental to the objects of the invention, with the proviso that it has the above structure. The polymer of the invention may be a graft modified polymer.

The olefin copolymer can be favorably used for various molding materials for films, sheets and blow molded products, various additives such as compatibilizing agent and modifier, coating materials and adhesives. The use application will be described later.

The process for preparing the olefin block copolymer of the invention will be described later.

The olefin block copolymer of the invention may have a functional group at the terminal of the main chain. Examples of the functional groups include the same groups as previously described.

The olefin block copolymer having a functional group at the terminal of the main chain can be favorably used for various additives such as compatibilizing agent and modifier, coating materials and adhesives. The use application will be described later.

The process for preparing the olefin block copolymer having a functional group at the terminal of the main chain will be described later.

Next, the process for preparing an olefin polymer according to the invention is described.

The process for preparing an olefin polymer according to the invention uses an olefin polymerization catalyst comprising the below-described transition metal compound (A), preferably an olefin polymerization catalyst comprising:

(A) the below-described transition metal compound, and (B) at least one compound selected from:

(B-1) an organometallic compound, (B-2) an organoaluminum oxy-compound, and (B-3) a compound which reacts with the transition metal compound (A) to form an ion pair.

First, the components for forming the olefin polymerization catalyst used in the invention are described.

(A) Transition Metal Compound

The transition metal compound (A) for use in the invention is a compound which is represented by the following formula (I) and has properties that, in a β-agostic structure of a cationic complex wherein X in the formula (I) is replaced with a n-propyl group, said structure being measured by a density functional method, the distance (r value) between the heteroatom (Z), which has no direct bond to the central metal M and is nearest to the central metal M, and hydrogen at the β-position is not more than 3.0 Å and the electrostatic energy is not more than 10 kJ/mol.

The "density functional method" means calculation using a program ADF2000.01 (developed by SCM Co. (Netherlands), obtained by making a license contract with SCM Co. and then downloading the program from the home page (html://www.scm.com) of SCM Co.) and using BLYP method. As the basis function, a Slater type orbital function is used. As for the structure, a function of Triple zeta type is used for the central metal, and a function of Double zeta type is used for other atoms, however, in the electrostatic energy evaluation, a function of Double Zeta type added with a polarization function is used for other atoms. The basis function is used also for the single-point calculation of the optimum structure obtained by structural calculation. In calculations other than the structural calculation, corrections of Pauli's relativistic potentials are made. The "electrostatic energy" means an electrostatic energy between hydrogen at the β-position and the nearest heteroatom. More specifically, the electrostatic energy is an interatomic electrostatic interaction based on the electronic state obtained by assigning electrons obtained by the complex calculation to those two atoms. The electron referred to herein is each electron population of s, p, d orbitals of the two atoms obtained by the complex calculation (single-point calculation in the β-agostic optimum structure obtained after the structural calculation).

$$L_mMX_n \quad (I)$$

In the formula (I), M is a transition metal atom selected from Group 3 to Group 11 of the periodic table, preferably a transition metal atom selected from Group 4 to Group 5, more preferably a transition metal atom of Group 4, specifically titanium, zirconium or hafnium, particularly preferably titanium.

m is an integer of 1 to 6.

L is a ligand coordinated to the central metal M and is an organic or inorganic ligand having at least one heteroatom (Z) which has no direct bond to the central metal M.

Examples of ligand skeletons include cyclopentadienyl skeleton, acetylacetonato skeleton, phenoxy skeleton, amido skeleton, imido skeleton and ligand skeleton which forms the later-described transition metal compound represented by the formula (II-a), (II-b) or (III).

The ligand skeleton represented by the formula (II-a) includes ligand skeleton of the formula (II-a) wherein $R^1$ is a hydrocarbon group and any one of $R^3$ and $R^4$ has the later-described heteroatom or heteroatom-containing group, namely, ligand skeleton wherein at least one of $R^1$, $R^3$ and $R^4$ has the later-described heteroatom or heteroatom-containing group.

The ligand skeleton represented by the formula (II-b) includes ligand skeleton of the formula (II-b) wherein $R^1$ is a hydrocarbon group and any one of $R^6$, $R^7$, $R^8$ and $R^9$ has the later-described heteroatom or heteroatom-containing group, namely, ligand skeleton wherein at least one of $R^1$, $R^6$, $R^7$, $R^8$ and $R^9$ has the later-described heteroatom or heteroatom-containing group.

The ligand skeleton represented by the formula (III) includes ligand skeleton of the formula (III) wherein $R^{10}$ is a hydrocarbon group and any one of $R^{11}$, $R^{12}$, $R^{13}$, $R^{14}$ and $R^{15}$ has the later-described heteroatom or heteroatom-containing group, namely, ligand skeleton wherein at least one of $R^{11}$, $R^{12}$, $R^{13}$, $R^{14}$ and $R^{15}$ has the later-described heteroatom or heteroatom-containing group.

The heteroatom is a nonmetal atom other than a carbon atom and a hydrogen atom, and examples thereof include atoms of halogen, nitrogen, oxygen, phosphorus, sulfur and selenium.

n is a number satisfying a valence of M.

X is an oxygen atom, a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group. Plural groups indicated by X may be bonded to form a ring.

When n is 2 or greater, plural groups indicated by X may be the same or different.

Examples of the halogen atoms include fluorine, chlorine, bromine and iodine.

Examples of the hydrocarbon groups include alkyl groups, such as methyl, ethyl, propyl, butyl, hexyl, octyl, nonyl, dodecyl and eicosyl; cycloalkyl groups of 3 to 30 carbon atoms, such as cyclopentyl, cyclohexyl, norbornyl and adamantly; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthryl and phenanthryl. In the hydrocarbon groups, halogenated hydrocarbons, such as groups wherein at least one hydrogen is replaced with a halogen in hydrocarbon groups of 1 to 20 carbon atoms, are also included.

The oxygen-containing group is, for example, a group containing 1 to 5 oxygen atoms, but the later-described heterocyclic compound residue is not included in this group. A group containing a nitrogen atom, a sulfur atom, a phosphorus atom, a halogen atom or a silicon atom, said atom being directly bonded to the oxygen atom, is not included either. Examples of the oxygen-containing groups include hydroxyl group; alkoxy groups, such as methoxy, ethoxy, propoxy and butoxy; aryloxy groups, such as phenoxy, methylphenoxy, dimethylphenoxy and naphthoxy; arylalkoxy groups, such as phenylmethoxy and phenylethoxy; acetoxy group; and carbonyl group. When the oxygen-containing group contains carbon atom, the number of carbon atoms is in the range of usually 1 to 30, preferably 1 to 20.

The sulfur-containing group is, for example, a group containing 1 to 5 sulfur atoms, but the later-described heterocyclic compound residue is not included in this group. Examples of the sulfur-containing groups include sulfonato groups, such as methylsulfonato, trifluromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; sulfinato groups, such as methylsulfinato, phenylsulfinato, benzylsulfinato, p-toluenesulfinato, trimethylbenzenesulfinato and pentaflurobenzenesulfinato; alkylthio groups; and arylthio groups. When the sulfur-containing group contains carbon atom, the number of carbon atoms is in the range of usually 1 to 30, preferably 1 to 20.

The nitrogen-containing group is a group containing 1 to 5 nitrogen atoms, but the later-described heterocyclic compound residue is not included in this group. Examples of the nitrogen-containing groups include amino group; alkylamino groups, such as methylamino, dimethylamino, diethylamino, dipropylamino and dibutylamino, dicyclohexylamino; and arylamino or alkylarylamino groups, such as phenylamino, diphenylamino, ditolylamino, dinaphthylamino and methylphenylamino.

The boron-containing group is, for example, a group containing 1 to 5 boron atoms, but the later-described heterocyclic compound residue is not included in this group. An example of the boron-containing group is $BR_4$ (R is hydrogen, an alkyl group, an aryl group which may have a substituent, a halogen atom or the like).

The aluminum-containing group is, for example, a group containing 1 to 5 aluminum atoms. An example of the aluminum-containing group is $AlR_4$ (R is hydrogen, an alkyl group, an aryl group which may have a substituent, a halogen atom or the like).

The phosphorus-containing group is, for example, a group containing 1 to 5 phosphorus atoms, but the later-described heterocyclic compound residue is not included in this group. Examples of the phosphorus-containing groups include trialkylphosphine groups, such as trimethylphosphine, tributylphosphine and tricyclohexylphosphine; triarylphosphine groups, such as triphenylphosphine and tritolylphosphine; phosphite groups (phosphido groups), such as methylphosphite, ethylphosphite and phenylphosphite; phosphonic acid group; and phosphinic acid group.

Examples of the halogen-containing groups ninclude fluorine-containing groups, such as $PF_6$ and $BF_4$; chlorine-containing groups, such as $ClO_4$ and $SbCl_6$; and iodine-containing groups, such as $IO_4$.

Examples of the heterocyclic compound residues include residues of nitrogen-containing groups such as pyrrole, pyridine, pyrimidine, quinoline and triazine; residues of oxygen-containing groups such as furan and pyran; residues of sulfur-containing groups such as thiophene; and groups wherein these heterocyclic compound residues are further substituted with substituents such as alkyl groups of 1 to 30 carbon atoms, preferably 1 to 20 carbon atoms, or alkoxy groups.

The silicon-containing group is, for example, a group containing 1 to 5 silicon atoms. Examples of the silicon-containing groups include hydrocarbon-substituted silyl groups, such as phenylsilyl, diphenylsilyl, trimethylsilyl, triethylsilyl, tripropylsilyl, tricyclohexylsilyl, triphenylsilyl, methyldiphenylsilyl, tritolylsilyl and trinaphthylsilyl; hydrocarbon-substituted silyl ether groups, such as trimethylsilyl ether; silicon-substituted alkyl groups, such as trimethylsilylmethyl; and silicon-substituted aryl groups, such as trimethylsilylphenyl. When the silicon-containing group contains carbon atom, the number of carbon atoms is in the range of usually 1 to 30, preferably 1 to 20.

Examples of the germanium-containing groups include groups wherein silicon is replaced with germanium in the above-mentioned silicon-containing groups.

Examples of the tin-containing groups include groups wherein silicon is replaced with tin in the above-mentioned silicon-containing groups.

As the transition metal compound (A) for use in the invention, a compound represented by the following formula (II-a) or (II-b) is available.

(II-a)

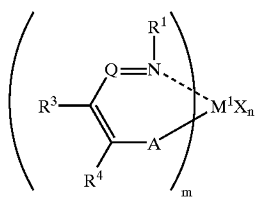

wherein N—$M^1$ generally means that they are coordinated to each other, but in the present invention they are not always coordinated.

In the formula (II-a), $M^1$ is a transition metal atom selected from Group 3 to Group 11 of the periodic table, preferably a transition metal atom of Group 4 to Group 5, specifically titanium, zirconium, hafnium, vanadium, niobium, tantalum or the like, more preferably a transition metal atom of Group 4, specifically titanium, zirconium or hafnium, still more preferably titanium.

Q is a nitrogen atom or a carbon atom having a substituent $R^2$ (—C($R^2$)═).

A is an oxygen atom, a sulfur atom, a selenium atom or a nitrogen atom having a substituent $R^5$ (—N($R^5$)—).

$R^1$ is a hydrocarbon group having at least one heteroatom or a hydrocarbon group having at least one heteroatom-containing group. Examples of the heteroatoms include atoms of halogen, nitrogen, oxygen, phosphorus, sulfur and selenium. The heteroatom-containing group is a group containing a nonmetal atom other than a carbon atom and a hydrogen atom, and examples thereof include an oxygen-containing group, a nitrogen-containing group, a sulfur-containing group, a phosphorus-containing group, a halogen atom-containing group and a heterocyclic compound residue. Examples of the oxygen-containing groups, the nitrogen-containing groups, the sulfur-containing groups, the phosphorus-containing groups and the heterocyclic compound residues include the same groups as previously described with respect to X in the formula (I). Examples of the halogen-containing groups include groups wherein at least one hydrogen is replaced with halogen in the hydrocarbon groups of 1 to 30 carbon atoms, preferably 1 to 20 carbon atoms, such as alkyl groups (e.g., methyl, ethyl, propyl, butyl, hexyl, octyl, nonyl, dodecyl and eicosyl), cycloalkyl groups of 3 to 30 carbon atoms (e.g., cyclopentyl, cyclohexyl, norbornyl and adamantly), alkenyl groups (e.g., vinyl, propenyl and cyclohexenyl), arylalkyl groups (e.g., benzyl, phenylethyl and phenylpropyl) and aryl groups (e.g., phenyl, tolyl, dimethylphenyl, trimethylphenyl, ethylphenyl, propylphenyl, biphenylyl, naphthyl, methylnaphthyl, anthryl and phenanthryl). Specific examples of such groups include trifluoromethyl, perfluoroethyl, pentafluorophenyl, perfluorohexyl, trichloromethyl, perchloroethyl, pentachlorophenyl and perchlorohexyl.

$R^1$ is preferably a halogen atom-containing hydrocarbon group of 1 to 30 carbon atoms, particularly preferably a fluorine-containing hydrocarbon group of 1 to 30 carbon atoms.

Specifically, $R^1$ is trifluromethyl, perfluoroethyl, perfluoropropyl, perfluorobutyl, perfluoropentyl, perfluorohexyl, perfluoroheptyl, perfluorooctyl, perfluorodecyl, 1H,1H-perfluoropropyl, 1H,1H-perfluorobutyl, 1H,1H-perfluoropentyl, 1H,1H-perfluorohexyl, 1H,1H-perfluoroheptyl, 1H,1H-perfluorooctyl, 1H,1H-perfluorodecyl, perfluorocyclohexyl, trifluoromethylcyclohexyl, bis(trifluoromethyl)cyclohexyl, trifluoromethylfluorocyclohexyl, monofluorophenyl, difluorophenyl, trifluorophenyl, tetrafluorophenyl, pentafluorophenyl, (trifluoromethyl)pentafluorophenyl, (trifluoromethyl)fluorophenyl, trifluoromethylphenyl, bis (trifluoromethyl)phenyl, tris(trifluoromethyl)phenyl, tetrakis(trifluoromethyl)phenyl, pentakis(trifluoromethyl) phenyl, perfluoroethylphenyl, bis(perfluoroethyl)phenyl, perfluoropropylphenyl, perfluorobutylphenyl, perfluoropentylphenyl, perfluorohexylphenyl, bis (perfluorohexyl)phenyl, perfluoronaphthyl, perfluorophenanthryl, perfluoroanthryl, (trifluoromethyl) tetrafluorophenyl or the like.

$R^2$ to $R^5$ may be the same or different and are each a hydrogen atom, a halogen atom, a hydrocarbon group, a hydrocarbon-substituted silyl group, an oxygen-containing group, a nitrogen-containing group, a sulfur-containing group, a boron-containing group, an aluminum-containing group, a phosphorus-containing group, a halogen-containing group, a heterocyclic compound residue, a silicon-containing group, a germanium-containing group or a tin-containing group. Two or more of $R^2$ to $R^5$ may be bonded to form a ring.

Examples of the boron-containing groups, the aluminum-containing groups, the phosphorus-containing groups, the halogen-containing groups, the heterocyclic compound residues, the silicon-containing groups, the germanium-containing groups and the tin-containing groups indicated by $R^2$ to $R^5$ include the same groups as previously described with respect to X in the formula (I).

Examples of the halogen-containing groups indicated by $R^2$ to $R^5$ include the same groups as previously described with respect to $R^1$ in the formula (II-a).

Examples of the hydrocarbon groups indicated by $R^2$ to $R^5$ include those of 1 to 30 carbon atoms. Specifically, there can be mentioned straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl; straight-chain or branched alkenyl groups of 2 to 30 carbon atoms, preferably 2 to 20 carbon atoms, such as vinyl, allyl and isopropenyl; straight-chain or branched alkynyl groups of 2 to 30 carbon atoms, preferably 2 to 20 carbon atom, such as ethynyl and propargyl; cyclic saturated hydrocarbon groups of 3 to 30 carbon atoms, preferably 3 to 20 carbon atoms, such as cyclopropyl, cyclobutyl, cyclopentyl, cyclohexyl and adamantyl; cyclic unsaturated hydrocarbon groups of 5 to 30 carbon atoms, such as cyclopentadienyl, indenyl and fluorenyl; aryl groups of 6 to 30 carbon atoms, preferably 6 to 20 carbon atoms, such as phenyl, benzyl, naphthyl, biphenylyl, terphenylyl, phenanthryl and anthryl; and alkyl-substituted aryl groups, such as tolyl, iso-propylphenyl, t-butylphenyl, dimethylphenyl and di-t-butylphenyl.

The above-mentioned hydrocarbon groups may be substituted with other hydrocarbon groups, and examples of such groups include alkyl groups substituted with aryl groups such as benzyl and cumyl.

Examples of the hydrocarbon-substituted silyl groups indicated by $R^2$ to $R^5$ include those of 1 to 30 carbon atoms. Specifically, there can be mentioned methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl and dimethyl (pentafluorophenyl)silyl. Of these, preferable are methylsilyl, dimethylsilyl, trimethylsilyl, ethylsilyl, diethylsilyl, triethylsilyl, dimethylphenylsilyl and triphenylsilyl. Particularly preferable are trimethylsilyl, triethylsilyl, triphenylsilyl and dimethylphenylsilyl.

Examples of the oxygen-containing groups indicated by $R^2$ to $R^5$ include the same groups as previously described with respect to X in the formula (I).

Examples of the nitrogen-containing groups indicated by $R^2$ to $R^5$ include the same groups as previously described with respect to X in the formula (I).

Examples of the sulfur-containing groups indicated by $R^2$ to $R^5$ include the same groups as previously described with respect to X in the formula (I).

$R^2$ to $R^5$ are each preferably a hydrogen atom, a halogen atom, a hydrocarbon group, a hydrocarbon-substituted silyl group, an oxygen-containing group, a nitrogen-containing group, a sulfur-containing group or a halogen-containing group, more preferably a hydrogen atom, a halogen atom, a hydrocarbon group, a hydrocarbon-substituted silyl group or a halogen-containing group.

Examples of the halogen atoms and the halogen-containing groups indicated by $R^2$ to $R^5$ include the same atoms and groups as previously described with respect to $R^1$ in the formula (II-a).

n is a number satisfying a valence of $M^1$, specifically an integer of 2 to 4, preferably 2.

X is an oxygen atom, a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group. Examples of such atoms and groups include the same atoms and groups as previously described with respect to X in the formula (I).

When n is 2 or greater, plural groups indicated by X may be the same or different, and plural groups indicated by X may be bonded to form a ring.

(II-b)

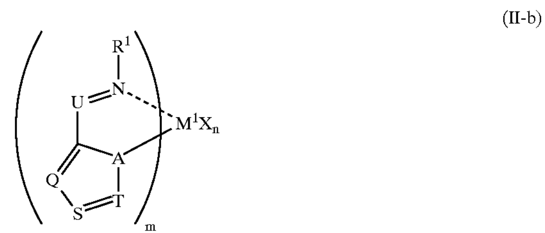

wherein N—$M^1$ generally means that they are coordinated to each other, but in the present invention they are not always coordinated.

In the formula (II-b), $M^1$ is a transition metal atom selected from Group 3 to Group 11 of the periodic table, preferably a transition metal atom of Group 4 to Group 5, specifically titanium, zirconium, hafnium, vanadium, niobium, tantalum or the like, more preferably a transition metal atom of Group 4, specifically titanium, zirconium or hafnium, still more preferably titanium.

m is an integer of 1 to 5, preferably 2 to 4, more preferably 2.

A is a nitrogen atom or a phosphorus atom.

U is a carbon atom having a substituent $R^6$ (—C($R^6$)═), a nitrogen atom or a phosphorus atom.

Q is a carbon atom having a substituent $R^7$ (—C($R^7$)═), a nitrogen atom or a phosphorus atom.

S is a carbon atom having a substituent $R^8$ (—C($R^8$)═), a nitrogen atom or a phosphorus atom.

T is a carbon atom having a substituent $R^9$ (—C($R^9$)═), a nitrogen atom or a phosphorus atom.

$R^1$ is a hydrocarbon group having one or more heteroatoms or a hydrocarbon group having one or more heteroatom-containing groups, and has the same meaning as that of $R^1$ in the formula (II-a).

$R^6$ to $R^9$ may be the same or different and are each a hydrogen atom, a halogen atom, a hydrocarbon group, a hydrocarbon-substituted silyl group, an oxygen-containing group, a nitrogen-containing group, a sulfur-containing group, a boron-containing group, an aluminum-containing group, a phosphorus-containing group, a halogen-containing group, a heterocyclic compound residue, a silicon-containing group, a germanium-containing group or a tin-containing group. Examples of the hydrocarbon groups and the hydrocarbon-substituted silyl groups include the same groups as previously described with respect to $R^2$ to $R^5$ in the formula (II-a). Examples of the oxygen-containing groups, the nitrogen-containing groups, the sulfur-containing groups, the nitrogen-containing group, the boron-containing groups, the aluminum-containing groups, the phosphorus-containing groups, the halogen-containing groups, the heterocyclic compound residues, the silicon-containing groups, the germanium-containing groups and the tin-containing groups include the same groups as previously described with respect to X in the formula (I).

$R^6$ to $R^9$ are each preferably a hydrogen atom, a halogen atom, a hydrocarbon group, a hydrocarbon-substituted silyl group, an oxygen-containing group, a nitrogen-containing group, a sulfur-containing group or a halogen-containing group, more preferably a hydrogen atom, a halogen atom, a hydrocarbon group, a hydrocarbon-substituted silyl group or a halogen-containing group.

Two or more of $R^6$ to $R^9$ may be bonded to form a ring, and when m is 2 or greater, $R^1$s, $R^6$s, $R^7$s, $R^8$s and $R^9$s may be the same or different, and one group of $R^6$ to $R^9$ contained in one ligand and one group of $R^6$ to $R^9$ contained in other ligands may be bonded.

n is a number satisfying a valence of $M^1$.

X is an oxygen atom, a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group. Examples of such atoms and groups include the same atoms and groups as previously described with respect to X in the formula (I).

When n is 2 or greater, plural groups indicated by X may be the same or different, and plural groups indicated by X may be bonded to form a ring.

Similarly to the transition metal compound represented by the formula (I), the transition metal compound (A) represented by the formula (II-a) or (II-b) preferably has properties that the distance between the heteroatom, which has no direct bond to the central metal M and is nearest to the central metal M, and hydrogen at the β-position is not more than 3.0 Å and the electrostatic energy is not more than 10 kJ/mol.

Of the transition metal compounds represented by the formula (II-a) or (II-b), a transition metal compound represented by the following formula (II-a') or (II-b') and having the following structure as $R^1$ is preferable as the transition metal compound (A) for use in the invention.

(II-a)'

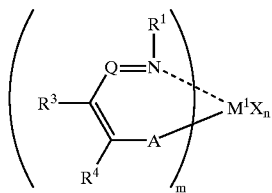

wherein N—$M^1$ generally means that they are coordinated to each other, but in the present invention they are not always coordinated.

In the formula (II-a'), $M^1$ is a transition metal atom selected from Group 3 to Group 11 of the periodic table, preferably a transition metal atom of Group 4 to Group 5, specifically titanium, zirconium, hafnium, vanadium, niobium, tantalum or the like, more preferably a transition metal atom of Group 4, specifically titanium, zirconium or hafnium, still more preferably titanium.

Q is a nitrogen atom or a carbon atom having a substituent $R^2$ (—C($R^2$)═).

A is an oxygen atom, a sulfur atom, a selenium atom or a nitrogen atom having a substituent $R^5$ (—C($R^5$)—).

$R^1$ is a phenyl group having at least one substituent selected from a heteroatom and a heteroatom-containing groups, an aromatic hydrocarbon group other than a phenyl group, an aliphatic hydrocarbon group or an alicyclic hydrocarbon group. When $R^1$ is a phenyl group and the position of the carbon atom bonded to a nitrogen atom is the 1-position, the phenyl group desirably has, at at least one position of the 2-position and the 6-position, at least one substituent selected from a heteroatom and a heteroatom-containing group, or has, at the 3-position, the 4-position and the 5-position, at least one substituent selected from a heteroatom other than a fluorine atom, a fluorine-containing group containing one carbon atom and not more than two fluorine atoms, a fluorine-containing group containing two or more carbon atoms and a heteroatom-containing group having a heteroatom other than a fluorine atom. When $R^1$ is an aromatic hydrocarbon group other than a phenyl group, an aliphatic hydrocarbon group or an alicyclic hydrocarbon group, this group has one or more substituents selected from heteroatoms and heteroatom-containing groups.

Examples of the heteroatoms and the heteroatom-containing groups indicated by $R^1$ include the same atoms and groups as previously described with respect to $R^1$ in the formula (II-a).

In the transition metal compound represented by the formula (II-a'), when the position of the carbon atom bonded to a nitrogen atom is the 1-position, $R^1$ is preferably a fluorine-containing hydrocarbon group of 1 to 30 carbon atoms which is selected from a phenyl group having, at at least one position of the 2-position and the 6-position, at least one substituent selected from a fluorine atom and a fluorine atom-containing group, a phenyl group having, at the 3-position, the 4-position and the 5-position, at least one substituent selected from a fluorine-containing group having one carbon atom and not more than two fluorine atoms and a fluorine-containing group containing two or more carbon atoms, an aromatic hydrocarbon group other than a phenyl group having at least one substituent selected from a fluorine atom and a fluorine-containing group, an aliphatic hydrocarbon group having at least one substituent selected from a fluorine atom and a fluorine-containing group, and an alicyclic hydrocarbon group having at least one substituent selected from a fluorine atom and a fluorine-containing group. Such a transition metal compound is preferable from the viewpoints of activity and molecular weight of the resulting polymer.

Specifically, $R^1$ is trifluoromethyl, perfluoroethyl, perfluoropropyl, perfluorobutyl, perfluoropentyl, perfluorohexyl, perfluoroheptyl, perfluorooctyl, perfluorodecyl, 1H,1H-perfluoropropyl, 1H,1H-perfluorobutyl, 1H,1H-perfluoropentyl, 1H,1H-perfluorohexyl, 1H,1H-perfluoroheptyl, 1H,1H-perfluorooctyl, 1H,1H-perfluorodecyl, perfluorocyclohexyl, trifluoromethylcyclohexyl, bis(trifluoromethyl)cyclohexyl, trifluoromethylfluorocyclohexyl, monofluorophenyl, difluorophenyl, trifluorophenyl, tetrafluorophenyl, pentafluorophenyl, (trifluoromethyl)pentafluorophenyl, (trifluoromethyl)fluorophenyl, trifluoromethylphenyl, bit (trifluoromethyl)phenyl, tris(trifluoromethyl)phenyl, tetrakis (trifluoromethyl)phenyl, pentakis(trifluoromethyl) phenyl, perfluoroethylphenyl, bis(perfluoroethyl)phenyl, perfluoropropylphenyl, perfluorobutylphenyl, perfluoropentylphenyl, perfluorohexylphenyl, bis (perfluorohexyl)phenyl, perfluoronaphthyl, perfluorophenanthryl, perfluoroanthryl, (trifluoromethyl) tetrafluorophenyl or the like.

$R^1$ is preferably a fluorine-containing aliphatic hydrocarbon group of 3 to 30 carbon atoms, and examples thereof include 1H,1H-perfluoropropyl, 1H,1H-perfluorobutyl, 1H,1H-perfluoropentyl, 1H,1H-perfluorohexyl, 1H,1H-perfluoroheptyl, 1H,1H-perfluorooctyl and 1H,1H-perfluorodecyl. Also preferable are aromatic hydrocarbon groups of 6 to 30 carbon atoms substituted with fluorine and/or fluorine-containing hydrocarbon, such as monofluorophenyl, difluorophenyl, trifluorophenyl, tetrafluorophenyl, pentafluorophenyl, (trifluoromethyl) pentafluorophenyl, (trifluoromethyl)fluorophenyl, trifluoromethylphenyl, bis(trifluoromethyl)phenyl, tris (trifluoromethyl)phenyl, tetrakis(trifluoromethyl)phenyl, pentakis(trifluoromethyl)phenyl, perfluoroethylphenyl, bis (perfluoroethyl)phenyl, perfluoropropylphenyl, perfluorobutylphenyl, perfluoropentylphenyl, perfluorohexylphenyl, bis(perfluorohexyl)phenyl, perfluoronaphthyl, perfluorophenanthryl, perfluoroanthryl and (trifluoromethyl)tetrafluorophenyl.

Of the above examples, particularly preferable as $R^1$ are monofluorophenyl, difluorophenyl, trifluorophenyl, tetrafluorophenyl, pentafluorophenyl, (trifluoromethyl) pentafluorophenyl and 1H,1H-perfluorooctyl.

$R^2$ to $R^5$ may be the same or different and are each a hydrogen atom, a halogen atom, a hydrocarbon group, a hydrocarbon-substituted silyl group, an oxygen-containing group, a nitrogen-containing group, a sulfur-containing group, a boron-containing group, an aluminum-containing group, a phosphorus-containing group, a halogen-containing group, a heterocyclic compound residue, a silicon-containing group, a germanium-containing group or a tin-containing group. Two or more of $R^2$ to $R^5$ may be bonded to form a ring.

Examples of the boron-containing groups, the aluminum-containing groups, the phosphorus-containing groups, the halogen-containing groups, the heterocyclic compound residues, the silicon-containing groups, the germanium-containing groups and the tin-containing groups indicated by $R^2$ to $R^5$ include the same groups as previously described with respect to X in the formula (I).

Examples of the halogen-containing groups indicated by $R^2$ to $R^5$ include the same groups as previously described with respect to $R^1$ in the formula (II-a)

Examples of the hydrocarbon groups indicated by $R^2$ to $R^5$ include those of 1 to 30 carbon atoms. Specifically, there can be mentioned straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl; straight-chain or branched alkenyl groups of 2 to 30 carbon atoms, preferably 2 to 20 carbon atoms, such as vinyl, allyl and isopropenyl; straight-chain or branched alkynyl groups of 2 to 30 carbon atoms, preferably 2 to 20 carbon atom, such as ethynyl and propargyl; cyclic saturated hydrocarbon groups of 3 to 30 carbon atoms, preferably 3 to 20 carbon atoms, such as cyclopropyl, cyclobutyl, cyclopentyl, cyclohexyl and adamantyl; cyclic unsaturated hydrocarbon groups of 5 to 30 carbon atoms, such as cyclopentadienyl, indenyl and fluorenyl; aryl groups of 6 to 30 carbon atoms, preferably 6 to 20 carbon atoms, such as phenyl, benzyl, naphthyl, biphenylyl, terphenylyl, phenanthryl and anthryl; and alkyl-substituted aryl groups, such as tolyl, iso-propylphenyl, t-butylphenyl, dimethylphenyl and di-t-butylphenyl.

The above-mentioned hydrocarbon groups may be substituted with other hydrocarbon groups, and examples of such groups include alkyl groups substituted with aryl groups such as benzyl and cumyl.

Examples of the hydrocarbon-substituted silyl groups indicated by $R^2$ to $R^5$ include those of 1 to 30 carbon atoms. Specifically, there can be mentioned methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl and dimethyl (pentafluorophenyl)silyl. Of these, preferable are methylsilyl, dimethylsilyl, trimethylsilyl, ethylsilyl, diethylsilyl, triethylsilyl, dimethylphenylsilyl and triphenylsilyl. Particularly preferable are trimethylsilyl, triethylsilyl, triphenylsilyl and dimethylphenylsilyl.

Examples of the oxygen-containing groups indicated by $R^2$ to $R^5$ include the same groups as previously described with respect to X in the formula (I).

Examples of the nitrogen-containing groups indicated by $R^2$ to $R^5$ include the same groups as previously described with respect to X in the formula (I).

Examples of the sulfur-containing groups indicated by $R^2$ to $R^5$ include the same groups as previously described with respect to X in the formula (I).

Examples of the halogen atoms and the halogen-containing groups indicated by $R^2$ to $R^5$ include the same groups as previously described with respect to $R^1$ in the formula (II-a).

$R^2$ to $R^5$ are each preferably a hydrogen atom, a halogen atom, a hydrocarbon group, a hydrocarbon-substituted silyl group, an oxygen-containing group, a nitrogen-containing group, a sulfur-containing group or a halogen-containing group, more preferably a hydrogen atom, a halogen atom, a hydrocarbon group, a hydrocarbon-substituted silyl group or a halogen-containing group.

n is a number satisfying a valence of $M^1$, specifically an integer of 2 to 4, preferably 2.

X is an oxygen atom, a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group. Examples of such atoms and groups include the same atoms and groups as previously described with respect to X in the formula (I).

When n is 2 or greater, plural groups indicated by X may be the same or different, and plural groups indicated by X may be bonded to form a ring.

(II-b')

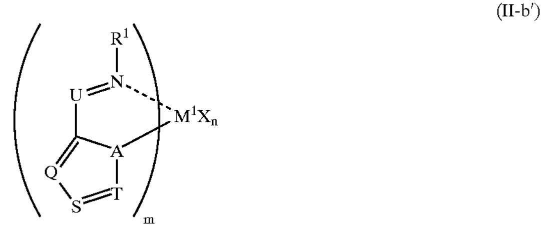

wherein N—$M^1$ generally means that they are coordinated to each other, but in the present invention they are not always coordinated.

In the formula (II-b'), $M^1$ is a transition metal atom selected from Group 3 to Group 11 of the periodic table, preferably a transition metal atom of Group 4 to Group 5, specifically titanium, zirconium, hafnium, vanadium, niobium, tantalum or the like, more preferably a transition metal atom of Group 4, specifically titanium, zirconium or hafnium, still more preferably titanium.

m is an integer of 1 to 5, preferably 2 to 4, more preferably 2.

A is a nitrogen atom or a phosphorus atom.

U is a carbon atom having a substituent $R^6$ (—C($R^6$)═), a nitrogen atom or a phosphorus atom.

Q is a carbon atom having a substituent $R^7$ (—C($R^7$)═), a nitrogen atom or a phosphorus atom.

S is a carbon atom having a substituent $R^8$ (—C($R^8$)═), a nitrogen atom or a phosphorus atom.

T is a carbon atom having a substituent $R^9$ (—C($R^9$)═), a nitrogen atom or a phosphorus atom.

$R^1$ is a hydrocarbon group having one or more heteroatoms or a hydrocarbon group having one or more heteroatom-containing groups, and has the same meaning as that of $R^1$ in the formula (II-a').

$R^6$ to $R^9$ may be the same or different and are each a hydrogen atom, a halogen atom, a hydrocarbon group, a hydrocarbon-substituted silyl group, an oxygen-containing group, a nitrogen-containing group, a sulfur-containing group, a boron-containing groups an aluminum-containing group, a phosphorus-containing group, a halogen-containing group, a heterocyclic compound residue, a silicon-containing group, a germanium-containing group or a tin-containing group. Examples of the hydrocarbon groups and the hydrocarbon-substituted silyl groups include the same groups as previously described with respect to $R^2$ to $R^5$ in the formula (II-a). Examples of the oxygen-containing groups, the nitrogen-containing groups, the sulfur-containing groups, the nitrogen-containing group, the boron-containing groups, the aluminum-containing groups, the phosphorus-containing groups, the halogen-containing groups, the heterocyclic compound residues, the silicon-containing groups, the germanium-containing groups and the tin-containing groups include the same groups as previously described with respect to X in the formula (I).

$R^6$ to $R^9$ are each preferably a hydrogen atom, a halogen atom, a hydrocarbon group, a hydrocarbon-substituted silyl group, an oxygen-containing group, a nitrogen-containing group, a sulfur-containing group or a halogen-containing group, more preferably a hydrogen atom, a hydrocarbon group, a hydrocarbon-substituted silyl group, a halogen atom or a halogen-containing group.

Two or more of $R^6$ to $R^9$ may be bonded to form a ring, and when m is 2 or greater, $R^1$s, $R^6$s, $R^7$s, $R^8$s and $R^9$s may be the same or different, and one group of $R^6$ to $R^9$ contained in one ligand and one group of $R^6$ to $R^9$ contained in other ligands may be bonded.

n is a number satisfying a valence of $M^1$.

X is an oxygen atom, a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group. Examples of such atoms and groups include the same atoms and groups as previously described with respect to X in the formula (I).

When n is 2 or greater, plural groups indicated by X may be the same or different, and plural groups indicated by X may be bonded to form a ring.

As the transition metal compound (A) for use in the invention, there can be also mentioned a transition metal compound represented by the following formula (III) and having properties that, in a β-agostic structure of a cationic complex wherein one of X in the formula (III) is replaced with a n-propyl group, said structure being measured by a density functional method, the distance between the heteroatom, which has no direct bond to the central metal M and is nearest to the central metal M, and hydrogen at the β-position is not more than 3.0 Å and the electrostatic energy is not more than 10 kJ/mol.

(III)

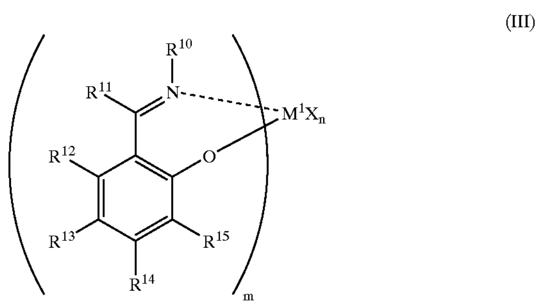

wherein N—$M^1$ generally means that they are coordinated to each other, but in the present invention they are not always coordinated.

In the formula (III), $M^1$ is a transition metal atom selected from Group 4 to Group 5 of the periodic table, specifically titanium, zirconium, hafnium, vanadium, niobium, tantalum or the like, preferably a transition metal atom of Group 4, specifically titanium, zirconium or hafnium, more preferably titanium.

m is 1 or 2, preferably 2.

$R^{10}$ is a hydrocarbon group having at least one heteroatom or a hydrocarbon group having at least one heteroatom-containing group. Examples of the heteroatoms include atoms of halogen, nitrogen, oxygen, phosphorus, sulfur and selenium. The heteroatom-containing group is a group containing a nonmetal atom other than a carbon atom and a hydrogen atom, and examples thereof include an oxygen-containing group, a nitrogen-containing group, a sulfur-containing group, a phosphorus-containing group, a halogen atom-containing group and a heterocyclic compound residue. Examples of the oxygen-containing groups, the nitrogen-containing groups, the sulfur-containing groups, the phosphorus-containing groups and the heterocyclic compound residues include the same groups as previously described with respect to X in the formula (I). Examples of the halogen-containing groups include groups wherein at least one hydrogen is replaced with halogen in hydrocarbon groups of 1 to 30 carbon atoms, preferably 1 to 20 carbon atoms, such as alkyl groups (e.g., methyl, ethyl, propyl, butyl, hexyl, octyl, nonyl, dodecyl and eicosyl), cycloalkyl groups of 3 to 30 carbon atoms (e.g., cyclopentyl, cyclohexyl, norbornyl and adamantly), alkenyl groups (e.g., vinyl, propenyl and cyclohexenyl), arylalkyl groups (e.g., benzyl, phenylethyl and phenylpropyl) and aryl groups (e.g., phenyl, tolyl, dimethylphenyl, trimethylphenyl, ethylphenyl, propylphenyl, biphenylyl, naphthyl, methylnaphthyl, anthryl and phenanthryl). Specific examples of such groups include trifluoromethyl, perfluoroethyl, pentafluorophenyl, perfluorohexyl, trichloromethyl, perchloroethyl, pentachlorophenyl and perchlorohexyl.

$R^{10}$ is preferably a halogen atom-containing hydrocarbon group of 1 to 30 carbon atoms, particularly preferably a fluorine-containing hydrocarbon group of 1 to 30 carbon atoms.

Specifically, $R^{10}$ is trifluromethyl, perfluoroethyl, perfluoropropyl, perfluorobutyl, perfluoropentyl, perfluorohexyl, perfluoroheptyl, perfluorooctyl, perfluorodecyl, 1H,1H-perfluoropropyl, 1H,1H-perfluorobutyl, 1H,1H-perfluoropentyl, 1H,1H-perfluorohexyl, 1H,1H-perfluoroheptyl, 1H,1H-perfluorooctyl, 1H,1H-perfluorodecyl, perfluorocyclohexyl, trifluoromethylcyclohexyl, bis(trifluoromethyl)cyclohexyl, trifluoromethylfluorocyclohexyl, monofluorophenyl, difluorophenyl, trifluorophenyl, tetrafluorophenyl, pentafluorophenyl, (trifluoromethyl)pentafluorophenyl, (trifluoromethyl)fluorophenyl, trifluoromethylphenyl, bis(trifluoromethyl)phenyl, tris(trifluromethyl)phenyl, tetrakis(trifluoromethyl)phenyl, pentakis(trifluoromethyl)phenyl, perfluoroethylphenyl, bis(perfluoroethyl)phenyl, perfluoropropylphenyl, perfluorobutylphenyl, perfluoropentylphenyl, perfluorohexylphenyl, bis(perfluorohexyl)phenyl, perfluoronaphthyl, perfluorophenanthryl, perfluoroanthryl, (trifluoromethyl)tetrafluorophenyl or the like.

$R^{11}$ to $R^{14}$ may be the same or different and are each a hydrogen atom, a halogen atom, a halogen-containing group, a hydrocarbon group, a hydrocarbon-substituted silyl group, an oxygen-containing group, a nitrogen-containing group or a sulfur-containing group. Examples of such atoms and groups include the same atoms and groups as previously described with respect to $R^2$ to $R^5$ in the formula (II-a).

$R^{15}$ is a halogen atom, a halogen-containing group, a hydrocarbon group or a hydrocarbon-substituted silyl group. Examples of such atoms and groups include the same atoms and groups as previously described with respect to $R^2$ to $R^5$ in the formula (II-a).

Examples of the hydrocarbon groups indicated by $R^{15}$ include those of 1 to 30 carbon atoms. Preferred examples thereof include straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, n-pentyl, neopentyl and n-hexyl; hydrocarbon groups having alicyclic skeleton and having 3 to 30 carbon atoms, preferably 3 to 20 carbon atoms, such as cyclopropyl, cyclobutyl, cyclopentyl, cyclohexyl, norbornyl and adamantyl; aryl groups of 6 to 30 carbon atoms, preferably 6 to 20 carbon atoms, such as phenyl, benzyl, naphthyl, biphenylyl, triphenylyl, fluorenyl, anthryl and phenanthryl; and groups wherein these groups are further substituted with an alkyl group of 1 to 30 carbon atoms, preferably 1 to 20 carbon atoms, or an aryl group of 6 to 30 carbon atoms, preferably 6 to 20 carbon atoms. Of these, tert-butyl is more preferable.

Examples of the hydrocarbon-substituted silyl groups indicated by $R^{15}$ include the same groups as previously described with respect to $R^2$ to $R^5$ in the formula (II-a).

Examples of the heteroatoms and the heteroatom-containing groups indicated by $R^{15}$ include the same atoms and groups as previously described with respect to $R^1$ in the formula (II-a).

$R^{10}$ and $R^{11}$ to $R^{15}$ may be the same or different, and two or more of them may be bonded to form a ring.

n is a number satisfying a valence of $M^1$, specifically an integer of 2 to 4, preferably 2.

X is an oxygen atom, a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group. Examples of such atoms and groups include the same atoms and groups as previously described with respect to X in the formula (I).

When n is 2 or greater, plural groups indicated by X may be the same or different, and plural groups indicated by X may be bonded to form a ring.

As the transition metal compound (A), there can be also mentioned a transition metal compound represented by the following formula (III') and having the following structure as $R^{10}$.

(III')

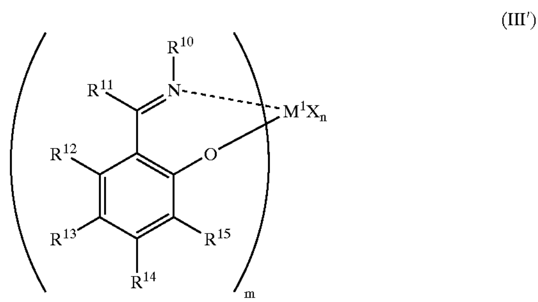

wherein N—$M^1$ generally means that they are coordinated to each other, but in the present invention they are not always coordinated.

In the above formula, $M^1$, m, $R^{11}$ to $R^{14}$, $R^{15}$, n and X have the same meanings as those of $M^1$, m, $R^{11}$ to $R^{14}$, $R^{15}$, n and X in the formula (III).

$R^{10}$ is a phenyl group having at least one substituent selected from a heteroatom and a heteroatom-containing group, an aromatic hydrocarbon group other than a phenyl group, an aliphatic hydrocarbon group or an alicyclic hydrocarbon group. When $R^{10}$ is a phenyl group and the position of the carbon atom bonded to nitrogen is the 1-position, this phenyl group has, at at least one position of the 2-position and the 6-position, one or more substituents selected from a heteroatom and a heteroatom-containing group, or has, at the 3-position, the 4-position and the 5-position, at least one substituent selected from a heteroatom other than a fluorine atom, a fluorine-containing group having one carbon atom and not more than two fluorine atoms, a fluorine-containing group having two or more carbon atoms, and a heteroatom-containing group having a heteroatom other than a fluorine atom. When $R^{10}$ is an aromatic hydrocarbon group other than a phenyl group, an aliphatic hydrocarbon group or an alicyclic group, this group has at least one substituent selected from a heteroatom and a heteroatom-containing group.

Examples of the heteroatoms and the heteroatom-containing groups include the same atoms and groups as previously described with respect to $R^1$ in the formula (II-a).

In the transition metal compound represented by the formula (III), when the position of the carbon atom bonded to a nitrogen atom is the 1-position, $R^{10}$ is preferably a fluorine-containing hydrocarbon group of 1 to 30 carbon atoms which is selected from a phenyl group having, at at least one position of the 2-position and the 6-position, one or more substituents selected from a heteroatom and a heteroatom-containing group, a phenyl group having, at the 3-position, the 4-position and the 5-position, at least one substituent selected from a fluorine-containing group containing one carbon atom and not more than two fluorine atoms and a fluorine-containing group containing two or more carbon atoms, an aromatic hydrocarbon group other than a phenyl group having at least one substituent selected from a fluorine atom and a fluorine-containing group, an aliphatic hydrocarbon group having at least one substituent selected from a fluorine atom and a fluorine-containing group, and an alicyclic hydrocarbon group having at least one substituent selected from a fluorine atom and a fluorine-containing group. Such a transition metal compound is preferable from the viewpoints of activity and molecular weight of the resulting polymer.

As for the substitution position of the substituent having a heteroatom or a heteroatom-containing group, when $R^{10}$ is aromatic, this substituent is preferably present at the position of a carbon atom (carbon atom at the β-position) adjacent to the carbon atom in $R^{10}$ that is bonded to a nitrogen atom, and when $R^{10}$ is aliphatic, the substituent is preferably present at the adjacent position or its adjacent position (β-position or γ-position).

Examples of the heteroatoms and the heteroatom. containing groups include the same atoms and groups as previously described. Particularly, fluorine is preferable as the heteroatom, and a fluorine-containing group is preferable as the heteroatom-containing group.

Examples of $R^{10}$ include trifluoromethyl, perfluoroethyl, perfluoropropyl, perfluorobutyl, perfluoropentyl, perfluorohexyl, perfluoroheptyl, perfluorooctyl, perfluorodecyl, 1H,1H-perfluoropropyl, 1H,1H-perfluorobutyl, 1H,1H-perfluoropentyl, 1H,1H-perfluorohexyl, 1H,1H-perfluoroheptyl, 1H,1H-perfluorooctyl, 1H,1H-perfluorodecyl, perfluorocyclohexyl, trifluoromethylcyclohexyl, bis(trifluoromethyl) cyclohexyltrifluoromethylfluorocyclohexyl, monofluorophenyl, difluorophenyl, trifluorophenyl, tetrafluorophenyl, pentafluorophenyl, (trifluoromethyl) pentafluorophenyl, (trifluoroethyl)fluorophenyl, trifluoromethylphenyl, bis(trifluoromethyl)phenyl, tris (trifluoromethyl)phenyl, tetrakis(trifluoromethyl)phenyl, pentakis(trifluoromethyl)phenyl, perfluoroethylphenyl, bis (perfluoroethyl)phenyl, perfluoropropylphenyl, perfluorobutylphenyl, perfluoropentylphenyl, perfluorohexylphenyl, bis(perfluorohexyl)phenyl, perfluoronaphthyl, perfluorophenanthryl, perfluoroanthryl and (trifluoromethyl)tetrafluorophenyl.

$R^{10}$ is preferably a fluorine-containing aliphatic hydrocarbon group of 3 to 30 carbon atoms. Examples include aliphatic hydrocarbon groups of 3 to 30 carbon atoms substituted with fluorine and/or fluorine-containing hydrocarbon such as 1H,1H-perfluoropropyl, 1H,1H-perfluorobutyl, 1H,1H-perfluoropentyl, 1H,1H-perfluorohexyl, 1H,1H-perfluoroheptyl, 1H,1H-perfluorooctyl, 1H,1H-perfluorodecyl or monofluorophenyl, difluorophenyl, trifluorophenyl, tetrafluorophenyl, pentafluorophenyl, (trifluoromethyl)pentafluorophenyl, (trifluoromethyl) fluorophenyl, trifluoromethylphenyl, bis(trifluoromethyl) phenyl, tris(trifluoromethyl)phenyl, tetrakis (trifluoromethyl)phenyl, pentakis(trifluoromethyl)phenyl, perfluoroethylphenyl, bis(perfluoroethyl)phenyl, perflulorpropylphenyl, perfluorobutylphenyl, perfluoropentylphenyl, perfluorohexylphenyl, bis (perfluorohexyl)phenyl, perfluoronaphthyl, perfluorophenanthryl, perfluoroanthryl, and (trifluoromethyl)tetrafluorophenyl.

$R^{10}$ is particularly preferably an aromatic hydrocarbon group of 6 to 30 carbon atoms substituted with fluorine, an aromatic hydrocarbon group of 8 to 30 carbon atoms substituted with a fluorine-containing hydrocarbon of 2 or more carbon atoms or an aromatic hydrocarbon group of 7 to 30 carbon atoms substituted with fluorine and a fluorine-containing hydrocarbon group.

Examples include monofluorophenyl, difluorophenyl, trifluorophenyl, tetrafluorophenyl, pentafluorophenyl, (trifluoromethyl) pentafluorophenyl, (trifluoromethyl)fluorophenyl, trifluoromethylphenyl, tris(trifluoromethyl)phenyl, tetrakis(trifluoromethyl)phenyl, pentakis (trifluoromethyl)phenyl, perfluoroethylphenyl, bis (perfluoroethyl)phenyl, perfluoropropylphenyl, perfluorobutylphenyl, perfluoropentylphenyl, perfluorohexylphenyl, bis(perfluorohexyl)phenyl, perfluoronaphthyl, perfluorophenanthryl, perfluoroanthryl and (trifluoromethyl)tetrafluorophenyl.

Of these, particularly preferable as $R^{10}$ are 2-fluorophenyl group, 2,6-difluorophenyl group, 2,4,6-trifluorophenyl group, pentafluorophenyl group, 4-trifluoromethyl 2,3,5,6-tetrafluorophenyl group, 2-trifluoromethylphenyl group and 1H,1H-perfluorooctyl group.

As for the substitution position of fluorine, when $R^{10}$ is aromatic, this fluorine is preferably present at the position of a carbon atom (carbon atom at the β-position) adjacent to the carbon atom in $R^{10}$ that is bonded to a nitrogen atom, and when $R^{10}$ is aliphatic, the fluorine is preferably present at the adjacent position or its adjacent position (β-position or γ-position).

$R^{11}$ to $R^{14}$ may be the same or different and are each a hydrogen atom, a halogen atom, a halogen-containing group, a hydrocarbon group, a hydrocarbon-substituted silyl group, an oxygen-containing group, a nitrogen-containing group or a sulfur-containing group. Examples of such atoms and groups include the same atoms and groups as previously described with respect to $R^2$ to $R^5$ in the formula (II-a).

$R^{15}$ is a halogen atom, a halogen-containing group, a hydrocarbon group or a hydrocarbon-substituted silyl group. Examples of such atoms and groups include the same atoms and groups as previously described with respect to $R^2$ to $R^5$ in the formula (II-a).

Examples of the hydrocarbon groups indicated by $R^{15}$ include those of 1 to 30 carbon atoms. Preferred examples thereof include straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, n-pentyl, neopentyl and n-hexyl; hydrocarbon groups having alicyclic skeleton and having 3 to 30 carbon atoms, preferably 3 to 20 carbon atoms, such as cyclopropyl, cyclobutyl, cyclopentyl, cyclohexyl, norbornyl and adamantyl; aryl groups of 6 to 30 carbon atoms, preferably 6 to 20 carbon atoms, such as phenyl, benzyl, naphthyl, biphenylyl, triphenylyl, fluorenyl, anthryl and phenanthryl; and groups wherein these groups are further substituted with an alkyl group of 1 to 30 carbon atoms, preferably 1 to 20 carbon atoms, or an aryl group of 6 to 30 carbon atoms, preferably 6 to 20 carbon atoms. Of these, tert-butyl is more preferable.

Examples of the hydrocarbon-substituted silyl groups indicated by $R^{15}$ include the same groups as previously described with respect to $R^2$ to $R^5$ in the formula (II-a).

Examples of the halogen atoms and the halogen-containing groups indicated by $R^{15}$ include the same atoms and groups as previously described with respect to $R^1$ in the formula (II-a).

$R^{10}$ and $R^{11}$ to $R^{15}$ may be the same or different, and two or more of them may be bonded to form a ring.

n is a number satisfying a valence of $M^1$, specifically an integer of 2 to 4, preferably 2.

X is an oxygen atom, a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group. Examples of such atoms and groups include the same atoms and groups as previously described with respect to X in the formula (I).

When n is 2 or greater, plural groups indicated by X may be the same or different, and plural groups indicated by X may be bonded to form a ring.

The transition metal compound represented by the formula (II-a'), (II-b') or (III') preferably has properties that, in a β-agostic structure of a cationic complex wherein one of X in the formula is replaced with a n-propyl group, said structure being measured by a density functional method, the distance between the heteroatom, which has no direct bond to the central metal M and is nearest to the central metal M, and hydrogen at the β-position is not more than 3.0 Å and the electrostatic energy is not more than 10 kJ/mol.

Examples of the transition metal compounds represented by the formula (I), (II-a), (II-b), (II-a'), (II-b'), (III) or (III) are given below, without limiting thereto.

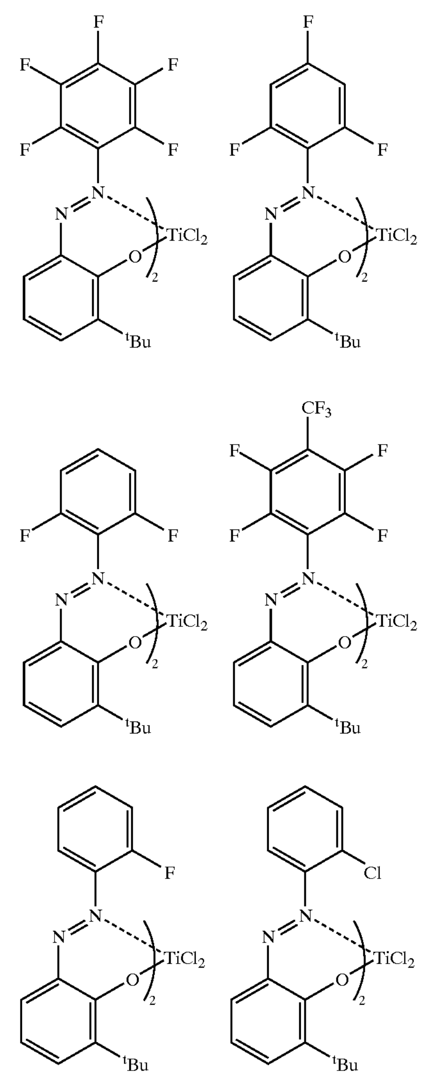

-continued

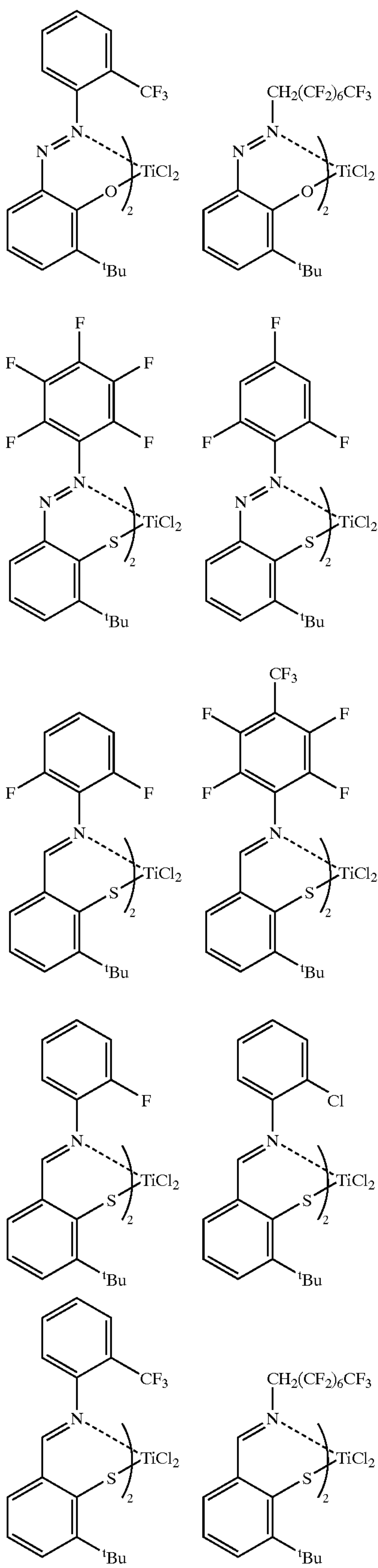

-continued
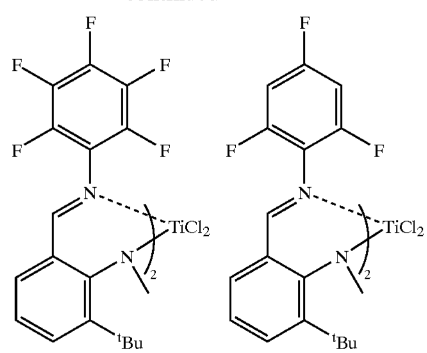
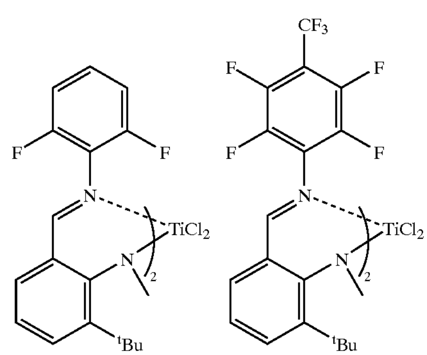
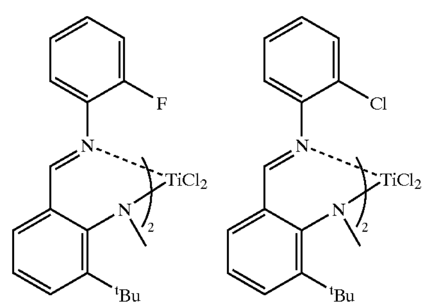
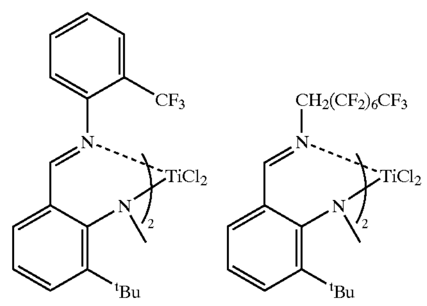
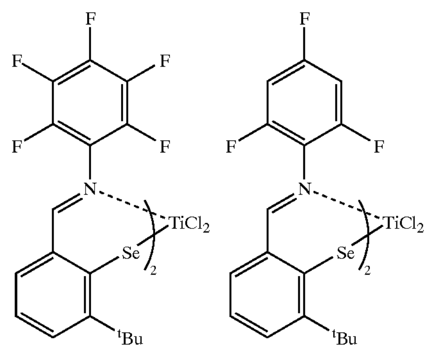
-continued
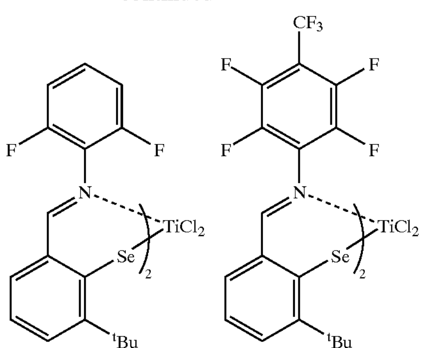
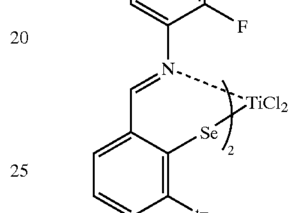
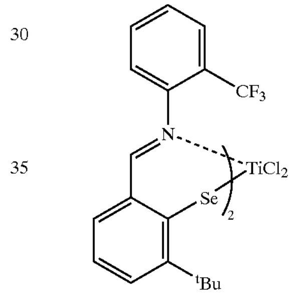
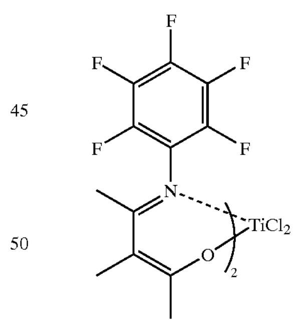
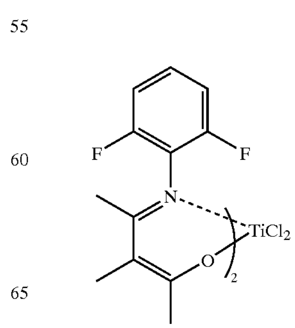

-continued
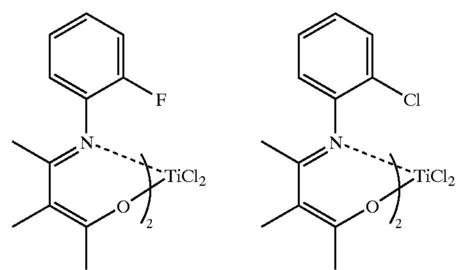
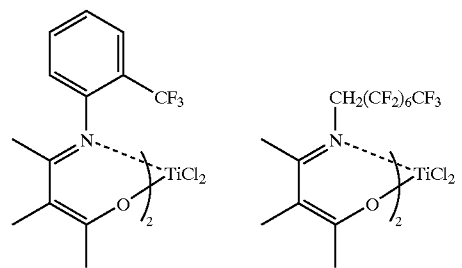
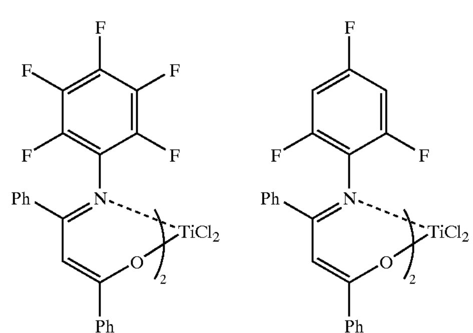
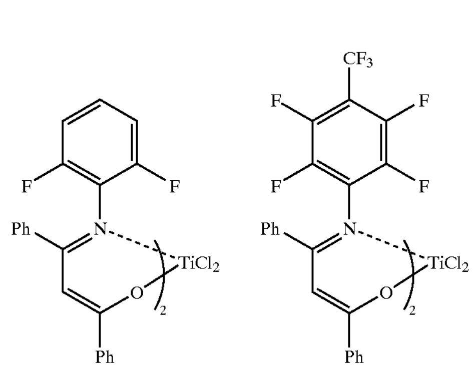
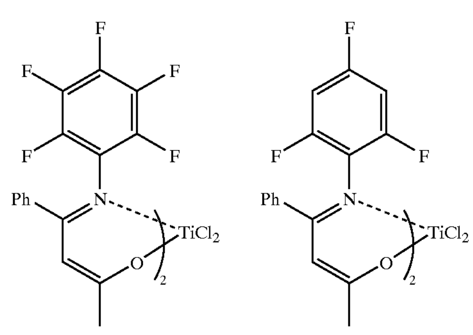
-continued
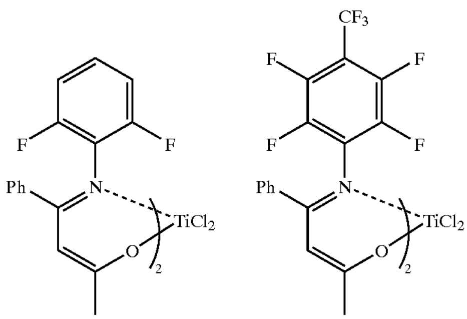
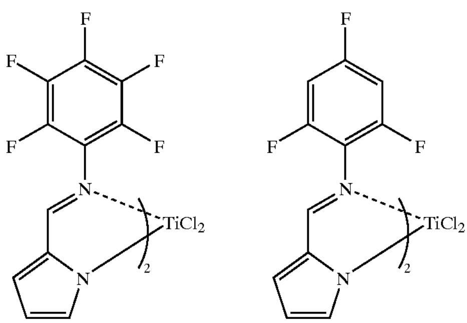
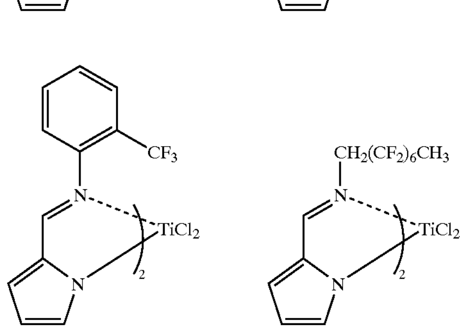

-continued
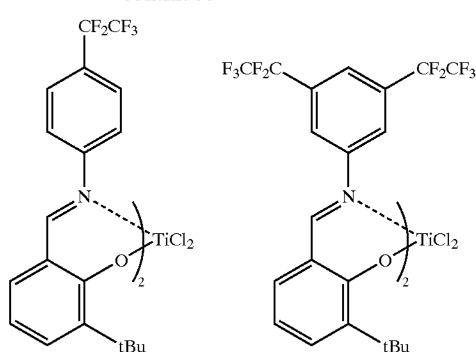
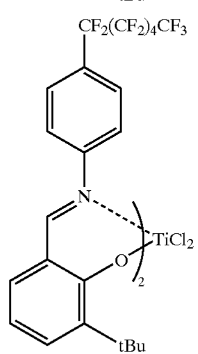
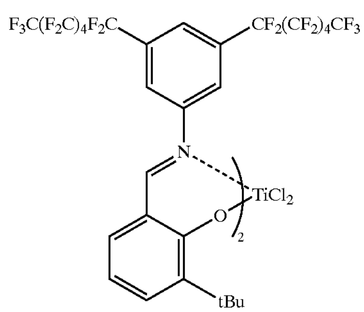
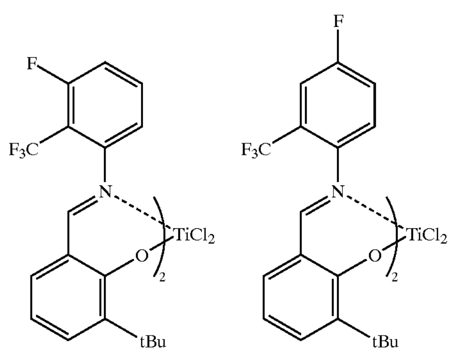
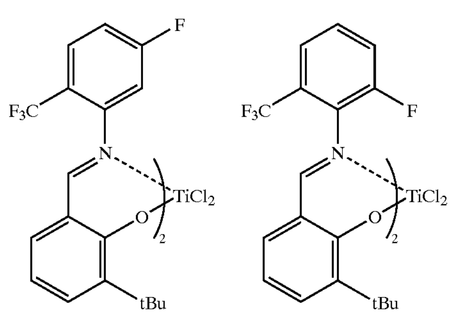
-continued
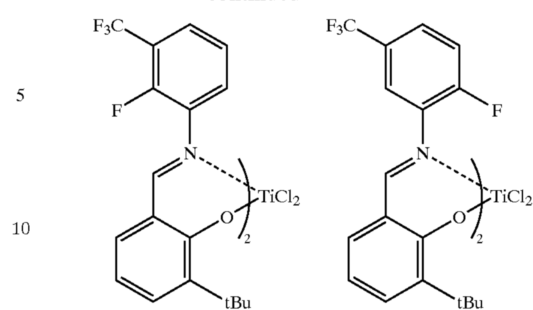
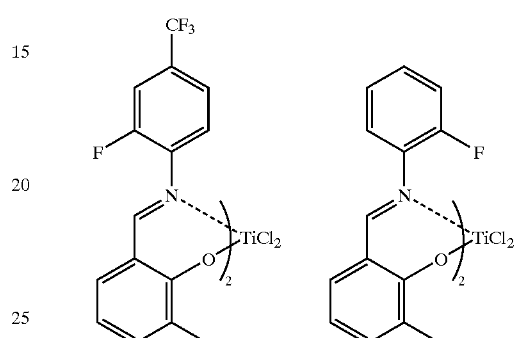
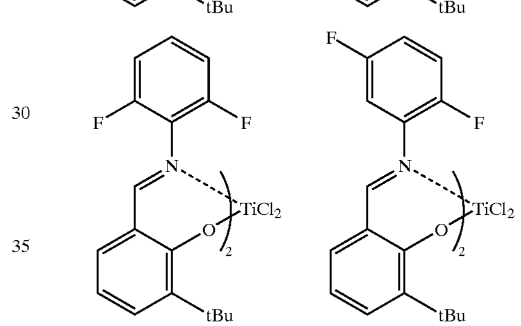
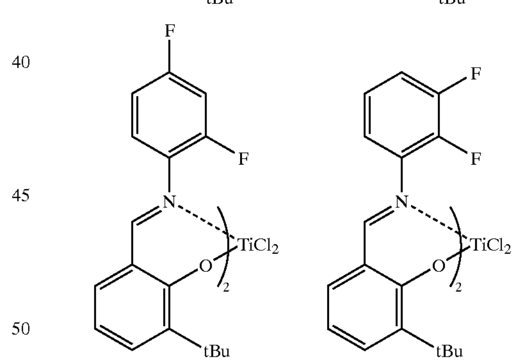
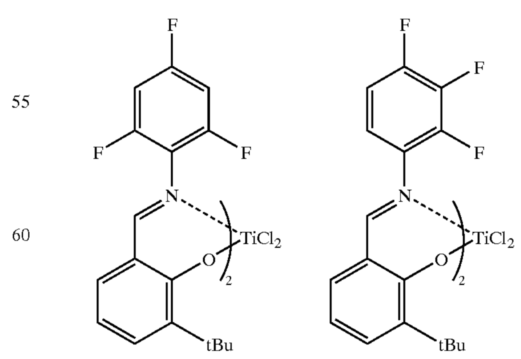

-continued
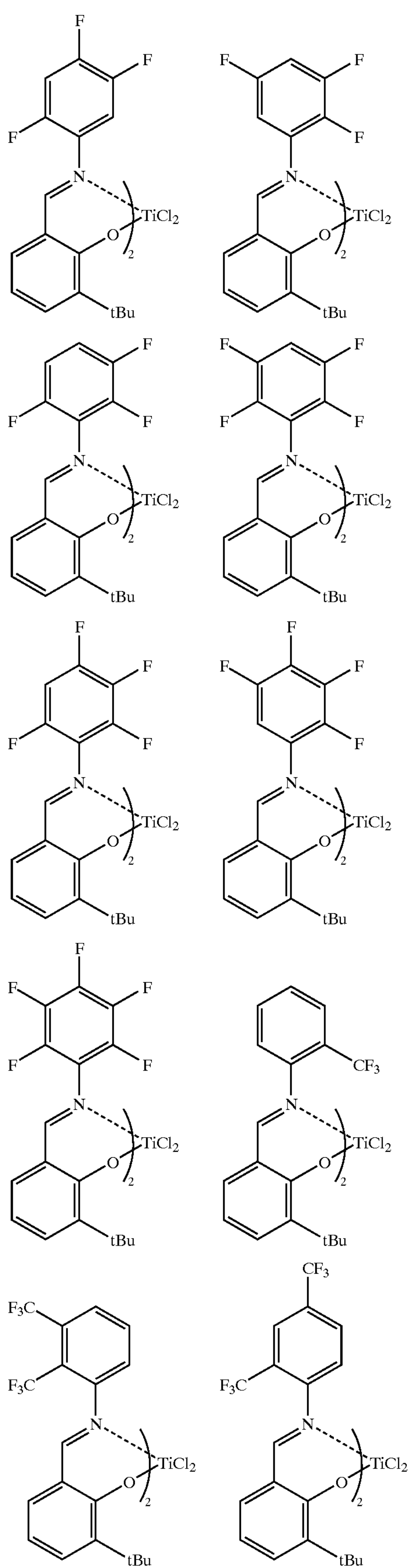
-continued
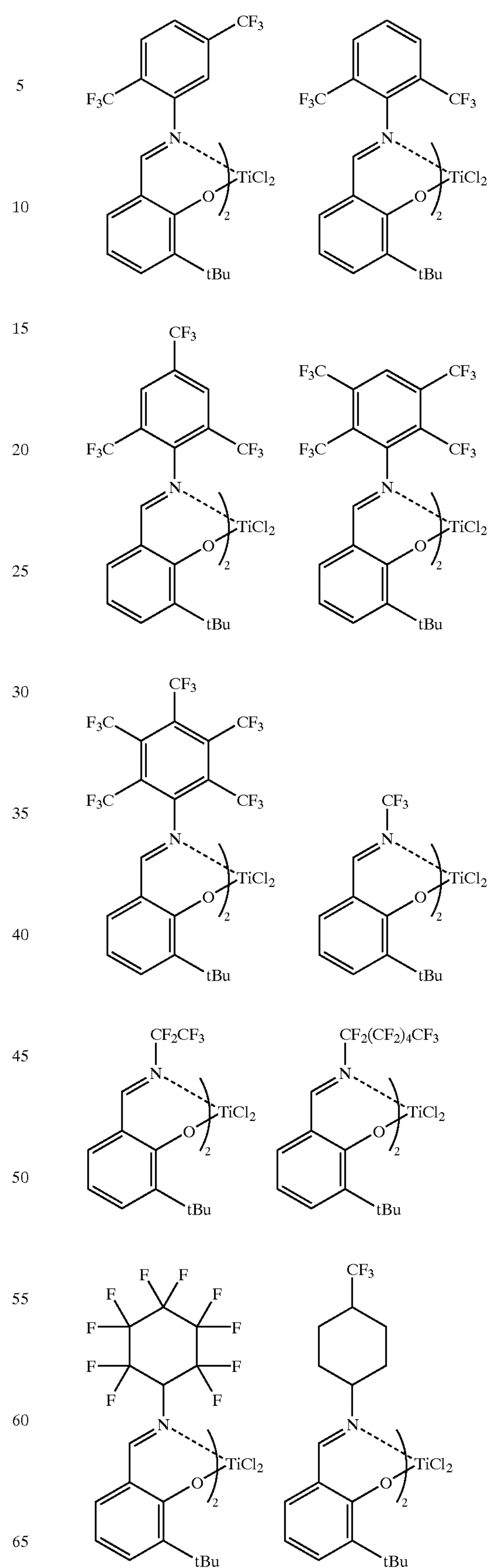

-continued
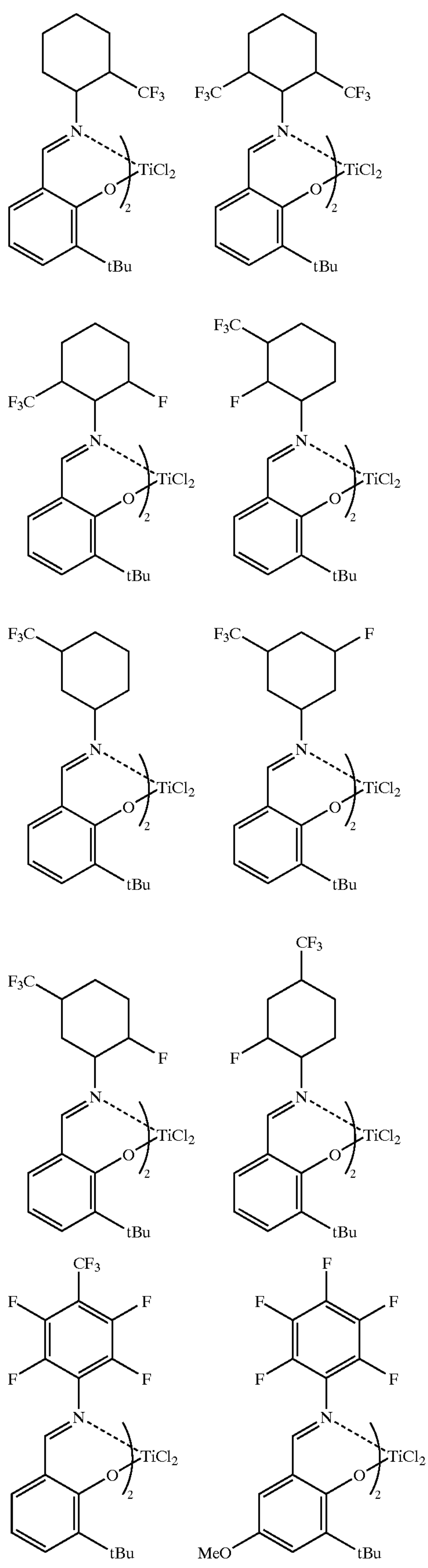
-continued
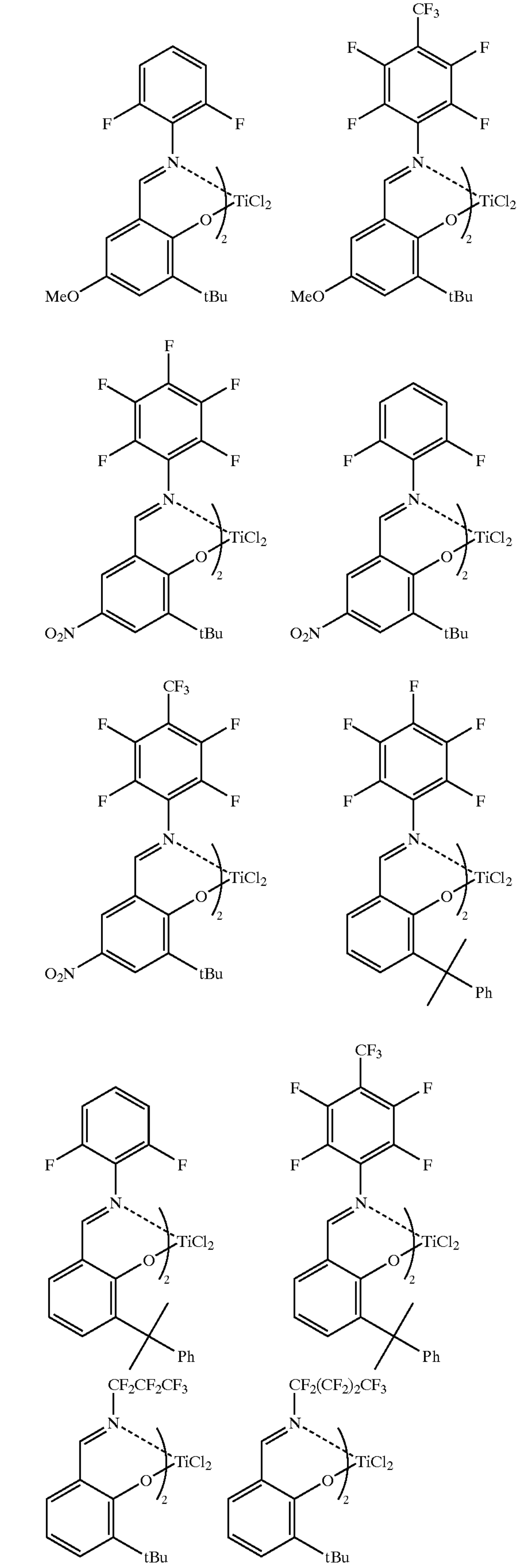

-continued

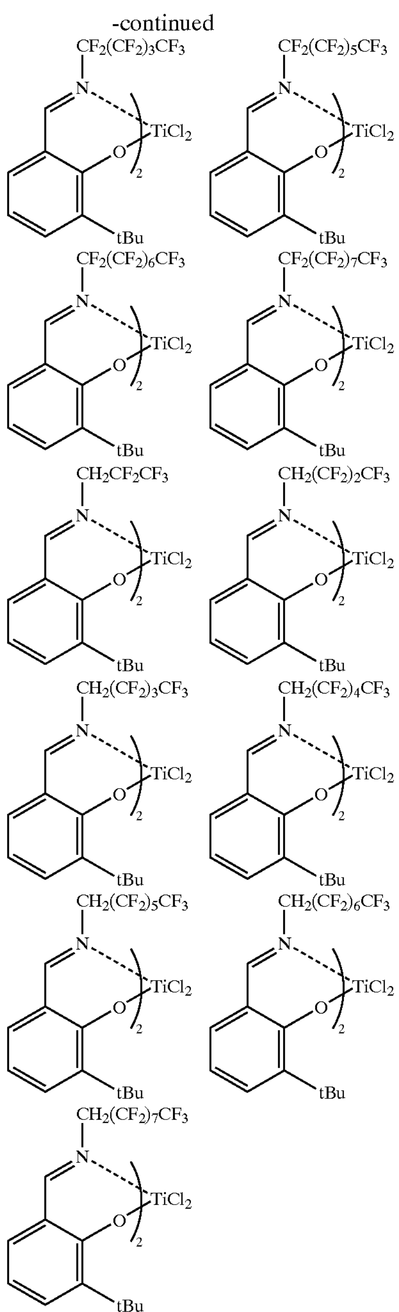

In the above examples, Bu denotes a butyl group.

In the present invention, transition metal compounds wherein the titanium metal is replaced with a metal other than titanium, such as zirconium or hafnium, in the above-mentioned compounds are also employable.

The process for preparing the transition metal compound (A) is not specifically limited, and for example, the transition metal compound represented by the formula (III) can be synthesized by allowing a compound (ligand precursor) which becomes a ligand in the resulting transition metal compound to react with a transition metal $M^1$-containing compound represented by $M^1X_k$ ($M^1$ and X have the same meanings as those of $M^1$ and X in the formula (III), and k is a number satisfying a valence of $M^1$).

The ligand precursor is obtained by allowing a salicylaldehyde compound to react with a primary amine compound represented by the formula $R^{10}$—$NH_2$ ($R^{10}$ has the same meaning as previously described), such as an aniline compound or an alkylamine compound. More specifically, both of the starting compounds are dissolved in a solvent. As the solvent, a solvent usually used for such a reaction is employable, and above all, an alcohol solvent such as methanol or ethanol or a hydrocarbon solvent such as toluene is preferable. Then, the resulting solution is stirred for about 1 to 100 hours under the conditions of room temperature to a reflux temperature to obtain the corresponding ligand precursor. In the synthesis of the ligand precursor, an acid catalyst such as formic acid, acetic acid or toluenesulfonic acid may be used. Use of molecular sieves, magnesium sulfate or sodium sulfate as a dehydrating agent or dehydration by a Dean-Stark method is effective for the progress of the reaction.

Then, the ligand precursor thus obtained is allowed to react with a transition metal $M^1$-containing compound to synthesize the corresponding transition metal compound. More specifically, the ligand precursor thus synthesized is dissolved in a solvent, and if desired, the solution is contacted with a base to prepare a phenoxide salt. Then, the solution or the salt is mixed with a metallic compound such as a metallic halide or a metallic alkylate at a low temperature and stirred for about 1 to 48 hours at a temperature of −78° C. to room temperature or under the reflux conditions. As the solvent, a solvent usually used for such a reaction is employable, and above all, a polar solvent such as ether or tetrahydrofuran (THF) or a hydrocarbon solvent such as toluene is preferable. As the base used for preparing the phenoxide salt, a metallic salt such as a lithium salt (e.g., n-butyllithium) or a sodium salt (e.g., sodium hydride) or an organic base such as triethylamine or pyridine is preferable.

Depending upon the properties of the compound, the ligand precursor can be allowed to directly react with the transition metal $M^1$-containing compound without preparation of the phenoxide salt, to synthesize the corresponding transition metal compound.

It is possible to replace the metal $M^1$ in the synthesized transition metal compound with another transition metal in a conventional way. Further, when any one of $R^{10}$ and $R^{11}$ to $R^{15}$ is H, a substituent other than H may be introduced in any stage of the synthesis.

It is possible to use the reaction solution of the ligand precursor and the transition metal $M^1$-containing compound as it is without isolating the transition metal compound.

A usual process for preparing the complex is described also in EP1008595A2.

The transition metal compound (A) mentioned above can be used singly or in combination of two or more kinds.

(B-1) Organometallic Compound

Examples of the organometallic compounds (B-1) which are optionally used in the invention include organometallic compounds containing metals of Group 1, Group 2 and Group 13 of the periodic table, such as those described below.

(B-1a) Organoaluminum compound represented by the following formula:

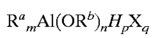

$$R^a_m Al(OR^b)_n H_p X_q$$

wherein $R^a$ and $R^b$ may be the same or different and are each a hydrocarbon group of 1 to 15 carbon atoms, preferably 1 to 4 carbon atoms; X is a halogen atom; and m, n, p and q are numbers satisfying the conditions of $0<m\leqq 3$, $0\leqq n<3$, $0\leqq p<3$, $0\leqq q<3$ and $m+n+p+q=3$.

(B-1b) Alkyl complex compound comprising a metal of Group 1 and aluminum and represented by the following formula:

$$M^2AlR^a_4$$

wherein $M^2$ is Li, Na or K; and $R^a$ is a hydrocarbon group of 1 to 15 carbon atoms, preferably 1 to 4 carbon atoms.

(B-1c) Compound represented by the following formula:

$$R^aR^bM^3$$

wherein $R^a$ and $R^b$ may be the same or different and are each a hydrocarbon group of 1 to 15 carbon atoms, preferably 1 to 4 carbon atoms; and $M^3$ is Mg.

Examples of the organoaluminum compounds (B-1a) include:

an organoaluminum compound represented by the following formula;

$$R^a{}_mAl(OR^b)_{3-m}$$

wherein $R^a$ and $R^b$ may be the same or different and are each a hydrocarbon group of 1 to 15 carbon atoms, preferably 1 to 4 carbon atoms, and m is preferably a number satisfying the condition of $1.5 \leqq m \leqq 3$;

an organoaluminum compound represented by the following formula:

$$R^a{}_mAlX_{3-m}$$

wherein $R^a$ is a hydrocarbon group of 1 to 15 carbon atoms, preferably 1 to 4 carbon atoms, X is a halogen atom, and m is preferably a number satisfying the condition of $0<m<3$;

an organoaluminum compound represented by the following formula:

$$R^a{}_mAlH_{3-m}$$

wherein $R^a$ is a hydrocarbon group of 1 to 15 carbon atoms, preferably 1 to 4 carbon atoms, and m is preferably a number satisfying the condition of $2 \leqq m<3$;

and an organoaluminum compound represented by the following formula:

$$R^a{}_mAl(OR^b)_nX_q$$

wherein $R^a$ and $R^b$ may be the same or different and are each a hydrocarbon group of 1 to 15 carbon atoms, preferably 1 to 4 carbon atoms, X is a halogen atom, and m, n and q are numbers satisfying the conditions of $0<m \leqq 3$, $0 \leqq n<3$, $0 \leqq q<3$ and $m+n+q=3$.

Particular examples of the organoaluminum compounds (B-1a) include:

tri-n-alkylaluminums, such as trimethylaluminum, triethylaluminum, tri-n-butylaluminum, tripropylaluminum, tripentylaluminum, trihexylaluminum, trioctylaluminum and tridecylaluminum;

branched-chain trialkylaluminums, such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum;

tricycloalkylaluminums, such as tricyclohexylaluminum and tricyclooctylaluminum;

triarylaluminums, such as triphenylaluminum and tritolylaluminum;

trialkenylaluminums, e.g., those represented by the formula $(i\text{-}C_4H_9)_xAl_y(C_5H_{10})_z$ (wherein x, y and z are each a positive number, and $z \geqq 2x$), such as triisoprenylaluminum;

alkylaluminum alkoxides, such as isobutylaluminum methoxide, isobutylaluminum ethoxide and isobutylaluminum isopropoxide;

dialkylaluminum alkoxides, such as dimethylaluminum methoxide, diethylaluminum ethoxide and dibutylaluminum butoxide;

alkylaluminum sesquialkoxides, such as ethylaluminum sesqulethoxide and butylaluminum sesquibutoxide;

partially alkoxylated alkylaluminums, such as those having an average composition represented by $R^a{}_{2.5}Al\ (OR^b)$ 0.5;

dialkylaluminum aryloxides, such as diethylaluminum phenoxide, diethylaluminum(2,6-di-t-butyl-4-methylphenoxide), ethylaluminumbis(2,6-di-t-butyl-4-methylphenoxide), diisobutylalumium(2,6-di-t-butyl-4-methyl-phenoxide) and isobutylaluminumbis(2,6-di-t-butyl-4-methylphenoxide);

dialkylaluminum halides, such as dimethylaluminum chloride, diethylaluminum chloride, dibutylaluminum chloride, diethylaluminum bromide and diisobutylaluminum chloride;

alkylaluminum sesquihalides, such as ethylalaminum sesquichloride, butylaluminum sesquichloride and ethylaluminum sesquibromide, partially halogenated alkylaluminums, e.g., alkylaluminum dihalide such as ethylaluminum dichloride, propylaluminum dichloride and butylaluminum dibromide;

dialkylaluminum hydrides, such as diethylaluminum hydride, dibutylaluminum hydride and diisobutylaluminum hydride;

partially hydrogenated alkylaluminums, e.g., alkylaluminum dihydrides, such as ethylaluminum dihydride and propylaluminum dihydride; and partially alkoxylated and halogenated alkylaluminums, such as ethylaluminum ethoxychloride, butylaluminum butoxychloride and ethylaluminum ethoxybromide.

Also employable are compounds analogous to the organoaluminum compound (B-1a). For example, there can be mentioned organoaluminum compounds wherein two or more aluminum compounds are combined through a nitrogen atom, such as $(C_2H_5)_2AlN(C_2H_5)Al(C_2H_5)_2$.

Examples of the compounds (B-1b) include $LiAl(C_2H_5)_4$ and $LiAl(C_7H_{15})_4$.

Other compounds, also employable as the organometallic compounds (B-1) include methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, dimethylmagnesium, diethylmagnesium, dibutylmagnesium and butylethylmagnesium. Combinations of compounds capable of producing the above-mentioned organoaluminum compounds in the polymerization system, e.g., a combination of halogenated aluminum and alkyllithium and a combination of halogenated aluminum and alkylmagnesium, are also employable.

Of the organometallic compounds (B-1), the organoaluminum compounds are preferable.

The organometallic compounds (B(-)1) mentioned above are used singly or in combination of two or more kinds.

(B-2) Organoaluminum Oxy-compound

The organoaluminum oxy-compound (B-2) which is optionally used in the invention may be conventional aluminoxane or a benzene-insoluble organoaluminum oxy-compound such as exemplified in Japanese Patent Laid-Open Publication No. 78687/1990.

The conventional aluminoxane can be prepared by, for example, the following processes, and is generally obtained as a hydrocarbon solvent solution.

(1) An organoaluminum compound such as trialkylaluminum is added to a hydrocarbon medium suspension of a compound containing adsorption water or a salt containing water of crystallization, e.g., magnesium chloride hydrate, copper sulfate hydrate, aluminum sulfate hydrate, nickel sulfate hydrate or cerous chloride hydrate, to allow the organoaluminum compound to react with the adsorption water or the water of crystallization.

(2) Water, ice or water vapor is allowed to directly act on an organoaluminum compound such as trialkylaluminum in a medium such as benzene, toluene, ethyl ether or tetrahydrofuran.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. Further, it is possible that the solvent or the unreacted organoaluminum compound is distilled off from the recovered solution of aluminoxane and the remainder is redissolved in a solvent or suspended in a poor solvent for aluminoxane.

Examples of the organoaluminum compounds used for preparing the aluminoxane include the same organoaluminum compounds as previously described with respect to the organoaluminum compound (B-1a). Of these, preferable are trialkylaluminums and tricycloalkylaluminums. Particularly preferable is trimethylaluminum.

The organoaluminum compounds are used singly or in combination of two or more kinds.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halogenated products of these aromatic, aliphatic and alicyclic hydrocarbons (e.g., chlorinated or brominated products thereof). Also employable are ethers such as ethyl ether and tetrahydrofuran. Of the solvents, particularly preferable are aromatic hydrocarbons and aliphatic hydrocarbons.

The benzene-insoluble organoaluminum oxy-compound for use in the invention is preferably an organoaluminum oxy compound containing an Al component which is soluble in benzene at 60° C., in an amount of usually not more than 10%, preferably not more than 5%, particularly preferably not more than 2%, in terms of Al atom. That is, the benzene-insoluble organoaluminum oxy-compound is preferably insoluble or sparingly soluble in benzene.

The organoaluminum oxy-compound for use in the invention is, for example, an organoaluminum oxy-compound containing boron and represented by the following formula (IV):

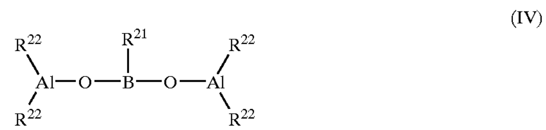

(IV)

wherein $R^{21}$ is a hydrocarbon group of 1 to 10 carbon atoms; and each $R^{22}$ may be the same or different and is a hydrogen atom, a halogen atom or a hydrocarbon group of 1 to 10 carbon atoms.

The organoaluminum oxy-compound containing boron and represented by the formula (IV) can be prepared by allowing an alkylboronic acid represented by the following formula (V):

$$R^{21}—B—(OH)_2 \quad (V)$$

wherein $R^{21}$ is the same group as described above, to react with an organoaluminum compound in an inert solvent at a temperature of −80° C. to room temperature for 1 minute to 24 hours under an inert gas atmosphere.

Examples of the alkylboronic acids represented by the formula (V) include methylboronic acid, ethylboronic acid, isopropylboronic acid, n-propylboronic acid, n-butylboronic acid, isobutylboronic acid, n-hexylboronic acid, cyclohexylboronic acid, phenylboronic acid, 3,5-difluoroboronic acid, pentafluorophenylboronic acid and 3,5-bis(trifluoromethyl)phenylboronic acid. Of these, preferable are methylboronic acid, n-butylboronic acid, isobutylboronic acid, 3,5-difluorophenylboronic acid and pentafluorophenylboronic acid.

These alkylboronic acids are used singly or in combination or two or more kinds.

Examples of the organoaluminum compounds to be reacted with the alkylboronic acid include the same organoaluminum compounds as previously described with respect to the organoaluminum compound (B-1a). Of these, preferable are trialkylaluminums and tricycloalkylaluminums. Particularly preferable are trimethylaluminum, triethylaluminum and triisobutylaluminum. These organoaluminum compounds are used singly or in combination of two or more kinds.

The organoaluminum oxy-compounds (B-2) mentioned above are used singly or in combination of two or more kinds.

(B-3) Compound Which Reacts with the Transition Metal Compound (A) to form Ion Pair The compound (B-3) which reacts with a transition metal compound (A) to form an ion pair (referred to as "ionizing ionic compound" hereinafter), that is optionally used in the invention, includes Lewis acids, an ionic compounds, borane compounds and carborane compounds described In Japanese Patent Laid-Open Publications No. 501950/1989, No. 502036/1989, No. 179005/1991, No. 179006/1991, No. 207703/1991 and No. 207704/1991, and U.S. Pat. No. 5,321,106. A heteropoly compound and an isopoly compound may also be employed.

The Lewis acids are, for example, compounds represented by $BR_3$ (R is fluorine or a phenyl group which may have a substituent such as fluorine, methyl or trifluoromethyl). Examples of such compounds include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron.

The ionic compounds are, for example, compounds represented by the following formula (VI):

(VI)

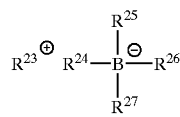

In the above formula, $R^{23}$ is $H^+$, carbonium cation, oxonium cation, ammonium cation, phosphonium cation, cycloheptyltrienyl cation, ferrocenium cation having a transition metal, or the like.

$R^{24}$ to $R^{27}$ may be the same or different and are each an organic group, preferably an aryl group or a substituted aryl group.

Examples of the carbonium cations include tri-substituted carbonium cations, such as triphenylcarbonium cation, tri(methylphenyl)carbonium cation and tri(dimethylphenyl) carbonium cation.

Examples of the ammonium cations include trialkylammonium cations, such as trimethylammonium cation, triethylammonium cation, tripropylammonium cation, tributylammonium cation and tri(n-butyl)ammonium cation; N,N-dialkylanilinium cations, such as N,N-dimethylanilinium cation, N,N-diethylanilinium cation and N,N-2,4,6-pentamethylanilinium cation; and dialkylammonium cations, such as di(isopropyl)ammonium cation and dicyclohexylammonium cation.

Examples of the phosphonium cations include triarylphosphonium cations, such as triphenylphosphonium cation, tri(methylphenyl)phosphonium cation and tri(dimethylphenyl)phosphonium cation.

$R^{23}$ is preferably carbonium cation or ammonium cation, particularly preferably triphenylcarbonium cation, N,N-dimethylanilinium cation or N,N-diethylanilinium cation.

Also employable as the ionic compound is a trialkyl-substituted ammonium salt, a N,N-dialkylanilinium salt, a dialkylammonium salt or a triarylphosphonium salt.

Examples of the trialkyl-substituted ammonium salts include triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tri(n-butyl)ammoniumtetra(pentafluorophenyl)boron, tripropylammoniumtetra(o,p-dimethylphenyl)boron, tri(n-butyl)ammoniumtetra(m,m-dimethylphenyl)boron, tri(n-butyl)ammoniumtetra(p-trifluoromethylphenyl)boron, tri(n-butyl)ammoniumtetra(3,5-ditrifluoromethylphenyl)boron and tri(n-butyl)ammoniumtetra(o-tolyl)boron.

Examples of the N,N-dialkylanilinium salts include N,N-dimethylaniliniumtetra(phenyl)boron, N,N-diethylaniliniumtetra(phenyl)boron and N,N-2,4,6-pentamethylaniliniumtetra(phenyl)boron.

Examples of the dialkylammonium salts include di(1-propyl)ammoniumtetra(pentafluorophenyl)boron and dicyclohexylammoniumtetra(phenyl)boron.

Further employable as the ionic compounds are triphenylcarbeniumtetrakis(pentafluorophenyl)borate, N,N-dimethylaniliniumtetrakis(pentafluorophenyl)borate, ferroceniumtetra(pentafluorophenyl)borate, triphenylcarbeniumpentaphenylcyclopentadienyl complex, N,N-diethylaniliniumpentaphenylcyclopentadienyl complex and a boron compound represented by the formula (VII):

(VII)

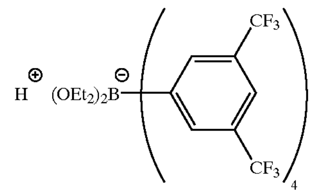

wherein Et is an ethyl group, or the formula (VIII):

(VIII)

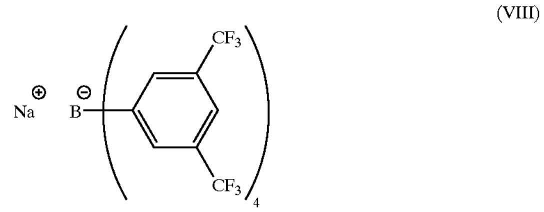

Examples of the borane compounds include salts of metallic carborane anions, such as tri(n-butyl)ammoniumbis(nonahydrido-1,3-dicarbanonaborate)cobaltate(III), tri(n-butyl)ammoniumbis(undecahydrido-7,8-dicarbaundecaborate) ferrate (III), tri(n-butyl)ammoniumbis(undecahydrido-7,8-dicarbaundecaborate)cobaltate(III), tri(n-butyl)ammoniumbis(undecahydrido-7,8-dicarbaundecaborate)nickelate(III), tri(n-butyl)ammoniumbis(undecahydrido-7,8-dicarbaundecaborate)cuprate(III), tri(n-butyl)ammoniumbis(undecahydrido-7,8-dicarbaundecaborate)aurate(III), tri((n-butyl)ammoniumbis(nonahydrido-7,8-dimethyl-7,8-dicarbaundecaborate)ferrate(III), tri(n-butyl)ammoniumbis(nonahydrido-7,8-dimethyl-7,8-dicarbaundecaborate)chromate(III), tri(n-butyl)ammoniumbis(tribromooctahydrido-7,8-dicarbaundecaborate)cobaltate(III), tris[tri(n-butyl)ammonium]bis(undecahydrido-7-carbaundecaborate)chromate(III), bis[tri(n-butyl)ammonium]bis(undecahydrido-7-carbaundecaborate)manganate(IV), bis[tri(n-butyl)ammonium]bis(undecahydrido-7-carbaundecaborate)cobaltate(III) and bis[tri(n-butyl)ammonium]bis(undecahydrido-7-carbaundecaborate)nickelate(IV).

The heteropoly compound comprises an atom of silicon, phosphorus, titanium, germanium, arsenic or tin and one or more atoms selected from vanadium, niobium, molybdenum and tungsten. Examples of such compounds include phosphovanadic acid, germanovanadic acid, arsenovanadic acid, phosphoniobic acid, germanoniobic acid, silicomolybdic acid, phosphomolybdic acid, titanomolybdic acid, germanomolybdic acid, arsenomolybdic acid, stannomolybdic acid, phosphotungstic acid, germanotungstic acid, stannotungstic acid, phosphomolybdovanadic acid, phosphotungstovanadic acid, germanotaungstovanadic acid, phosphomolybdotungstovanadic acid, germanomolybdotungstovanadic acid, phosphomolybdotungstic acid, phosphomolybdoniobic acid, metallic salts of these acids, specifically, salts of these acids, for example with metals of Group 1 or 2 of the periodic table such as lithium, sodium, potassium, rubidium, cesium, beryllium, magnesium, calcium, strontium and barium and organic salts of the above acids such as with triphenylethyl salt, but not limited thereto.

The ionizing ionic compounds (B-3) mentioned above may be used singly or in combination of two or more kinds.

If the transition metal compound (A) is used as an olefin polymerization catalyst and an organoaluminum oxy-compound such as methylaluminoxane is used as a co-catalyst component in combination with the compound (A), the olefin polymerization catalyst exhibits extremely high polymerization activity to olefins.

In the present invention, the transition metal compound represented by any one of the formulas (I), (II-a), (II-b) and (III) may be used singly as an olefin polymerization catalyst, or there may be used an olefin polymerization catalyst comprising:

(A) the transition metal compound, and (B) at least one compound selected from:

(B-1) an organoaluminum compound, (B-2) an organoaluminum oxy-compound, and (B-3) a compound which reacts with the transition metal compound (A) to form an ion pair.

If the transition metal compound (A) represented by the formula (III) is used in combination with the component (B), a compound represented by the following formula (III-a) is formed in the polymerization system.

(III-a)

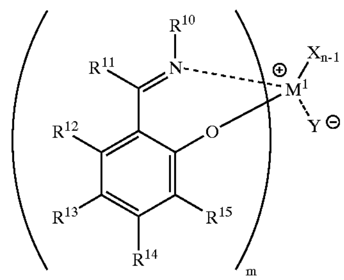

In the above formula, $R^{10}$ to $R^{15}$, $M^1$, m, n and X have the same meanings as those of $R^{10}$ to $R^{15}$, $M^1$, m, n and X in the formula (III), and Y is a so-called weak coordination anion.

In the formula (III-a), the bond between the metal M and Y may be a covalent bond or an ionic bond.

Y is, for example, a weak coordination anion described in "Chemical Review", vol. 88, p. 1405 (1988), "Chemical Review", vol. 97, p. 927 (1993), or WO98/30612, p. 6, and specific examples thereof include the following compounds:

$AlR^{4-}$ wherein each R may be the same or different and is an oxygen atom, a nitrogen atom, a phosphorus atom, a hydrogen atom, a halogen atom, a substituent containing any of these atoms, an aliphatic hydrocarbon group, an aromatic hydrocarbon group, an alicyclic hydrocarbon group, a substituent wherein an aliphatic, aromatic or alicyclic hydrocarbon group is substituted with an oxygen atom, a nitrogen atom, a phosphorus atom or a halogen atom, or a substituent wherein an aliphatic, aromatic or alicyclic hydrocarbon group is substituted with a substituent having an oxygen atom, a nitrogen atom, a phosphorus atom or a halogen atom;

$BR^{4-}$ wherein each R may be the same or different and is an oxygen atom, a nitrogen atom, a phosphorus atom, a halogen atom, a substituent containing any of these atoms, an aliphatic hydrocarbon group, an aromatic hydrocarbon group, an alicyclic hydrocarbon group, a substituent wherein an aliphatic, aromatic or alicyclic hydrocarbon group is substituted with an oxygen atom, a nitrogen atom, a phosphorus atom or a halogen atom, or a substituent wherein an aliphatic, aromatic or alicyclic hydrocarbon group is substituted with a substituent having an oxygen atom, a nitrogen atom, a phosphorus atom or a halogen atom;

$PF^{6-}$; $SbR^{5-}$; trifluoromethane sulfonate; and p-toluene sulfonate.

The olefin polymerization catalyst employable in the invention can contain the following carrier (C) and/or the later-described organic compound (D), if necessary, in addition to the transition metal compound (A) and at least one compound (B) (sometimes referred to as a "component (B)" hereinafter) selected from the organometallic compound (B-1), the organoaluminum oxy-compound (B-2) and the ionizing ionic compound (B-3).

(C) Carrier

The carrier (C) optionally used in the invention is an inorganic or organic compound in the form of granular or particulate solid. As the inorganic compounds, porous oxides, inorganic halides, clay, clay minerals or ion-exchange layered compounds are preferable.

Examples of the porous oxides include $SiO_2$, $Al_2O_3$, MgO, ZrO, $TiO_2$, $B_2O_3$, CaO, ZnO, BaO, $ThO_2$, and complex compounds or mixtures containing these oxides, such as natural or synthetic zeolite, $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Of these, preferable are compounds containing $SiO_2$ and/or $Al_2O_3$ as the main component.

The inorganic oxides may contain small amounts of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Although the porous oxides differ in their properties depending upon the type and the preparation process thereof, the carrier preferably used in the invention has a particle diameter of 10 to 300 $\mu$m, preferably 20 to 200 $\mu$m, a specific surface area of 50 to 1000 $m^2/g$, preferably 100 to 700 $m^2/g$, and a pore volume of 0.3 to 3.0 $cm^3/g$. If necessary, the carrier may be calcined at 100 to 1,000° C., preferably 150 to 700° C., prior to use.

Examples of the inorganic halides employable in the invention include $MgCl_2$, $MgBr_2$, $MnCl_2$ and $MnBr_2$. The inorganic halide may be used as it is, or may be used after pulverized by, for example, a ball mill or an oscillating mill. The inorganic halide may also be used as fine particles of a obtained by dissolving the inorganic chloride in a solvent such as alcohol and then precipitating using a precipitant.

The clay employable as a carrier in the invention is generally composed mainly of clay minerals. The ion-exchange layered-compounds employable as a carrier in the invention is compounds having a crystal structure wherein planes formed by ionic bonding or the like are laminated in parallel to one another with a weak bond strength, and the ions contained therein are exchangeable. Most of clay minerals are ion-exchange layered compounds. The clay, the clay minerals and the ion-exchange layered compounds employable in the invention are not limited to natural ones but include synthetic ones.

Examples of such clay, clay minerals and ion-exchange layered compounds include clay, clay minerals and ion crystalline compounds having layered crystal structures such as hexagonal closest packing type, antimony type, $CdCl_2$ type and $CdI_2$ type.

Particular examples of the clay and the clay minerals include kaolin, bentonite, kibushi clay, gairome clay, allophane, hisingerite, pyrophyllite, mica, montmorillonite, vermiculite, chlorite, palygorskite, kaolinite, nacrite, dickite and halloysite. Particular examples of the ion-exchange layered compounds include crystalline acid salts of polyvalent metals, such as $\alpha$-$Zr(HAsO_4)_2.H_2O$, $\alpha$-$Zr(HPO_4)_2$, $\alpha$-$Zr(KPO_4)_2.3H_2O$, $\alpha$-$Ti(HPO_4)_2$, $\alpha$-$Ti(HAsO_4)_2.H_2O$, $\alpha$-$Sn(HPO_4)_2.H_2O$, $\gamma$-$Zr(HPO_4)_2$, $\gamma$-$Ti(HPO_4)_2$ and $\gamma$-$Ti(NH_4PO_4)_2.H_2O$, The clay, the clay minerals and the ion-exchange layered compounds are preferably those having a pore volume, as measured on pores having a radius of not less than 20 Å by a mercury penetration method, of not less than 0.1 cc/g, and are particularly preferably those having a pore volume of 0.3 to 5 cc/g. The pore volume is measured on the pores having a radius of 20 to $3\times10^4$ Å by a mercury penetration method using a mercury porosimeter.

If a compound having a pore volume, as measured on pores having a radius of not less than 20 Å, of less than 0.1 cc/g is used as the carrier, high polymerization activity tends to be hardly obtained.

It is also preferable that the clay and the clay minerals to be used in the invention are subjected to chemical treatments. Any of surface treatments, for example, to remove impurities attached to the surface and to influence on the crystal stricture of the clay, are employable. Examples of such chemical treatments include acid treatment, alkali treatment, salt treatment and organic substance treatment. The acid treatment can contribute to not only removing impurities from the surface but also eluting cations such as Al, Fe and Mg present in the crystal structure to increase the surface area. The alkali treatment can destroy crystal structure of clay to bring about change in the structure of the clay. The salt treatment and the organic substance treatment can produce, for example, ionic composites, molecular composites, or organic derivative to change the surface area or the distance between layers.

The ion-exchange layered compound for use in the invention may be a layered compound in which the exchangeable ions between layers have been exchanged with other large and bulky ions utilizing ion exchange properties to enlarge the distance between the layers. The bulky ion plays a pillar-like roll to support the layer structure and is generally called a "pillar". Introduction of other substances between layers of a layered compound is called "intercalation". Examples of the guest compounds to be intercalated include cationic inorganic compounds, such as $TiCl_4$ and $ZrCl_4$; metallic alkoxides, such as $Ti(OR)_4$, $Zr(OR)_4$, $PO(OR)_3$ and $B(OR)_3$ (R is a hydrocarbon group or the like); and metallic hydroxide ions, such as $[Al_{13}O_4(OH)_{24}]^{7+}$, $[Zr_4(OH)_{14}]^{2+}$ and $[Fe_3O(OCOCH_3)_6]^+$.

The compounds mentioned above may be used singly or in combination of two or more kinds.

The intercalation of the compounds may be carried out in the presence of polymers obtained by hydrolysis of metallic alkoxides such as $Si(OR)_4$, $Al(OR)_3$ and $Ge(OR)_4$ (R is a hydrocarbon group or the like) or in the presence of colloidal inorganic compounds such as $SiO_2$. Examples of the pillars include oxides produced by Intercalation of the above-mentioned metallic hydroxide ions between layers, followed by dehydration under heating.

The clay, clay minerals and ion-exchange layered compounds mentioned above may be used as they are, or may be used after they are subjected to a treatment of ball milling, sieving or the like. Moreover, they may be used after they are subjected to water adsorption or dehydration under heating. The clay, clay minerals and ion-exchange layered compounds may be used singly or in combination of two or more kinds.

Of the above-mentioned materials, preferable are clay and clay minerals, and particularly preferable are montmorillonite, vermiculite, hectorite, tenorite and synthetic mica.

The organic compound is, for example, a granular or particulate solid compound having a particle diameter of 10 to 300 μm. Examples of such compounds include (co) polymers produced using an $\alpha$-olefin of 2 to 14 carbon atoms such as ethylene, propylene, 1-butene or 4-methyl-1-pentene as a main ingredient, (co)polymers produced using vinylcyclohexane or styrene as a main ingredient, and modified products thereof.

(D) Organic Compound Component

In the present invention, the organic compound component (D) is optionally used to improve polymerizability and properties of the resulting polymer. Examples of the organic compounds include alcohols, phenolic compounds, carboxylic acids, phosphorus compounds and sulfonates, but not limited thereto.

As the alcohols and the phenolic compounds, those represented by $R^{28}$—OH ($R^{28}$ is a hydrocarbon group of 1 to 50 carbon atoms or a halogenated hydrocarbon group of 1 to 50 carbon atoms) are generally employed.

Preferable alcohols are those wherein $R^{28}$ is a halogenated hydrocarbon group. Preferable phenolic compounds are preferably those wherein the $\alpha,\alpha'$-positions to the hydroxyl group are substituted with hydrocarbon groups of 1 to 20 carbon atoms.

As the carboxylic acids, those represented by $R^{29}$—COOH ($R^{29}$ is a hydrocarbon group of 1 to 50 carbon atoms or a halogenated hydrocarbon group of 1 to 50 carbon atoms, preferably a halogenated hydrocarbon group of 1 to 50 carbon atoms) are generally employed.

As the phosphorus compounds, phosphoric acids having P—O—H bond, phosphates having P—OR bond or P═O bond and phosphine oxide compounds are preferably employed.

The sulfonates used in the invention are those represented by the following formula (IX):

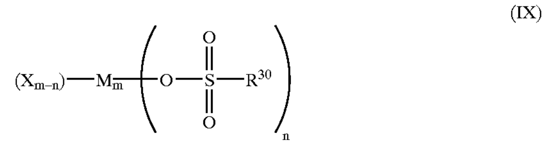

In the above formula, M is an element of Group 1 to Group 14 of the periodic table.

$R^{30}$ is hydrogen, a hydrocarbon group of 1 to 20 carbon atoms or a halogenated hydrocarbon group of 1 to 20 carbon atoms.

X is a hydrogen atom, a halogen atom, a hydrocarbon group of 1 to 20 carbon atoms or a halogenated hydrocarbon group of 1 to 20 carbon atoms.

m is an integer of 1 to 7, and $1\leqq n\leqq 7$.

In FIG. 1, an example of the process for preparing an olefin polymerization catalyst which is occasionally used in the present invention is shown.

Some examples of the processes are given below, though the methods to use the components and the order of feeding the components are optionally selected.

(1) The transition metal compound (A) is singly fed to the polymerization reactor.

(2) The transition metal compound (A) and the component (B) are fed to the polymerization reactor in an ordinary order.

(3) A catalyst component wherein the transition metal compound (A) is supported on the carrier (C) and the component (B) are fed to the polymerization reactor in an ordinary order.

(4) A catalyst component wherein the component (B) is supported on the carrier (C) and the transition metal compound (A) are fed to the polymerization reactor in an ordinary order.

(5) A catalyst component wherein the transition metal compound (A) and the component (B) are supported on the carrier (C) is fed to the polymerization reactor.

In the above processes (2) to (5), at least two of the catalyst components may be previously contacted with each other.

In the processes (4) and (5) in which the component (B) having been supported is used, the component (B) having been not supported may be added in an arbitrary order. In this case, these components (B) may be the same or different.

Onto the solid catalyst component wherein the transition metal compound (A) is supported on the carrier (C) or the transition metal compound (A) and the component (B) are supported on the carrier (C), an olefin may be prepolymerized, and on the thus prepolymerized solid catalyst component, a catalyst component may be further supported.

In the olefin polymerization process according to the invention, an olefin of 2 to 20 carbon atoms is polymerized or copolymerized in the presence of the olefin polymerization catalyst to obtain a polymer. Examples of the olefins of 2 to 20 carbon atoms include the same olefins as previously described.

In the present invention, the polymerization can be carried out as any of liquid phase polymerization such as solution polymerization or suspension polymerization and gas phase polymerization.

Examples of inert hydrocarbon media used for the liquid phase polymerization include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons. The olefin itself can be used as a solvent.

In the polymerization of an olefin of 2 to 20 carbon atoms using the olefin polymerization catalyst, the transition metal compound (A) is used in an amount of usually $10^{-12}$ to 1 mol, preferably $10^{-10}$ to $10^{-2}$ mol, based on 1 liter of the reaction volume.

In the use of the component (B-1), the component (B-1) is used in such an amount that the molar ratio ((B-1)/M) of the component (B-1) to the transition metal atom (M) in the transition metal compound (A) becomes usually 0.01 to 100,000, preferably 0.05 to 50,000. In the use of the component (B-2), the component (B-2) is used in such an amount that the molar ratio ((B-2)/M) of the component (B-2) to the transition metal atom (M) in the transition metal compound (A) becomes usually 10 to 500,000, preferably 20 to 100,000. In the use of the component (B-3), the component (B-3) is used in such an amount that the molar ratio ((B-3)/M) of the component (B-3) to the transition metal atom (M) in the transition metal compound (A) becomes usually 1 to 10, preferably 1 to 5.

When the component (D) is used and the component (B-1) is used as the component (B), the component (D) is used in such an amount that the molar ratio ((D)/(B-1)) becomes usually 0.01 to 10, preferably 0.1 to 5. When the component (D) is used and the component (B-2) is used as the component (B), the component (D) is used in such an amount that the molar ratio ((D)/(B-2)) becomes usually 0.001 to 2, preferably 0.005 to 1. When the component (D) is used and the component (B-3) is used as the component (B), the component (D) is used in such an amount that the molar ratio ((D)/(B-3)) becomes usually 0.01 to 10, preferably 0.1 to 5.

In the olefin polymerization using the olefin polymerization catalyst, the polymerization temperature is in the range of usually −40 to +200° C., preferably 0 to +100° C., and the polymerization pressure is in the range of usually atmospheric pressure to 100 kg/cm$^2$, preferably atmospheric pressure to 50 kg/cm$^2$. The polymerization reaction can be carried out by any one of batchwise, semi-continuous and continuous processes. It is possible to conduct the polymerization in two or more steps under the different reaction conditions.

The molecular weight of the resulting olefin polymer can be modified by controlling the monomer/catalyst ratio or the polymerization time.

By the process of the invention, an olefin polymer such as the aforesaid olefin polymer having a number-average molecular weight of not less than 500, preferably 500 to 10,000,000, more preferably 1,000 to 5,000,000, and Mw/Mn of not more than 1.5, preferably not more than 1.3, is obtained.

According to the process of the invention, an olefin polymer having a high molecular weight and a narrow molecular weight distribution can be obtained with high polymerization activity, or an olefin tapered polymer or an olefin block copolymer precisely controlled in the structure can be obtained with high polymerization activity.

Another embodiment of the process for preparing an olefin polymer according to the invention comprises contacting the polymer obtained as above with a functional group-containing compound to prepare such an olefin polymer having a functional group at the terminal as previously described. A compound capable of being converted into a functional group is included in the functional group-containing compound.

Examples of the functional group-containing compounds or the compounds capable of being converted into a functional group include compounds having functional groups such as an aromatic hydrocarbon group, a halogen atom, an oxygen-containing group, a nitrogen-containing group, a phosphorus-containing group and a metal atom-containing group. Specifically, there can be mentioned an aromatic vinyl compound, iodine, chlorine, bromine, carbon dioxide, an ester compound, an aldehyde compound, a carboxylic acid compound, oxygen, an alkylamine compound, a silicon alkylhalide, an alkylaluminum compound, an alkylboron compound, an alkylzinc compound, an alkyllithium compound and the like.

After the contact with the functional group-containing compound, the functional group can be converted into another functional group by a known method.

In the contact of the olefin polymer with the functional group-containing compound, the temperature is in the range of −78 to +300° C., preferably −78 to +200° C., and the pressure is in the range of usually atmospheric pressure to 100 $kg/cm^2$, preferably atmospheric pressure to 50 $kg/cm^2$. The contact time is in the range of usually 1 minute to 100 hours, preferably 10 minutes to 24 hours.

The contact of the olefin polymer with the functional group-containing compound can be carried out in a solvent or without a solvent. Examples of the solvents employable herein include aliphatic hydrocarbons, such as propane, butane, pentane, hexane, heptane, octane, decane, dodecane and kerosine; alicyclic hydrocarbons, such as cyclopentane, cyclohexene and methylcyclopentane; aromatic hydrocarbons, such as benzene, toluene and xylene; halogenated hydrocarbons, such as ethylene chloride, chlorobenzene and dichloromethane; oxygen-containing compounds, such as diethyl ether and tetrahydrofuran; and mixtures thereof.

A further embodiment of the process for preparing an olefin polymer according to the invention comprises polymerizing at least two olefins which are selected from olefins of 2 to 20 carbon atoms and have different polymerization reactivities, in the presence of an olefin polymerization catalyst comprising the aforesaid transition metal compound (A) to prepare a tapered polymer containing a segment wherein composition of two or more monomers continuously changes.

As described hereinbefore, the tapered polymer is a polymer in which the comonomer composition gradually changes from one end to the other end of the polymer chain. This polymer can be synthesized by polymerizing two or more monomers having different reactivities (e.g., ethylene and propylene) in a living polymerization system wherein chain transfer reaction does not substantially take place.

Examples of the methods to feed the monomers include a method in which plural monomers are fed with continuously changing the monomer composition and a method in which plural monomers are fed together in the initial stage of the polymerization and a difference of polymerization reactivities of the monomers is taken advantage of to obtain a tapered polymer. The temperature, pressure, addition of the catalyst and supporting on the carrier an the polymerization are the same as those described previously.

The two or more kinds of monomers are selected from the aforesaid olefins of 2 to 20 carbon atoms, they are preferably selected from ethylene, propylene, 1-butene, 1-pentene, 1-hexene, 1-heptene and 1-octene, and they are more preferably selected from ethylene, propylene and 1-butene.

A still further embodiment of the process for preparing an olefin polymer according to the invention comprises conducting the following step (1), the following step (2), and optionally, the following step (3) of an arbitrary number of times, to prepare an olefin block copolymer comprising plural polymer blocks.

In the step (1), at least one olefin selected from olefins of 2 to 20 carbon atoms is polymerized in the presence of the aforesaid olefin polymerization catalyst to prepare a polymer block.

Examples of the olefins of 2 to 20 carbon atoms include the same olefins as previously described, and they can be used singly or in combination of two or more kinds. Examples of the polymer blocks include the same blocks as previously described.

In the step (1), the polymerization temperature is in the range of usually −40 to +200° C., preferably 0 to +150° C., and the polymerization pressure is in the range of usually atmospheric pressure to 100 $kg/cm^2$, preferably atmospheric pressure to 50 $kg/cm^2$.

In the step (2), at least one olefin selected from olefins of 2 to 20 carbon atoms is polymerized in the presence of the polymer block prepared in the step (1) to prepare a polymer block which is different from the polymer block prepared in the step (1).

The different polymer block means a polymer block which is different in at least one of primary structures, such as monomer type, comonomer type, comonomer composition, comonomer content, comonomer configuration and stereoregularity.

Examples of the olefins of 2 to 20 carbon atoms include the same olefins as previously described, and they can be used singly or in combination of two or more kinds. Examples of the polymer blocks obtained in the step (2) include the same blocks as previously described.

In the step (2), the polymerization temperature is in the range of usually −40 to +200° C., preferably 0 to +150° C., and the polymerization pressure is in the range of usually atmospheric pressure to 100 $kg/cm^2$, preferably atmospheric pressure to 50 $kg/cm^2$.

In the step (3), at least one olefin selected from olefins of 2 to 20 carbon atoms is polymerized in the presence of the polymer block prepared in the step (1) and the polymer block prepared in the step (2) to prepare a polymer block which is different from the polymer blocks prepared in the previous step.

Examples of the olefins of 2 to 20 carbon atoms include the same olefins as previously described, and they can be used singly or in combination or two or more kinds. Examples of the polymer blocks obtained in the step (3) include the same blocks as previously described.

In the step (3), the polymerization temperature is in the range of usually −40 to +200° C., preferably 0 to +150° C., and the polymerization pressure is in the range of usually atmospheric pressure to 100 $kg/cm^2$, preferably atmospheric pressure to 50 $kg/cm^2$.

The step (3) can be repeated arbitrary times with changing types of the olefins, combination thereof or polymerization conditions.

Through the process of the invention, for example, the aforesaid olefin block copolymer is obtained.

According to the process of the invention, an olefin block copolymer having a high molecular weight and a narrow molecular weight distribution can be obtained at a high polymerization temperature with high polymerization activity.

In the present invention, the block copolymer obtained above can be contacted with a functional group-containing compound to obtain an olefin block copolymer having a functional group at the terminal.

The contact of the olefin block copolymer with the functional group-containing compound is carried out in the same manner as previously described.

A still further embodiment of the process for preparing an olefin polymer according to the invention comprises polymerizing an olefin in the presence of a polymerization catalyst which promotes living polymerization of an olefin and further conducting olefin polymerization by the use of a catalyst obtained by cleaving a bond produced in the system between the catalyst and the resulting polymer chain by means of chain transfer reaction.

Promotion of the living polymerization can be confirmed by the narrow molecular weight distribution of the resulting polymer and the increase of the molecular weight of the resulting polymer with polymerization time. According to the process of the invention, it is feasible to prepare, for example, the monodisperse polyolefin, the olefin copolymer, the tapered polymer or the olefin copolymer mentioned above.

To confirm whether the living polymerization proceeds or not, it is most preferable to polymerize an olefin under the same conditions except for using no chain transfer agent.

To confirm whether the monodisperse polyolefin, the olefin copolymer, the tapered polymer or the olefin block copolymer can be prepared or not, it is most preferable to polymerize an olefin under the same conditions except for not performing a cleaving operation by the chain transfer reaction (i.e., the same conditions except for using no chain transfer agent).

In this process, the following olefin polymerization catalysts (1) to (5) are employable.

(1) An olefin polymerization catalyst comprising a Group 4 metallocene compound and a soluble non-coordination anionic compound Examples of such catalysts include those of the following formulas.

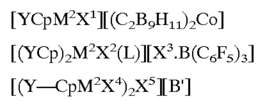

$[YCpM^2X^1][(C_2B_9H_{11})_2Co]$ $[(YCp)_2M^2X^2(L)][X^3.B(C_6F_5)_3]$ $[(Y—CpM^2X^4)_2X^5][B']$

In the above formulas, $M^2$ is titanium, zirconium or hafnium,

Y is at least one hydrocarbon group of 1 to 20 carbon atoms,

Cp is a ligand having cyclopentadienyl skeleton, and when plural Cp are contained, they are the same or different, $X^1$ to $X^5$ are each the same as the aforesaid X, L is a Lewis acid, and B' is the aforesaid non-coordination anion.

(2) An olefin polymerization catalyst that is a combination of $(YCp)_2SmX^6$, $Y—CpTaX^7$ or $Y—CpNbX^8$ (Y and Cp are each the same as that described above, and $X^6$ to $X^8$ are each the same as the aforesaid X) and methylaluminoxane (3) A compound represented by the following formula:

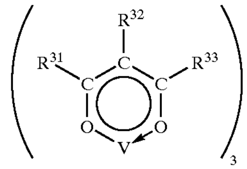

wherein $R^{31}$ to $R^{33}$ are each a hydrogen atom, an alkyl group of 1 to 8 carbon atoms or an aryl group, with the proviso that at least one of $R^{31}$ to $R^{33}$ needs to be a hydrogen atom but there is no case where $R^{31}$ to $R^{33}$ are all hydrogen atoms at the same time.

(4) Compound represented by the following formula:

In the above formula, $M^3$ is a transition metal atom of Group 8 to Group 10 of the periodic table, preferably nickel, palladium or platinum.

$R^{34}$ to $R^{37}$ may be the same or different and are each a hydrocarbon group of 1 to 50 carbon atoms, a halogenated hydrocarbon group of 1 to 50 carbon atoms, an organic silyl group, or a hydrocarbon group substituted with a substituent containing at least one element selected from nitrogen, oxygen, phosphorus, sulfur and silicon.

Two or more of the groups indicated by $R^{34}$ to $R^{37}$, preferably adjacent groups, may be boned to each other to form a ring.

q is an integer of 0 to 4.

$X^9$ is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When q is 2 or greater, plural groups X may be the same or different.

(5) Compound represented by the following formula:

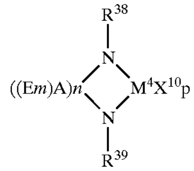

In the above formula, $M^4$ is a transition metal atom of Group 3 to Group 6 of the periodic table, preferably titanium, zirconium or hafnium.

$R^{38}$ and $R^{39}$ may be the same or different and are each a hydrogen atom, a hydrocarbon group of 1 to 50 carbon atoms, a halogenated hydrocarbon group of 1 to 50 carbon atoms, an organic silyl group, or a substituent having at least one element selected from nitrogen, oxygen, phosphorus, sulfur and silicon.

m is an integer of 0 or 2, and n is an integer of 1 to 5.

A is an atom of Group 13 to Group 16 of the periodic table, specifically boron, carbon, nitrogen, oxygen, silicon, phosphorus, sulfur, germanium, selenium, tin or the like, preferably carbon or silicon.

When n is 2 or greater, plural A may be the same or different.

E is a substituent having at least one element selected from carbon, hydrogen, oxygen, halogen, nitrogen, sulfur, phosphorus, boron and silicon. When plural groups indicated by E exist, two of E may be the same or different, or may be bonded to each other to form a ring.

p is an integer of 0 to 4.

$X^{10}$ is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When p is 2 or greater, plural groups $X^{10}$ may be the same or different.

Examples of the olefin compounds of 1 to 20 carbon atoms for use in the polymerization include the same straight-chain or branched α-olefins of 2 to 20 carbon atoms as previously described, cycloolefins of 3 to 20 carbon atoms, vinylcyclohexane, dienes, polyenes and aromatic vinyl compounds. These olefins can be used singly or in combination or two or more kinds.

Also employable as the olefins in the present invention are monomers having atoms other than carbon and hydrogen, and examples of such monomers include α,β-unsaturated carboxylic acids, cycloolefin carboxylic acids, anhydrides thereof, metallic salts thereof, such as sodium salts, potassium salts, lithium salts, zinc salts, magnesium salts and calcium salts thereof, α,β-unsaturated carboxylic esters, vinyl esters, unsaturated glycidyls, halogenated olefins, unsaturated cyano compounds, unsaturated ketones, unsaturated ethers, functional group-containing styrene derivatives and vinyl group-containing heterocyclic compounds.

At least one olefin of the olefins employable in the invention is an olefin consisting of only carbon and hydrogen. There is no specific limitation on the quantity ratio of the olefin consisting of only carbon and hydrogen to the whole olefins, but for example, the ratio is not less than 5% by mol and not more than 100% by mol based on the whole olefins. By the expression "at least one olefin" is meant that at least one kind of an olefin consisting of only carbon and hydrogen is contained in the whole olefin polymer of the invention, and in case of, for example, an olefin polymer composed of plural polymer blocks, the olefin consisting of only carbon and hydrogen may be contained in any of the polymer blocks.

In order to polymerize these olefins, the aforesaid conditions are employable. The polymerization temperature is in the range of usually −100 to +200° C., preferably −78 to +150° C., and the polymerization pressure is in the range of usually atmospheric pressure to 100 kg/cm$^2$, preferably atmospheric pressure to 50 kg/cm$^2$.

The chain transfer reaction is promoted by maintaining the temperature at a given temperature at which the reaction proceeds or by using at least one compound selected from hydrogen, an organoaluminum compound, an organoboron compound, an organozinc compound, an organosilicon compound, an organocadmium compound and an organolead compound.

The conditions to promote the chain transfer reaction may be the same as or different from the above-mentioned olefin polymerization conditions. The temperature is in the range of usually −100 to +200° C., preferably −78 to +150° C., and the pressure is in the range of usually atmospheric pressure to 100 kg/cm$^2$, preferably atmospheric pressure to 50 kg/cm$^2$.

To promote the chain transfer reaction by heat, it is preferable that the olefin compound is polymerized at a temperature at which the chain transfer does not proceed, then the temperature of the reaction system is maintained at a given temperature at which the chain transfer proceeds to promote the chain transfer reaction, and the polymerization is conducted again at a temperature at which the chain transfer reaction does not proceed. This operation may be repeated arbitrary times.

When the chain transfer reaction is promoted by the use of at least one compound selected from hydrogen, an organoaluminum compound, an organoboron compound, an organozinc compound, an organosilicon compound, an organocadmium compound and an organolead compound, this reaction agent may be present from the beginning of the polymerization or may be added later in any stage. In the preparation of a tapered polymer or a block copolymer, it is preferable to add the chain transfer agent after the intended polymer is produced in the system.

Examples of the chain transfer agents employable in the invention include hydrogen, an organoaluminum compound, an organoboron compound, an organozinc compound, an organosilicon compound, an organocadmium compound and an organolead compound. Specifically, there can be mentioned:

an organoaluminum compound represented by the formula:

$$R^a_m Al(OR^b)_n H_p X_q$$

wherein $R^a$ and $R^b$ may be the same or different, when plural $R^a$ or plural $R^b$ are present, they may be the same kind or two or more different kinds, $R^a$ and $R^b$ are each a hydrocarbon group of 1 to 15 carbon atoms, preferably 1 to 6 carbon atoms, X is a halogen atom, and m, n, p and q are numbers satisfying the conditions of $0<m\leqq 3$, $0\leqq n<3$, $0\leqq p<3$, $0\leqq q<3$ and $m+n+p+q=3$;

an organoboron compound represented by the following formula:

$$R^a_m B(OR^b)_n H_p X_q$$

wherein $R^a$ and $R^b$ may be the same or different, when plural $R^a$ or plural $R^b$ are present, they may be the same kind or two or more different kinds, $R^a$ and $R^b$ are each a hydrocarbon group of 1 to 15 carbon atoms, preferably 1 to 6 carbon atoms, X is a halogen atom, and m, n, p and q are numbers satisfying the conditions of $0<m\leqq 3$ (preferably $0<m\leqq 2$), $0\leqq n<3$ (preferably $0\leqq n<2$), $0\leqq p<3$ (preferably $1\leqq p<3$), $0\leqq q<3$ (preferably $0\leqq p<2$) and $m+n+p+q=3$;

an organosilicon compound represented by the following formula:

$$R^a_m Si(OR^b)_n H_p X_q$$

wherein $R^a$ and $R^b$ may be the same or different, when plural $R^a$ or plural $R^b$ are present, they may be the same kind or two or wore different kinds, $R^a$ and $R^b$ are each a hydrocarbon group of 1 to 15 carbon atoms, preferably 1 to 6 carbon atoms, X is a halogen atom, and m, n, p and q are numbers satisfying the conditions of $0<m\leqq 4$ (preferably $0<m\leqq 3$), $0\leqq n<4$ (preferably $0\leqq n<3$), $0\leqq p<4$ (preferably $1\leqq p<4$), $0\leqq q<4$ (preferably $0\leqq p<3$) and $m+n+p+q=4$;

an organolead compound represented by the following formula:

$$R^a_m Pb(OR^b)_n H_p X_q$$

wherein $R^a$ and $R^b$ may be the same or different, when plural $R^a$ or plural $R^b$ are present, they may be the same kind or two or more different kinds, $R^a$ and $R^b$ are each a hydrocarbon group of 1 to 15 carbon atoms, preferably 1 to 6 carbon atoms, X is a halogen atom, and m, n, p and q are numbers satisfying the conditions of $0<m\leqq 4$, $0\leqq n<4$, $0\leqq p<4$, $0\leqq q<4$ and $m+n+p+q=4$; and a dialkyl compound of zinc or cadmium, represented by the following formula:

$$R^a R^b M^4$$

wherein $R^a$ and $R^b$ may be the same or different and are each a hydrocarbon group of 1 to 15 carbon atoms, preferably 1 to 4 carbon atoms, and $M^4$ is Zn or Cd.

Specific examples of the above compounds include trialkylaluminums, such as trimethylaluminum, triethylaluminum, tri-b-butylaluminum, trioctylaluminum, tridecylaluminum, triisopropylaluminum and triisobutylaluminum, dialkylaluminum hydrides, such as diethylaluminum hydride, dibutylaluminum hydride and diisobutylaluminum hydride, alkylaluminum dihydrides, such as ethylaluminum dihydride and propylaluminum dihydride, borane, borane tetrahydrofuran complex, borane dimethylsulfide complex, borane dimethylamine complex, borane trimethylamine complex, borane trimethylphosphine complex, thexyl borane, 9-borabicyclo[3.3.1]nonane, triethylborane, trimethylborane, monoalkylsilane, dialkylsilane, trialkylsilane, diethylzinc, dimethylzinc, diethylcadmium, dimethylcadmium and tetraphenyllead.

Also employable are compounds by which the chain transfer agents are formed in the polymerization system.

Of the above compounds, preferable are hydrogen, an organozinc compound, an organoboron compound and an organosilicon compound, and particularly preferable are hydrogen, diethylzinc and a boron hydride compound.

The chain transfer agents mentioned above are used singly or in combination.

When the chain transfer agent is used, this agent is different from the organometallic compound used for forming an olefin polymerization catalyst, because the polymerization reaction in the present invention is characterized in that when the chain transfer agent is not used, progress of living polymerization is essential, and the chain transfer reaction proceeds by the addition of the chain transfer agent.

The chain transfer agent is used in such an amount that the molar ratio of the chain transfer agent to the transition metal compound becomes usually 0.1 to 10000, preferably 1 to 5000.

The olefin polymerization catalyst used in the above process is preferably an olefin polymerization catalyst containing the transition metal compound (A), and the process for preparing the tapered polymer, the olefin copolymer or the olefin block copolymer is preferable.

According to the process of the invention, an olefin polymer having a high molecular weight and a narrow molecular weight distribution can be obtained with high polymerization activity, or a tapered polymer or an olefin block copolymer precisely controlled in the structure can be obtained with high polymerization activity.

To the monodisperse polyolefin, the olefin copolymer, the tapered polymer, the olefin block copolymer or a polymer having a functional group at the terminal of any of these polymers, various additives may be added.

The monodisperse polyolefin, the olefin copolymer, the tapered polymer, the olefin block copolymer or a polymer having a functional group at the terminal of any of these polymers can be applied to various uses.

A composition containing the monodisperse polyolefin, the olefin copolymer, the tapered polymer, the olefin block copolymer or a polymer having a functional group at the terminal of any of these polymers can be molded into articles by a known molding method.

Of the olefin polymers of the invention, the block copolymer containing a rigid block and a soft block and the tapered polymer have properties of thermoplastic elastomers.

Examples of the uses of the polymers include automobile parts, such as side malls, bumpers, weatherstrips, glass run channels, boots and air duct hoses; industrial parts, such as packings, mats, belts and hoses; electric/electronic parts, such as electric wires, codes and silencing gears; sporting goods, such as sport shoes, ski shoes; and civil engineering/building materials, such as gaskets and water barrier sheets.

To the olefin polymers of the invention, thermoplastic resins, fillers, nucleating agents and additives used for polymers may be added in arbitrary amounts, and the polymers may be subjected to secondary modification such as crosslinking or blowing.

As the thermoplastic resins, crystalline thermoplastic resins, such as polyolefin, polyamide, polyester and polyacetal; and non-crystalline thermoplastic resins, such as polystyrene, acrylonitrile/butadiene/styrene copolymer (ABS), polycarbonate, polyphenylene oxide and polyacrylate, are employable. Polyvinyl chloride is also preferably employed.

Examples of the polyolefins include an ethylene polymer, a propylene polymer, a butene polymer, a 4-methyl-1-pentene polymer, a 3-methyl-1-butene polymer and a hexene polymer. Of these, an ethylene polymer, a propylene polymer and a 4-methyl-1-pentene polymer are preferable. As the ethylene polymer, an ethylene/polar-group containing vinyl copolymer is preferable.

Examples of the polyesters include aromatic polyesters, such as polyethylene terephthalate, polyethylene naphthalate and polybutylene terephthalate, polycaprolactone and polyhydroxybutyrate. Of these, polyethylene terephthalate is particularly preferable.

Examples of the polyamides include aliphatic polyamides, such as nylon-6, nylon-66, nylon-10, nylon-12 and nylon-46, and aromatic polyamides prepared from aromatic dicarboxylic acids and aliphatic diamines. Of these, nylon-6 is particularly preferable.

Examples of the polyacetals include polyformaldehyde (polyoxymethylene), polyacetaldehyde, polypropionaldehyde and polybutylaldehyde. Of these, polyformaldehyde is particularly preferable.

The polystyrene may be a homopolymer of styrene or a bipolymer of styrene and acrylonitrile, methyl methacrylate or α-methylstyrene.

As the ABS, preferably used is one comprising 20 to 35% by mol of constituent units derived from acrylonitrile, 20 to 30% by mol of constituent units derived from butadiene and 40 to 60% by mol of constituent units derived from styrene.

Examples of the polycarbonates include polymers obtained from bis(4-hydroxyphenyl)methane, 1,1-bis(4-hydroxyphenyl)ethane, 2,2-bis(4-hydroxyphenyl)propane and 2,2-bis(4-hydroxyphenyl)butane. Of these, polycarbonate obtained from 2,2-bis(4-hydroxyphenyl)propane is particularly preferable.

As the polyphenylene oxide, poly(2,6-dimethyl-1,4-phenyleneoxide) is preferably employed.

As the polyacrylate, polymethyl methacrylate or polybutyl acrylate is preferably employed.

The thermoplastic resins mentioned above may be used singly or in combination or two or more kinds.

The olefin block copolymer of the invention may further contain, in addition to the thermoplastic resin, a crosslinking agent, a filler, a crosslinking accelerator, a crosslinking assistant, a softener, a tackifier, an anti-aging agent, a blowing agent, a processing aid, an adhesion imparting agent, an inorganic filler, an organic filler, a nucleating agent, a heat stabilizer, a weathering stabilizer, an antistatic agent, a colorant, a lubricant, a flame retardant, an anti-blooming agent and the like.

Crosslinking Agent

The crosslinking agent is, for example, sulfur, a sulfur compound or an organic peroxide. An organic peroxide having a temperature, at which the half-life period corresponds to 1 minute, of 130 to 200° C. is preferable, and specifically, dicumyl peroxide, di-t-butyl peroxide, di-t-butyl peroxy-3,3,5-trimethylcyclohexane, t-butylcumyl peroxide, di-t-amyl peroxide, t-butyl hydroperoxide, 2,5-dimethyl-2,5-di-(t-butylperoxy)hexane or the like is preferable. When the organic peroxide is used as the crosslinking agent, it is preferable to use a crosslinking assistant in combination.

Of the various crosslinking agents, sulfur or a sulfur compound, particularly sulfur, is preferably used because a crosslinked product having excellent properties can be obtained. However, an organic peroxide is more preferably used because it has particularly excellent crosslinking efficiency.

Crosslinking Accelerator

As the crosslinking accelerator, N-cyclohexyl-2-benzothiazole sulfenamide (CBZ), N-oxydiethylene-2-benzothiazole sulfenamide, N,N-diisopropyl-2- benzothiazole sulfenamide, 2-mercaptobenzothiazole, 2-(2, 4-dinitrophenyl)mercaptobenzothiazole or the like is employed.

Crosslinking Assistant

The crosslinking assistant is used for organic peroxide crosslinking. Examples of the crosslinking assistants include sulfur; quinone dioxime compounds, such as p-quinone dioxime and p,p'-dibenzoylquinone dioxime; and polyfunctional monomers, such as (meth)acrylate compounds (e.g., trimethylolpropane triacrylate and polyethylene glycol dimethacrylate), allyl compounds (e.g., diallyl phthalate and triallyl cyanurate), maleimide compounds (e.g., N,N'-m-phenylenebismaleimide) and divinylbenzene.

Softener

As the softeners, those heretofore added to rubbers are widely used, and examples thereof include petroleum type softeners, such as process oil, lubricating oil, paraffin, liquid paraffin, petroleum asphalt and vaseline; coal tar type softeners, such as coal tar and coal tar pitch; aliphatic oil type softeners, such as castor oil, linseed oil, rapeseed oil and coconut oil; tall oil; factice; waxes, such as beeswax, carnauba wax and lanoline; fatty acids and fatty acid salts, such as ricinolic acid, palmitic acid, barium stearate, calcium stearate and zinc laurate; and synthetic polymer materials, such as petroleum resin, atactic polypropylene and coumarone-indene resin. Of these, petroleum type softeners are preferably employed, and process oil is particularly preferably employed.

Blowing Agent

As the blowing agents, those generally used for blow-molding of rubbers are widely used, and examples thereof include inorganic blowing agents, such as sodium bicarbonate, sodium carbonate, ammonium bicarbonate, ammonium carbonate and ammonium nitrite; nitroso compounds, such as N,N'-dimethyl-N'N'-dinitrosoterephthalamide and N,N'-dinitrosopentamethylenetetramine; azo compounds, such as azodicarbonamide, azobisisobutyronitrile, azocyclohexylnitrile, azodiaminobenzene and barium azodicarboxylate; sulfonyl hydrazide compounds, such as benzenesulfonyl hydrazide, toluenesulfonyl hydrazide, p,p'-oxybis(benzenesulfonylhydrazide) and diphenylsulfon-3,3'-disulfonyl hydrazide; and azide compounds, such as calcium azide, 4,4-diphenyldisulfonyl azide and p-toluenesulfonyl azide. Of these, preferable are nitroso compounds, azo compounds and azide compounds.

Blowing Assistant

The blowing assistant can be used in combination with the blowing agent. Use of the blowing assistant in combination contributes to lowering of decomposition temperature of the blowing agent, acceleration of decomposition thereof and production of uniform bubbles. Examples of such blowing assistants include organic acids, such as salicylic acid, phthalic acid, stearic acid and oxalic acid; and urea or its derivatives.

Processing Aid

Examples of the processing aids include acids, such as ricinolic acid, stearic acid, palmitic acid and lauric acid; salts of these higher fatty acids, such as barium stearate, zinc stearate and calcium stearate; and esters.

Adhesion Imparting Agent

The adhesion imparting agent is an agent to improve adhesion between a crosslinked product and a decorative layer such as a coating film, and examples of such agents include an organotin compound, a tertiary amine compound, a hydroxyl group-containing (co)polymer and a metallic hydroxide.

Inorganic Filler

Examples of the inorganic fillers include silica, diatomaceous earth, alumina, titanium oxide, magnesium oxide, pumice powder, pumice balloon, aluminum hydroxide, magnesium hydroxide, basic magnesium carbonate, dolomite, calcium sulfate, calcium titanate, barium sulfate, calcium sulfite, talc, clay, mica, asbestos, glass fiber, glass flake, glass bead, calcium silicate, montmorillonite, bentonite, graphite, aluminum powder and molybdenum sulfide.

Above all, layered compounds are preferably employed, and clay minerals having swelling/cleavage properties in dispersion media are particularly preferably employed. The clay minerals are generally classified into a type of two-layer structure consisting of a tetrahedral layer of silica and an octahedral layer containing aluminum or magnesium as a central metal provided on the tetrahedral layer and a type of three-layer structure consisting of tetrahedral layers of silica and an octahedral layer containing aluminum or magnesium as a central metal sandwiched between the tetrahedral layers. The two-layer structure type (former type) is, for example, a kaolinite group or an antigorite group, and the three-layer structure type (latter type) is, for example, a smectite group, a vermiculite group or a mica group that is grouped according to the number of interlaminar cations.

Specific examples of the clay minerals include kaolinite, dickite, nacrite, halloysite, antigorite, chrysotile, pyrophyllite, montmorillonite, beidellite, nontronite, saponite, sauconite, stevensite, hectorite, tetrasilicic mica, sodium taeniorite, muscovite, margarite, talc, vermiculite, phlogopite, xanthophyllite and chlorite.

Clay minerals having been treated with organic materials (sometimes referred to as "organic modified clay minerals") are also employable as the inorganic layered compounds. (On the clay minerals having been treated with organic materials, see "Dictionary of Clay" by Asakura Shoten.)

Of the above clay minerals, preferable are a smectite group, a vermiculite group and a mica group, and more preferable is a smectite group, from the viewpoints of swelling properties or cleavage properties. Examples of the smectite group clay minerals include montmorillonite, beidellite, nontronite, saponite, sauconite, stevensite and hectorite.

Examples of the dispersion media by which the inorganic layered compounds are swollen or cleaved are as follows. In case of the swelling clay minerals, there can be mentioned water, alcohols, such as methanol, ethanol, propanol, isopropanol, ethylene glycol and diethylene glycol, dimethylformamide, dimethyl sulfoxide and acetone. Of these, water and alcohol such as methanol are preferable.

In case of the organic modified clay minerals, there can be mentioned aromatic hydrocarbons, such as benzene, toluene and xylene, ethers, such as ethyl ether and tetrahydrofuran, ketones, such as acetone, methyl ethyl ketone and methyl isobutyl ketone, aliphatic hydrocarbons, such as n-pentane, n-hexane and n-octane, halogenated hydrocarbons, such as chlorobenzene, carbon tetrachloride, chloroform, dichloromethane, 1,2-dichloroethane and perchloroethylene, ethyl acetate, methyl methacrylate (MMA), dioctyl phthalate (DOP), dimethylformamide, dimethyl sulfoxide, methyl cellosolve and silicone oil.

Nucleating Agent

As the nucleating agents, various nucleating agents hitherto known are used without specific limitation. Examples of the nucleating agents include the following aromatic phosphoric ester salt, benzylidenesorbitol, aromatic carboxylic acid and rosin nucleating agent.

Examples of aromatic phosphoric ester salt are compounds represented by the following formula (1).

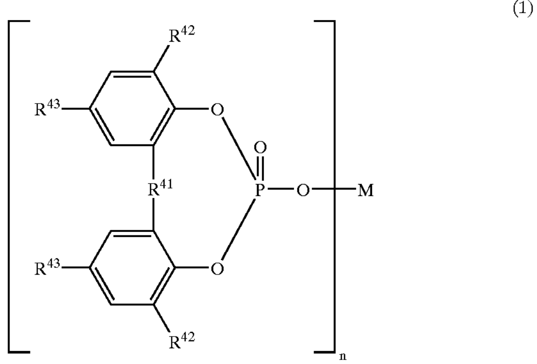

In the above formula, $R^{41}$ is an oxygen atom, a sulfur atom or a hydrocarbon group of 1 to 10 carbon atoms; $R^{42}$ and $R^{43}$ are each a hydrogen atom or hydrocarbon group of 1 to 10 carbon atoms and may be the same or different, and $R^{42}$s, $R^{43}$s or $R^{42}$ and $R^{43}$ may be bonded to each other to form a ring; M is a metal atom having a valency of 1 to 3; and n is an integer of 1 to 3.

Concrete examples of the compounds represented by the above formula (1) include sodium-2,2'-ethylene-bis(4,6-di-t-butylphenyl)phosphate, sodium-2,2'-ethylidene-bis(4,6-di-t-butylphenyl)phosphate, lithium-2,2'-methylene-bis(4,6-di-t-butylphenyl)phosphate, lithium-2,2'-ethylidene-bis(4,6-di-t-butylphenyl)phosphate, sodium-2,2'-ethylidene-bis(4-i-propyl-6-t-butylphenyl)phosphate, lithium-2,2'-methylene-bis(4-methyl-6-t-butylphenyl)phosphate, lithium-2,2'-methylene-bis(4-ethyl-6-t-butylphenyl)phosphate, calcium-bis(2,2'-thiobis(4-methyl-6-t-butylphenyl)phosphate), calcium-bis(2,2'-thiobis(4-ethyl-6-t-butylphenyl) phosphate), calcium-bis(2,2'-thiobis(4,6-di-t-butylphenyl) phosphate), magnesium-bis(2,2'-thiobis(4,6-di-t-butylphenyl)phosphate), magnesium-bis(2,2'-thiobis(4-t-octylphenyl)phosphate), sodium-2,2'-butylidene-bis(4,6-di-methylphenyl)phosphate, sodium-2,2'-butylidene-bis(4,6-di-t-butylphenyl)phosphate, sodium-2,2'-t-octylmethylene-bis(4,6-di-methylphenyl)phosphate, sodium-2,2'-t-octylmethylene-bis(4,6-di-t-butylphenyl)phosphate, calcium-bis(2,2'-methylene-bis(4,6-di-t-butylphenyl) phosphate), magnecium-bis(2,2'-methylene-bis(4,6-di-t-butylphenyl)phosphate), barium-bis(2,2'-methylene-bis(4,6-di-t-butylphenyl)phosphate), sodium-2,2'-methylene-bis(4-methyl-6-t-butylphenyl)phosphate, sodium-2,2'-methylene-bis(4-ethyl-6-t-butylphenyl)phosphate, sodium-(4,4'-dimethyl-5,6'-di-t-butyl-2,2'-biphenyl)phosphate, calcium-bis-((4,4'-dimethyl-6,6'-di-t-butyl-2,2'-biphenyl)phosphate), sodium-2,2'-ethylidene-bis(4-m-butyl-6-t-butylphenyl) phosphate, sodium-2,2'-methylene-bis(4,6-di-methylphenyl)phosphate, sodium-2,2'-methylene-bis(4,6-di-ethylphenyl)phosphate, potassium-2,2'-ethylidene-bis(4,6-di-t-butylphenyl)phosphate, calcium-bis(2,2'-ethylidene-bis(4,6-di-t-butylphenyl)phosphate), magnecium-bis(2,2'-ethylidene-bis(4,6-di-t-butylphenyl)phosphate), barium-bis(2,2'-ethylidene-bis(4,6-di-t-butylphenyl)phosphate), aluminum-tris(2,2'-methylene-bis(4,6-di-t-butylphenyl) phosphate) and aluminum-tris(2,2'-ethylidene-bis(4,6-di-t-butylphenyl)phosphate), and mixtures of two or more thereof. Particularly preferable is sodium-2,2'-methylene-bis(4,6-di-t-butylphenyl)phosphate.

Examples of aromatic phosphoric ester salt are compounds represented by the following formula (2).

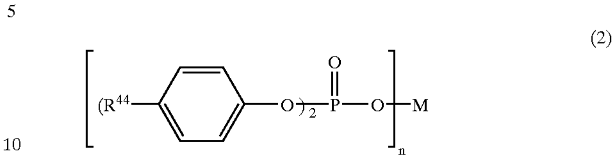

In the above formula, $R^{44}$ is a hydrogen atom or hydrocarbon group of 1 to 10 carbon atoms; M is a metal atom having a valency of 1 to 3; and n is an integer of 1 to 3.

Concrete examples of the compounds represented by the above formula (2) include sodium-bis(4-t-butylphenyl) phosphate, sodium-bis(4-methylphenyl)phosphate, sodium-bis(4-ethylphenyl)phosphate, sodium-bis(4-i-propylphenyl) phosphate, sodium-bis(4-t-octylphenyl)phosphate, potassium-bis(4-t-butylphenyl)phosphate, calcium-bis(4-t-butylphenyl)phosphate, magnecium-bis(4-t-butylphenyl) phosphate, lithium-bis(4-t-butylphenyl)phosphate, aluminum-bis(4-t-butylphenyl)phosphate, and mixtures of two or more thereof. Particularly preferable is sodium-bis(4-t-butylphenyl)phosphate.

The benzylidenesorbitol is, for example, a compound represented by the following formula (3):

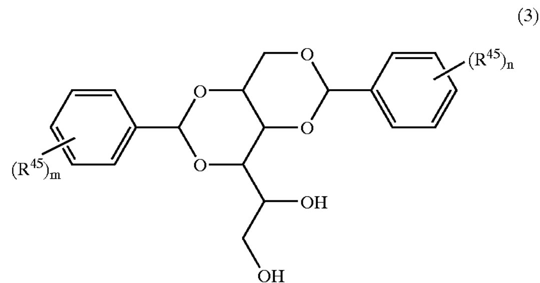

wherein each $R^{45}$ may be the same or different and is a hydrogen atom or a hydrocarbon group of 1 to 10 carbon atoms, and m and n are each an integer of 0 to 5.

Examples of the compounds represented by the formula (3) include 1,3,2,4-dibenzylidenesorbitol, 1,3-benzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-methylbenzylidene)sorbitol, 1,3,2,4-di(p-ethylbenzylidene) sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene) sorbitol, 1,3,2,4-di(p-t-butylbenzylidene)sorbitol, 1,3,2,4-di(2',4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2-4-p-chlorobenzylidenesorbitol, 1,3-p-chlorobenzylidene-2-4-benzylidenesorbitol, 1,3-p-chlorobenzylidene-2-4-p-methylbenzylidenesorbitol, 1,3-p-chlorobenzylidene-2-4-p-ethylbenzylidenesorbitol, 1,3-p-methylbenzylidene-2-4-p-chlorobenzylidenesorbitol, 1,3-p-ethylbenzylidene-2-4-p-chlorobenzylidenesorbitol, 1,3,2,4-di(p-chlorobenzylidene) sorbitol, and mixtures of two or more of these compounds.

Of these, preferable are 1,3,2,4-dibenzylidenesorbitol, 1,3, 2,4-di(p-methylbenzylidene)sorbitol, 1,3,2,4-di-p-ethylbenzylidene)sorbitol, 1,3-p-chlorobenzylidene-2-4-p-methylbenzylidenesorbitol, 1,3,2,4-di(p-chlorobenzylidene) sorbitol, and mixtures of two or more of these compounds.

Of the above benzylidenesorbitols, preferable is a compound represented by the following formula (4):

(4)

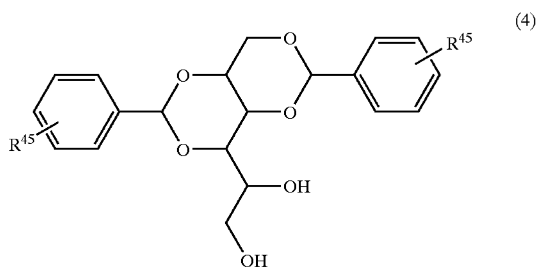

wherein each $R^{45}$ may be the same or different and is methyl or ethyl.

The aromatic carboxylic acid is, for example, aluminumhydroxydipara-t-butyl benzoate represented by the following formula (5):

(5)

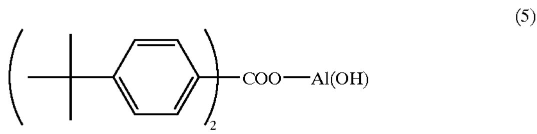

The rosin type nucleating agent is, for example, a metallic salt of a rosin acid, and the metallic salt of a rosin acid is a reaction product of a rosin acid and a metallic compound. Examples of the rosin acids include natural rosins, such as gum rosin, tall oil rosin and wood rosin; various modified rosins, such as disproportionated rosin, hydrogenated rosin, dehydrogenated rosin, polymerized rosin and α,β-ethylenically unsaturated carboxylic acid-modified rosin; purified products of the natural rosins; and purified products of the modified rosins. Examples of unsaturated carboxylic acids used for preparing the α,β-ethylenically unsaturated carboxylic acid-modified rosins include maleic acid, maleic anhydride, fumaric acid, itaconic acid, itaconic anhydride, citraconic acid, acrylic acid ad methacrylic acid. Of the above rosins, preferable is at least one rosin acid selected from the group consisting of a natural rosin, a modified rosin, a purified product of a natural rosin and a purified product of a modified rosin. The rosin acid contains plural resin acids selected from pimaric acid, sandarachpimaric acid, parastric acid, isopimaric acid, abietic acid, dehydroabietic acid, neoabietic acid, dihydropimaric acid, dihydroabietic acid and tetrahydroabietic acid.

The metallic compound which reacts with the rosin acid to form a metallic salt is, for example, a compound which contains a metallic element, such as sodium, potassium or magnesium, and forms a salt together with the rosin acid. Examples of the metallic salts include chlorides, nitrates, acetates, sulfates, carbonates, oxides and hydroxides of the above metals.

Other examples of the nucleating agents include high-melting point polymers, metallic salts of aromatic carboxylic acids or aliphatic carboxylic acids, and inorganic compounds.

Examples of the high-melting point polymers include polyvinylcycloalkanes, such as polyvinylcyclohexane and polyvinylcyclopentane, poly-3-methyl-1-pentene, poly-3-methyl-1-butene, and polyalkenylsilanes.

Examples of the metallic salts of aromatic carboxylic acids or aliphatic carboxylic acids include aluminum benzoate, aluminum p-t-butylbenzoate, sodium adipate, sodium thiophenecarboxylate and pyrrolecarboxylic acid.

Molding Method

The olefin copolymer of the invention can be subjected to various molding methods such as extrusion molding, injection molding, blow molding, press molding and stamping.

The olefin copolymer can be molded into sheets or films (unstretched) by extrusion molding.

Stretched films can be obtained by stretching the extruded sheets or extruded films (unstretched) through tentering (lengthwise-crosswise stretching, crosswise-lengthwise stretching), simultaneous biaxial orientation or monoaxial stretching. From the olefin copolymer of the invention, inflation films can also be produced.

Filaments can be produced by, for example, extruding a molten olefin copolymer through spinneret. The filaments may be produced by a melt blowing method.

Injection molded products can be produced by injection molding the olefin copolymer into various shapes by the use of hitherto known infection molding machines under the known conditions. The injection molded products obtained from the olefin copolymer of the invention are hardly electrostatically charged and have excellent rigidity, heat resistance, impact resistance, surface gloss, chemical resistance and abrasion resistance, so that they can be broadly used as automobile interior trim, automobile exterior trim, housings of electric appliances, containers, etc.

Blow molded products can be produced by the use of hitherto known blow molding machines under the known conditions.

In the injection molding method, the olefin copolymer of the invention is injected into a parison mold at a resin temperature of 100 to 300° C. to form a parison, then the parison is held in a mold of desired shape, and air is blown into the parison to fit the parison into the mold, whereby a blow molded product can be produced.

The stamping method is, for example, stamping molding. In this method, a base material and a skin material are press molded at the same time to perform integral molding (stamping molding), and the olefin copolymer can be used as the base material.

Use Application

The olefin copolymer of the invention can be applied to various uses, and for example, it can be used for film laminates, sheet laminates and modifiers.

Examples of the laminates containing at least one layer formed from the olefin copolymer of the invention include agricultural film, wrapping film, shrink film, protective film, separating film such as blood plasma separating film or water selective permeation vaporizing film, ion exchange film, battery separator, and selective separating film such as optical resolution film.

The olefin copolymer of the invention can be used as a modifier for rubbers.

Examples of the rubbers include crosslinked rubbers, such as natural rubber (NR), isoprene rubber (IR), butadiene rubber (BR), styrene/butadiene rubber (SBR), chloroprene rubber (CR), acrylonitrile/butadiene rubber (NBR), butyl rubber (IIR), ethylene/propylene rubber (EPM, EPDM), chlorosulfonated polyethylene (CSM), acrylic rubber (ACM, ANM, etc.), epichlorohydrin rubber (CO, ECO, etc.), silicone rubber (Q) and fluororubber (FKM, etc.); and thermoplastic rubbers, such as rubbers of styrene type, olefin type, urethane type, ester type, amide type and vinyl chloride type.

The olefin copolymer of the invention can be used as a modifier for lubricating oils, such as gasoline engine oil, diesel engine oil, marine engine oil, gear oil, machine oil, metal working oil, motor oil, machine oil, spindle oil and insulating oil. The olefin copolymer can be used as a viscosity modifier or a freezing point depressant of these lubricating oils.

The olefin copolymer of the invention can be used as a modifier for waxes. Examples of the waxes include mineral waxes, such as montan wax, peat wax, ozokerite/ceresin wax and petroleum wax; synthetic waxes, such as polyethylene, Fischer-Tropsch wax, chemically modified hydrocarbon wax and substituted amide wax; vegetable waxes; and animal waxes.

The olefin copolymer of the invention can be used as a modifier for cement.

Examples of the cement include air setting cement, such as lime, gypsum and magnesia cement; water setting cement, such as Roman cement, natural cement, Portland cement, alumina cement and high sulfuric salt slag cement; and special cements, such as acid proof cement, refractory cement, water glass cement and dental cement.

Viscosity Modifier, Moldability Improver

The olefin polymer of the invention can be used as a viscosity modifier or a moldability improver for inks and paints, such as letterpress printing ink, lithographic printing ink, flexo graphic ink, gravure ink, oil paint, cellulose derivative paint, synthetic resin paint, water baking paint, powdery water paint and Japanese lacquer.

Building Material, Civil Engineering Material

The olefin copolymer of the invention can be used for building/civil engineering resins and building/civil engineering molded products, such as flooring, floor tile, floor sheet, sound insulating sheet, heat insulating panel, damping material, decorative sheet, baseboard, asphalt modifier, gasket, sealing material, roofing sheet and cut-off sheet.

Automobile Interior or Exterior Trim, Gasoline Tank

The olefin polymer of the invention can be used for automobile interior or exterior trim and gasoline tank.

Electric or Electronic Parts

The olefin copolymer of the invention can be used for electric or electronic parts. Examples of the electric or electronic parts include electric insulating materials, electronic part treating instruments, magnetic recording media, binders of magnetic recording media, sealing materials of electric circuits, materials of electric appliances, base materials of containers such as electronic oven containers, films for electronic ovens, polymer electrolyte base materials and conductive alloy base materials. Other examples of the electric or electronic parts include electric or electronic parts, such as connector, socket, resistor, relay case switch coil bobbin, condenser, variable condenser case, optical pickup, optical connector, vibrator, various terminal assemblies, transformer, plug, printed wiring board, tuner, speaker, microphone, headphone, small motor, magnetic head base, power module, housing, semiconductor, liquid crystal display parts, FDD carriage, FDD chassis, HDD parts, motor blush holder, parabola antenna and computer associated parts, VTR parts, TV parts, iron, hair dryer, rice cooker parts, electronic oven parts, acoustic instrument parts, audio machine parts such as audio laser disc and compact disc, domestic or office electric appliance parts, such as light fitment parts, refrigerator parts, air conditioner parts, typewriter parts and word processor parts, office computer associated parts, telephone associated parts, facsimile associated parts, copy machine associated parts, electromagnetic shielding material, speaker cone material, and vibrating element for speaker.

Aqueous Emulsion

An aqueous emulsion containing the olefin copolymer of the invention can be used as an adhesive for polyolefins of excellent heat sealing properties.

Medical or Hygienic Material

The olefin copolymer of the invention can be used for medical goods, such as nonwoven fabric, nonwoven fabric laminate, electret, medical tube, medical container, transfusion bag, prefill syringe and syringe, medical materials, artificial organs, artificial muscles, filter films, food sanitation/health goods, retort bags, and freshness keeping films.

Miscellaneous Goods

The olefin copolymer of the invention can be used for stationery, such as desk mat, cutting mat, ruler, pen holder, pen grip, pen cap, scissors grip, cutter grip, magnet sheet, pen case, paper holder, binder, label seal, tape and white board; daily use miscellaneous goods, such as clothing, curtain, sheet, carpet, entrance hall mat, bath mat, bucket, hose, bag, planter, air conditioner filter, exhaust fan filter, tableware, tray, cup, lunch box, coffee maker funnel, eyeglass frame, container, storage case, hanger, rope and washing net; sporting goods, such as shoes, goggles, skis, racket, ball, tent, swimming goggles, swim fin, fishing rod, cooler box, leisure sheet and sporting net; toys, such as block and cards; containers, such as kerosine can, drum, detergent bottle and shampoo bottle; and display goods, such as signboard, pylon and plastic chain.

Filler Modifier

The olefin copolymer of the invention can be favorably used as an additive for preparing a filler dispersibility improver or a dispersibility-improved filler.

Compatibilizing Agent

The olefin copolymer of the invention having a functional group at the terminal can be used as a compatibilizing agent. When the olefin copolymer of the invention is used as a compatibilizing agent, a polyolefin and a polar group-containing thermoplastic resin can be mixed in an arbitrary mixing ratio. The olefin copolymer has a polyolefin segment and a functional group, so that inherently incompatible components can be comparibilized with each other by the use of the copolymer.

Other Uses

The olefin copolymer of the invention can be used for microcapsules, PTP packages, chemical bulbs, drug delivery system, etc.

Effect of the Invention

The olefin polymer according to the invention exhibits various useful properties.

According to the process for preparing an olefin polymer of the invention, an olefin polymer having a high molecular weight and a narrow molecular weight distribution and a tapered polymer or various block copolymers precisely controlled in the structure can be obtained at high polymerization temperatures with high polymerization activities.

EXAMPLE

The present invention is further described with reference to the following examples, but it should be construed that the invention is in no way limited to those examples.

The structures of the compounds obtained in the synthesis examples were determined by means of $^{1}$H-NMR and FD-mass spectrometry (Japan Electron Optics Laboratory SX-102A).

Synthesis Example 1

In a 100 ml reactor thoroughly purged with nitrogen, 100 ml of toluene, 10.34 g (56.5 mmol) of pentafluoroaniline, 6.68 g (75.4%, 28.2 mmol) of 3-t-butylsalicylaldehyde and a small amount of acetic acid as a catalyst were placed, and they were heated and refluxed with stirring for 7 hours. After the solution was allowed to stand for cooling, a small amount of p-toluenesulfonic acid was added as a catalyst, and they were refluxed with stirring for 2.5 hours. The reaction solution was allowed to stand for cooling to room temperature, then filtered to remove the catalyst and vacuum concentrated. The residue was purified by a silica gel column to obtain 8.47 g (yield: 88%) of yellow solids represented by the following formula (a).

(a)

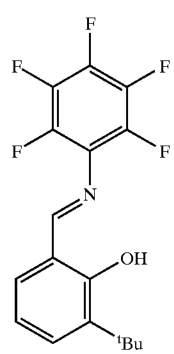

In a 50 ml reactor thoroughly purged with nitrogen, 1.043 g (3.00 mmol) of the compound (a) obtained above and 30 ml of anhydrous diethyl ether were placed, and the solution was cooled to −78° C. and stirred. To the solution, 2.05 ml of n-butyllithium (n-hexane solution, 1.54 N, 3.15 mmol) was dropwise added over a period of 5 minutes, and then the mixture was slowly heated to room temperature. After stirring for 3 hours at room temperature, the reaction solution was slowly added to an ether slurry of 3.00 ml of titanium tetrachloride (heptane solution, 0.5 M, 1.50 mmol) having been cooled to −78° C. After the addition, the mixture was slowly heated to room temperature. The resulting dark red slurry was filtered, and the filtrate was vacuum concentrated until the amount of the liquid became about 5 ml. The solids precipitated were collected and washed with hexane. The resulting solids were vacuum dried to obtain 0.381 g (yield: 32%) of a brown compound represented by the following formula (1). The FD-mass spectrometry of the compound (1) resulted in 802 (M+).

(1)

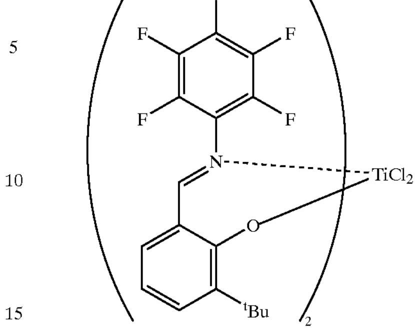

Synthesis Example 2

In a 200 ml reactor thoroughly purged with nitrogen, 100 ml of toluene, 3.82 g (26.0 mmol) of 2,4,6-trifluoroaniline, 2.32 g (13.0 mmol) of 3-t-butylsalicylaldehyde and a small amount of p-toluenesulfonic acid as a catalyst were placed, and they were heated and refluxed with stirring for 4 hours. The reaction solution was allowed to stand for cooling to room temperature, then filtered to remove the catalyst and vacuum concentrated. The residue was purified by a silica gel column to obtain 3.79 g (yield: 95%) of a yellow oil represented by the following formula (b).

(b)

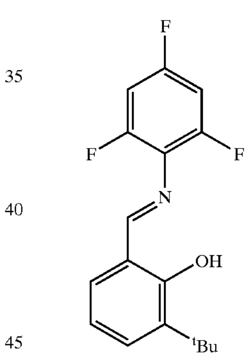

In a 50 ml reactor thoroughly purged with nitrogen, 1.23 g (4.00 mmol) of the compound (b) obtained above and 30 ml of anhydrous diethyl ether were placed, and the solution was cooled to −78° C. and stirred. To the solution, 2.63 ml of n-butyllithium (n-hexane solution, 1.60 N, 4.20 mmol) was dropwise added over a period of 5 minutes, and then the mixture was slowly heated to room temperature. After stirring for 2 hours at room temperature, the reaction solution was slowly added to an ether slurry of 4.00 ml of titanium tetrachloride (heptane solution, 0.5 M, 1.50 mmol) having been cooled to −78° C. After the addition, the mixture was slowly heated to room temperature. The resulting dark red slurry was filtered, and the filtrate was vacuum concentrated. Then, 5 ml of ether and 30 ml of hexane were added, and the solids precipitated were collected and washed with hexane. The resulting solids were vacuum dried to obtain 0.550 g (yield: 38%) of a reddish brown compound represented by the following formula (2). The FD-mass spectrometry of the compound (2) resulted in 730 (M+).

(2)

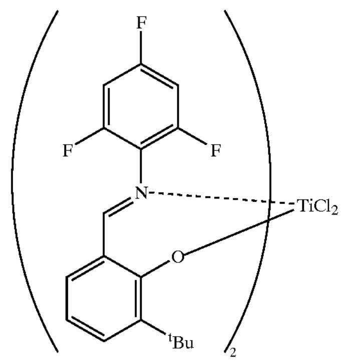

(3)

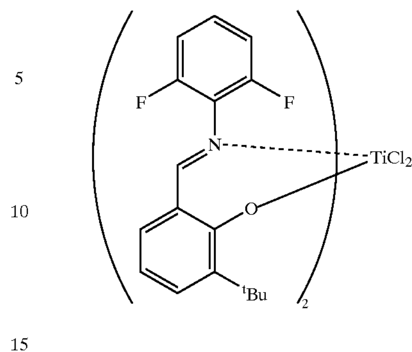

Synthesis Example 3

In a 100 ml reactor thoroughly purged with nitrogen, 30 ml of ethanol, 5.16 g (40.0 mmol) of 2,6-difluoroaniline, 3.58 g (20.0 mmol) of 3-t-butylsalicylaldehyde and a small amount of acetic acid as a catalyst were placed, and they were heated and refluxed with stirring. With further adding a small amount of acetic acid, the mixture was refluxed with stirring for 150 hours. The reaction solution was allowed to stand for cooling to room temperature and then vacuum concentrated. The residue was purified by a silica gel column to obtain 4.76 g (yield: 82.2%) of yellow solids represented by the following formula (c).

(c)

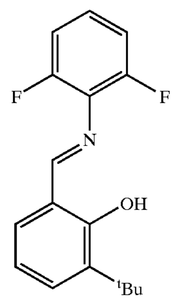

In a 30 ml reactor thoroughly purged with nitrogen, 1.16 g (4.00 mmol) of the compound (c) obtained above and 20 ml of anhydrous diethyl ether were placed, and the solution was cooled to −78° C. and stirred. To the solution, 2.50 ml of n-butyllithium (n-hexane solution, 1.6 N, 4.00 mmol) was dropwise added over a period of 5 minutes, and then the mixture was slowly heated to room temperature. After stirring for 3 hours at room temperature, the reaction solution was slowly added to an ether slurry of 4.00 ml of titanium tetrachloride (heptane solution, 0.5 M, 2.00 mmol) having been cooled to −78° C. After the addition, the mixture was slowly heated to room temperature. The resulting dark red slurry was filtered, and the solids obtained were washed with a small amount of methylene chloride. The filtrate and the washing liquid were vacuum concentrated, and the resulting solids were collected and suspended in 15 ml of ether. The precipitate was filtered and then washed with a small amount of ether and hexane. The resulting solids were vacuum dried to obtain 1.059 g (yield: 76%) of a brown compound represented by the following formula (3). The FD-mass spectrometry of the compound (3) resulted in 694 (M+).

Synthesis Example 4

In a 200 ml reactor thoroughly purged with nitrogen, 100 ml of toluene, 2.89 g (26.0 mmol) of o-fluoroaniline, 2.32 g (13.0 mmol) of 3-t-butylsalicylaldehyde and a small amount of p-toluenesulfonic acid as a catalyst were placed, and they were heated and refluxed with stirring for 5 hours. The reaction solution was allowed to stand for cooling to room temperature, then filtered to remove the catalyst and vacuum concentrated. The residue was purified by a silica gel column to obtain 3.45 g (yield: 98%) of a yellow oil represented by the following formula (d).

(d)

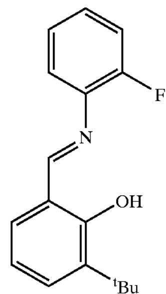

In a 30 ml reactor thoroughly purged with nitrogen, 1.01 g (4.00 mmol) of the compound (d) obtained above and 30 ml of anhydrous diethyl ether were placed, and the solution was cooled to −78° C. and stirred. To the solution, 2.63 ml of n-butyllithium (n-hexane solution, 1.60 N, 4.20 mmol) was dropwise added over a period of 5 minutes, and then the mixture was slowly heated to room temperature. After stirring for 2 hours at room temperature, the reaction solution was slowly added to an ether slurry of 4.00 ml of titanium tetrachloride (heptane solution, 0.5 M, 2.00 mmol) having been cooled to −78° C. After the addition, the mixture was slowly heated to room temperature. The resulting dark red slurry was filtered, and the filtrate was vacuum concentrated. Then, 5 ml of ether and 30 ml of hexane were added, and the solids precipitated were collected and washed with hexane. The resulting solids were vacuum dried to obtain 0.530 g (yield: 40%) of a reddish brown compound represented by the following formula (4). The FD-mass spectrometry of the compound (4) resulted in 658 (M+)

(4)

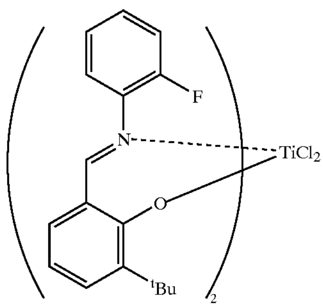

Synthesis Example 5

In a 200 ml reactor thoroughly purged with nitrogen, 100 ml of toluene, 3.19 g (8.0 mmol) of 1H,1H-perfluorooctylamine, 143 g (8.0 mmol) of 3-t-butylsalicylaldehyde and a small amount of p-toluenesulfonic acid as a catalyst were placed, and they were heated and refluxed with stirring for 14 hours. The reaction solution was allowed to stand for cooling to room temperature, then filtered to remove the catalyst and vacuum concentrated, to obtain 4.04 g (yield: 90%) of yellow solids represented by the following formula (e).

(e)

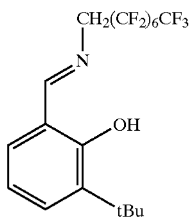

In a 30 ml reactor thoroughly purged with nitrogen, 1.12 g (2.00 mmol) of the compound (e) obtained above and 30 ml of anhydrous diethyl ether were placed, and the solution was cooled to −78° C. and stirred. To the solution, 1.31 ml of n-butyllithium (n-hexane solution, 1.60 N, 2.10 mmol) was dropwise added over a period of 5 minutes, and then the mixture was slowly heated to room temperature. After stirring for 2 hours at room temperature, the reaction solution was slowly added to an ether slurry of 2.00 ml of titanium tetrachloride (heptane solution, 0.5 M, 1.00 mmol) having been cooled to −78° C. After the addition, the mixture was slowly heated to room temperature. The resulting dark red slurry was filtered, and the filtrate was vacuum concentrated. Then, 3 ml of ether and 20 ml of hexane were added, and the solids precipitated were collected and washed with hexane. The resulting solids were vacuum dried to obtain 0.183 g (yield: 15%) of a reddish brown compound represented by the following formula (5). The FD-mass spectrometry of the compound (5) resulted in 1234 (M+)

(5)

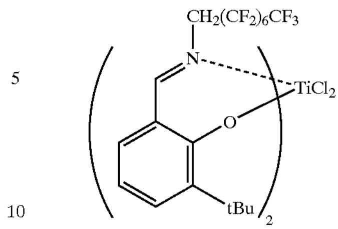

Synthesis Example 6

In a 200 ml reactor thoroughly purged with nitrogen, 100 ml of toluene, 4.66 g (20.0 mmol) of 4-trifluoromethyl-2,3,5,6-tetrafluoroaniline, 1.78 g (10.0 mmol) of 3-t-butylsalicylaldehyde and a small amount of p-toluenesulfonic acid as a catalyst were placed, and they were heated and refluxed with stirring for 53 hours. The starting material was confirmed by the GC analysis, so that 2.33 g (10.0 mmol) of 2,3,5,6-tetrafluoro-4-trifluoromethylaniline was further added, and the mixture was heated and refluxed with stirring for 7 hours. The reaction solution was allowed to stand for cooling to room temperature, then filtered to remove the catalyst and vacuum concentrated. The residue was purified by a silica gel column to obtain 2.53 g (yield: 64%) of light yellow solids represented by the following formula (f).

(f)

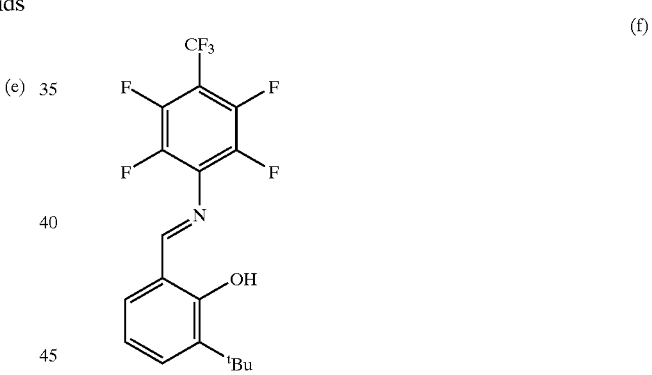

In a 100 ml reactor thoroughly purged with argon, 0.15 g (3.80 mmol) of sodium hydride was placed and washed twice with 10 ml of hexane. Then, 30 ml of diethyl ether was added to give a suspension. With stirring the suspension at room temperature, 20 ml of a diethyl ether solution containing the compound (f) obtained above was dropwise added over a period of 20 minutes, followed by further stirring for 2 hours. The solution was cooled to −78° C., and thereto was dropwise added 3.75 ml of titanium tetrachloride (heptane solution, 0.5 M, 1.88 mmol) over a period of 5 minutes. After the dropwise addition was completed, the reaction solution was slowly heated to room temperature. After the solution was further stirred for 12 hours at room temperature, the resulting dark red slurry was filtered, and the filtrate was vacuum concentrated. Then, ether was added, and the solids precipitated were collected and vacuum dried to obtain 0.76 g (yield: 45%) of a reddish brown powder represented by the following formula (6). The FD-mass spectrometry of the compound (6) resulted in 902 (M+).

(6)

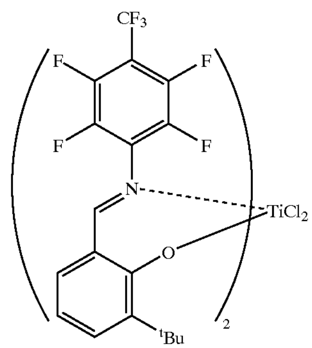

Synthesis Example 7

In a 200 ml reactor thoroughly purged with nitrogen, 16.2 ml of ethylmagnesium bromide (ether solution, 3M, 48.6 mmol) and 50 ml of anhydrous tetrahydrofuran were placed. Then, a solution of 11.2 g (46.2 mmol) of 2-(1-adamantyl)-4-methylphenol in 50 ml of anhydrous tetrahydrofuran was dropwise added over a period of 20 minutes with ice cooling. After the dropwise addition was completed, the reaction solution was stirred at room temperature. To the solution, 300 ml of toluene was added, and the mixture was heated with stirring to distill off the tetrahydrofuran and the diethyl ether. After cooling to room temperature, 3.80 g (127 mmol) of paraformaldehyde and 7.1 g (70.2 mmol) of triethylamine were added, and the mixture was heated with stirring at 80 to 90° C. for 20 minutes. The resulting solution was cooled to room temperature, and thereto was added 200 ml of 10% hydrochloric acid with ice cooling. Then, 300 ml of diethyl ether was added to perform phase separation, and the organic layer was washed twice with 200 ml of water and then with a sodium hydrogencarbonate aqueous solution. The resulting solution was dried over anhydrous sodium sulfate and then vacuum concentrated. The resulting crystals were vacuum dried to obtain 10.5 g (yield: 84%) of a yellow compound represented by the following formula (g) (wherein Adm denotes an adamantyl group).

(g)

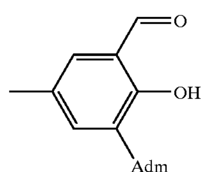

In a 100 ml reactor thoroughly purged with nitrogen, 80 ml of toluene, 2.75 g (15.0 mmol) of pentafluoroaniline, 4.07 g (99.7% 15.0 mmol) of the compound (g) obtained above and a small amount of p-toluenesulfonic acid as a catalyst were placed, and they were heated and refluxed with stirring for five and half hours. After the reaction solution was allowed to stand for cooling, the solvent was distilled off under reduced pressure. Then, 50 ml of methanol was added, and the mixture was stirred and filtered. The resulting solids were vacuum dried to obtain 4.38 g (yield: 67%) of yellow solids represented by the following formula (g').

(g')

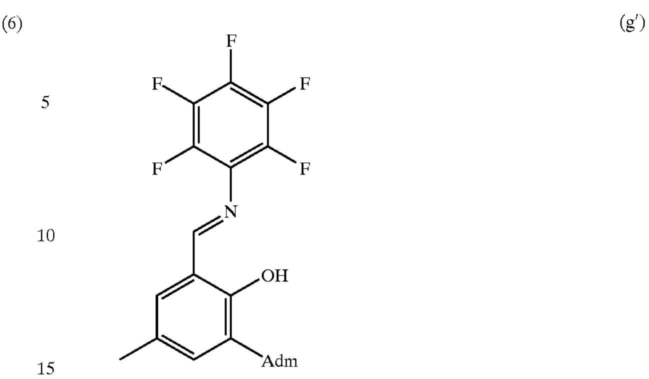

In a 50 ml reactor thoroughly purged with nitrogen, 1.35 g (3.00 mmol) of the compound (g') obtained above and 20 ml of anhydrous diethyl ether were placed, and the solution was cooled to −78° C. and stirred. To the solution, 1.89 ml of n-butyllithium (n-hexane solution, 1.59 N, 3.00 mmol) was dropwise added over a period of 5 minutes, and the mixture was stirred for 2 hours and then slowly heated to room temperature. After stirring for 3 hours at room temperature, the solution was dropwise added to 20 ml of a tetrahydrofuran solution of 3.00 ml of titanium tetrachloride (heptane solution, 0.5 M, 1.50 mmol) having been cooled to −78° C. After the dropwise addition was completed, the mixture was slowly heated to room temperature and stirred for 12 hours at room temperature. Then, the solvent was distilled off under reduced pressure. To the resulting solids, 40 ml of methylene chloride was added. The mixture was stirred and filtered, and the filtrate was vacuum concentrated. The solids precipitated were reprecipitated with hexane, and the resulting solids were vacuum dried to obtain 0.334 g (yield: 23%) of a brown compound represented by the following formula (7). The FD-mass spectrometry of the compound (7) resulted in 986 (M+).

(7)

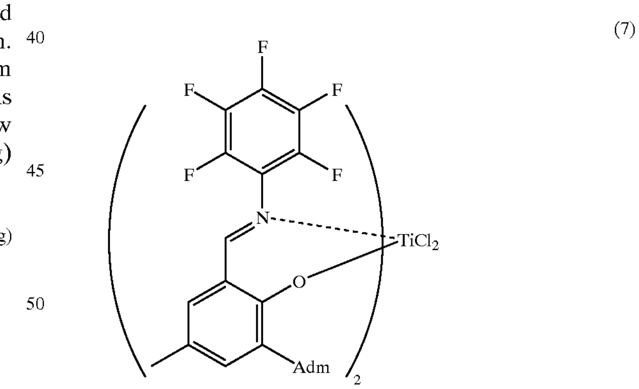

Synthesis Example 8

In a 200 ml reactor thoroughly purged with nitrogen, 100 ml of toluene, 4.19 g (26.0 mmol) of o-trifluoromethylaniline, 2.32 g (13.0 mmol) of 3-t-butylsalicylaldehyde and a small amount of p-toluenesulfonic acid as a catalyst were placed, and they were heated and refluxed with stirring for 5 hours. The reaction solution was allowed to stand for cooling to room temperature, then filtered to remove the catalyst and vacuum concentrated. The residue was purified by a silica gel column to obtain 3.20 g (yield: 77%) of a yellow oil represented by the following formula (h).

(h)

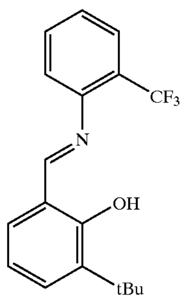

In a 30 ml reactor thoroughly purged with nitrogen, 1.29 g (4.00 mmol) of the compound (h) obtained above and 30 ml of anhydrous diethyl ether were placed, and the solution was cooled to −78° C. and stirred. To the solution, 2.63 ml of n-butyllithium (n-hexane solution, 1.60 N, 4.20 mmol) was dropwise added over a period of 5 minutes, and then the mixture was slowly heated to room temperature. After stirring for 2 hours at room temperature, the reaction solution was slowly added to an ether slurry of 4.00 ml of titanium, tetrachloride (heptane solution, 0.5 M, 2.00 mmol) having been cooled to −78° C. After the addition, the mixture was slowly heated to room temperature. The resulting dark red slurry was filtered, and the filtrate was vacuum concentrated. Then, 5 ml of ether and 30 ml of hexane were added, and the solids precipitated were collected and washed with hexane. The resulting solids were vacuum dried to obtain 0.80 g (yield: 53%) of a reddish brown compound represented by the following formula (8). The FD-mass spectrometry of the compound (8) resulted in 758 (M+).

(8)

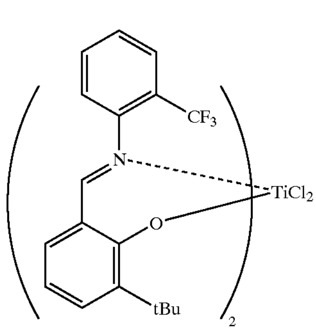

Synthesis Example 9

In a 100 ml reactor thoroughly purged with nitrogen, 55 ml of ethanol and 3.44 g (15.0 mmol) of 3,5-ditrifluoromethylaniline were placed, and they were stirred. To the solution, 1.79 g (10.0 mmol) of 3-t-butylsalicylaldehyde was added, followed by stirring for 19 hours at room temperature. Then, 6.00 g of molecular sieves 4A were added, and the mixture was heated and refluxed with stirring for 5 hours. The solids were removed by filtration, and the solution was concentrated. The resulting solids were purified by a silica gel column to obtain 0.92 g (yield: 72%) of yellow solids represented by the following formula (i).

(i)

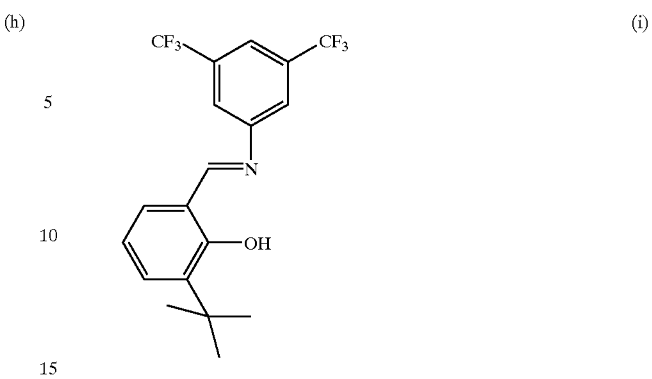

In a 30 ml reactor thoroughly purged with nitrogen, 0.779 g (2.00 mmol) of the compound (i) obtained above and 20 ml of anhydrous diethyl ether were placed, and the solution was cooled to −78° C. and stirred. To the solution, 1.43 ml of n-butyllithium (n-hexane solution, 1.54 N, 2.20 mmol) was dropwise added over a period of 5 minutes, followed by stirring for 3 hours. Thereafter, the mixture was stirred for 5 hours with slowly heating to room temperature and then slowly added to an ether slurry of 2.00 ml of titanium tetrachloride (heptane solution, 0.5 M, 1.00 mmol) having been cooled to 78° C. After the addition, the mixture was slowly heated to room temperature. The resulting dark red slurry was filtered, and the solution was concentrated to 10 ml. The crystals obtained by filtration were washed with hexane and vacuum dried to obtain 0.269 g (yield: 30.1%) of a reddish brown compound represented by the following formula (9). The FD-mass spectrometry of the compound (9) resulted in 894 (M+).

(9)

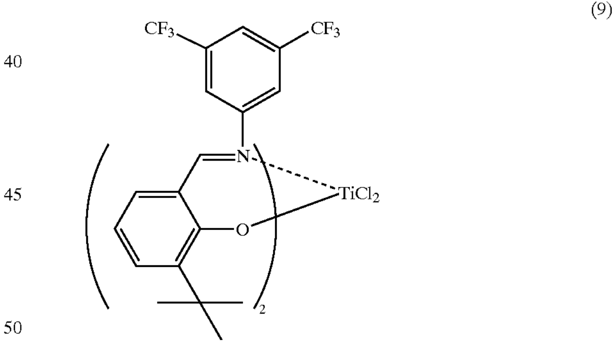

Synthesis Example 10

In a 200 ml reactor thoroughly purged with nitrogen, 100 ml of toluene and 3.36 g (26.0 mmol) of 3,5-difluoroaniline were placed, followed by stirring. To the solution, 2.32 g (13.0 mmol) of 3-t-butylsalicylaldehyde and a small amount of p-toluenesulfonic acid were added, and the mixture was heated and refluxed with stirring for 6.5 hours. The solids were removed by filtration, and the solution was concentrated. The concentrate was purified by a silica gel column to obtain 3.32 g (yield: 89%) of yellow solids represented by the following formula (j).

(j)

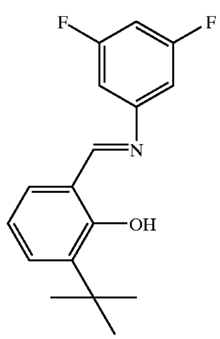

In a 50 ml reactor thoroughly purged with nitrogen, 1.16 g (4.00 mmol) of the compound (j) obtained above and 30 ml of anhydrous diethyl ether were placed, and the solution was cooled to −78° C. and stirred. To the solution, 2.63 ml of n-butyllithium (n-hexane solution, 1.60 N, 4.20 mmol) was dropwise added over a period of 5 minutes. Thereafter, the mixture was stirred for 12 hours with slowly heating to room temperature and then slowly added to an ether slurry of 4.00 ml of titanium tetrachloride (heptane solution, 0.5 M, 2.00 mmol) having been cooled to −78° C. After the addition, the mixture was slowly heated to room temperature. The resulting dark red slurry was filtered, and the solution was concentrated. The crystals obtained by filtration were washed with hexane and vacuum dried to obtain 0.958 g (yield: 69%) of a reddish brown compound represented by the following formula (10). The FD-mass spectrometry of the compound (10) resulted in 694 (M+).

(10)

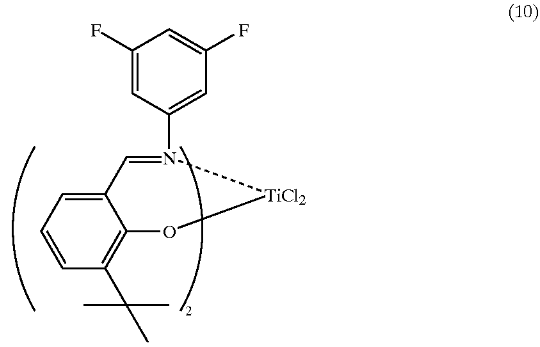

Synthesis Example 11

In a 100 ml reactor thoroughly purged with nitrogen, 2.00 g (5.27 mmol) of hafnocene dichloride and 40 ml of anhydrous diethyl ether were placed, and the solution was cooled to 0° C. and stirred. To the solution, 9.6 ml of methyllithium (ether solution, 1.14 N, 10.9 mmol) was dropwise added over a period of 45 minutes, followed by stirring for 2 hours. Then, the mixture was slowly heated to 0° C. After stirring for 30 minutes at 0° C., insolubles were removed by filtration. The filtrate was concentrated, and to the concentrate was added 10 ml of ether to give a suspension. Then, insolubles were removed again, and the solution was vacuum concentrated to obtain 1.79 g (quantitative yield) of a light yellow compound represented by the following formula (11).

(11)

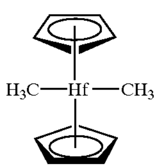

Example 1

In a 500 ml glass autoclave thoroughly purged with nitrogen, 250 ml of toluene was placed, and a mixed gas of ethylene (50 l/hr) and propylene (150 l/hr) was fed to saturate the liquid phase and the gas phase. Thereafter, 1.25 mmol (in terms of aluminum atom) of methylaluminoxane and then 0.005 mmol of the titanium compound (1) were added to initiate polymerization. After the polymerization was conducted at 50° C. for 5 minutes, a small amount of isobutanol was added to terminate the polymerization.

The resulting polymer solution was. Introduced into 1.5 liters of methanol containing a small amount of hydrochloric acid to precipitate a polymer. The polymer precipitated was washed with methanol and then vacuum dried at 130° C. for 10 hours. Thus, 0.794 g of an ethylene/propylene copolymer was obtained. The polymerization activity was 1.91 kg/hr based on 1 mmol of titanium. The propylene content as measured by IR was 13.3% by mol, the molecular weight (Mn) as measured by GPC was 159,000, and the molecular weight distribution (Mw/Mn) was 1.09.

Example 2

Polymerization was conducted in the same manner as in Example 1, except that the polymerization time was changed to 10 minutes. Thus, 1.318 g of an ethylene/propylene copolymer was obtained. The polymerization activity was 1.58 kg/hr based on 1 mmol of titanium. The propylene content as measured by IR was 15.0% by mol, the molecular weight (Mn) as measured by GPC was 233,000, and the molecular weight distribution (Mw/Mn) was 1.16.

Example 3

Polymerization was conducted in the same manner as in Example 1, except that the polymerization time was changed to 20 minutes. Thus, 2.225 g of an ethylene/propylene copolymer was obtained. The polymerization activity was 1.34 kg/hr based on 1 mmol of titanium. The propylene content as measured by IR was 15.4% by mol, the molecular weight (Mn) as measured by GPC was 345,000, and the molecular weight distribution (Mw/Mn) was 1.29.

Example 4

In a 500 ml class autoclave thoroughly purged with nitrogen, 250 ml of toluene was placed, and ethylene was fed to saturate the liquid phase and the gas phase. Thereafter, 1.25 mmol (in terms of aluminum atom) of methylaluminoxane and then 0.0005 mmol of the titanium compound (1) were added to initiate polymerization. After the reaction was conducted at 25° C. for 0.5 minute in an ethylene gas atmosphere at ordinary pressure, a small amount of methanol was added to terminate the polymerization. After the polymerization was completed, the reaction product was introduced into a large amount of methanol to precipitate the whole polymer. To the polymer, hydrochloric acid was added, followed by filtration over a glass filter. The resulting polymer was vacuum dried at 80° C. for 10 hours to obtain 0.149 g of polyethylene (PE). The polymerization activity was 35.8 kg based on 1 mmol of titanium. The number-average molecular weight (Mn) and the weight-average molecular weight (Mw) of the resulting polyethylene were 191,000 and 219,000, respectively, and Mw/Mn was 1.15.

Examples 5–22

Polymerization was conducted in the same manner as described above, except that the catalytic amount, the polymerization time and the polymerization temperature were changed as shown in Table 1. The polymerization activity, molecular weight of the resulting polymer and molecular weight distribution thereof are set forth in Table 1.

time was prolonged to 3 hours. The number-average molecular weight (Mn, in terms of PP) and the weight-average molecular weight (Mw, in terms of PP) of the resulting PP were 20,500 and 22,400, respectively, and Mw/Mn was 1.09.

Example 25

Polypropylene (PP) of 180 mg was obtained in the same manner as in Example 23, except that the polymerization time was prolonged to 5 hours. The number-average molecular weight (Mn) and the weight-average molecular weight (Mw) of the resulting PP were 28,500 and 31,600, respectively, and Mw/Mn was 1.11. Measurement of the melting point of the polymer by DSC resulted in 139° C.

TABLE 1

| Example | Titanium Compound | | Amount of MAO | Temp | Time | Monomer | yield | Activity (kg/mmol-Ti · h) | Mn | Mw | Mw/Mn |
|---|---|---|---|---|---|---|---|---|---|---|---|
| | | amount | (mmol) | (° C.) | (min.) | | (g) | | ($\times10^4$) | ($\times10^4$) | |
| 1 | 1 | 0.005 | 1.25 | 50 | 5 | Ethylene/propylene | 0.794 | 1.90 | 15.9 | 17.4 | 1.09 |
| 2 | 1 | 0.005 | 1.25 | 50 | 10 | Ethylene/propylene | 1.318 | 1.58 | 23.3 | 27.1 | 1.16 |
| 3 | 1 | 0.005 | 1.25 | 50 | 20 | Ethylene/propylene | 2.225 | 1.34 | 34.5 | 44.4 | 1.29 |
| 4 | 1 | 0.0005 | 1.25 | 25 | 0.5 | Ethylene | 0.149 | 35.8 | 19.1 | 21.9 | 1.15 |
| 5 | 1 | 0.0005 | 1.25 | 50 | 0.5 | Ethylene | 0.172 | 41.3 | 25.7 | 27.9 | 1.08 |
| 6 | 1 | 0.001 | 1.25 | 75 | 0.5 | Ethylene | 0.247 | 29.6 | 21.4 | 23.3 | 1.09 |
| 7 | 1 | 0.0005 | 1.25 | 25 | 1 | Ethylene | 0.283 | 34.0 | 41.2 | 46.4 | 1.13 |
| 8 | 1 | 0.0005 | 1.25 | 50 | 1 | Ethylene | 0.302 | 36.2 | 42.4 | 47.7 | 1.13 |
| 9 | 1 | 0.001 | 1.25 | 75 | 1 | Ethylene | 0.453 | 27.2 | 32.9 | 37.7 | 1.15 |
| 10 | 2 | 0.005 | 1.25 | 25 | 2 | Ethylene | 0.340 | 2.04 | 5.64 | 6.02 | 1.07 |
| 11 | 2 | 0.005 | 1.25 | 50 | 2 | Ethylene | 0.435 | 2.61 | 6.95 | 7.44 | 1.07 |
| 12 | 2 | 0.005 | 1.25 | 75 | 2 | Ethylene | 0.448 | 2.69 | 7.72 | 8.44 | 1.09 |
| 13 | 3 | 0.005 | 1.25 | 25 | 5 | Ethylene | 0.186 | 0.45 | 3.99 | 4.26 | 1.07 |
| 14 | 3 | 0.005 | 1.25 | 50 | 5 | Ethylene | 0.315 | 0.76 | 5.82 | 6.14 | 1.06 |
| 15 | 3 | 0.005 | 1.25 | 75 | 5 | Ethylene | 0.215 | 0.52 | 6.14 | 7.00 | 1.14 |
| 16 | 4 | 0.005 | 1.25 | 25 | 30 | Ethylene | 0.149 | 0.06 | 2.38 | 2.89 | 1.22 |
| 17 | 5 | 0.002 | 1.25 | 25 | 5 | Ethylene | 0.184 | 1.10 | 6.08 | 8.33 | 1.37 |
| 18 | 6 | 0.0005 | 1.25 | 50 | 0.5 | Ethylene | 0.271 | 65.0 | 24.7 | 33.2 | 1.34 |
| 19 | 7 | 0.0005 | 1.25 | 25 | 1 | Ethylene | 0.133 | 16.0 | 19.9 | 24.0 | 1.21 |
| 20 | 7 | 0.0005 | 1.25 | 50 | 1 | Ethylene | 0.171 | 20.6 | 22.6 | 28.1 | 1.24 |
| 21 | 7 | 0.0005 | 1.25 | 75 | 1 | Ethylene | 0.170 | 20.4 | 18.2 | 24.0 | 1.31 |
| 22 | 8 | 0.005 | 1.25 | 50 | 15 | Ethylene | 0.079 | 0.063 | 2.00 | 2.28 | 1.14 |

Example 23

In a 500 ml glass autoclave thoroughly purged with nitrogen, 250 ml of toluene was placed, and propylene was fed to saturate the liquid phase and the gas phase. Thereafter, 2.50 mmol (in terms of aluminum atom) of methylaluminoxane and then 0.01 mmol of the titanium compound (1) were added to initiate polymerization. After the reaction was conducted at 25° C. for 30 minutes, a small amount of isobutanol was added to terminate the polymerization. After the polymerization was completed, the reaction product was introduced into methanol containing a small amount of hydrochloric acid to precipitate the whole polymer, followed by filtration over a glass filter. The resulting polymer was vacuum dried at 80° C. for 10 hours to obtain 0.4 mg of polypropylene (PP). The number-average molecular weight (Mn, in terms of PP) and the weight-average molecular weight (Mw, in terms of PP) of the resulting PP were 4,200 and 4,400, respectively, and Mw/Mn was 1.05.

Example 24

Polypropylene (PP) of 96 mg was obtained in the same manner as in Example 23, except that the polymerization

Example 26

Polypropylene (PP) of 376 mg was obtained in the same manner as in Example 23, except that the titanium compound (6) was used instead of the titanium compound (1) and the polymerization time was prolonged to 5 hours. The number-average molecular weight (Mn, in terms of PP) and the weight-average molecular weight (Mw, in terms of PP) of the resulting PP were 52,000 and 66,200, respectively, and Mw/Mn was 1.27.

Example 27

In a 1 liter stainless steel autoclave thoroughly purged with nitrogen, 380 ml of heptene was placed, and propylene was fed at 25° C. to saturate the liquid phase and the gas phase. Thereafter, 2.5 mmol (in terms of aluminum atom) of methylaluminoxane and 0.01 mmol of the titanium compound (1) were added, and polymerization was conducted for 3 hours at a propylene pressure of 5 kg/cm$^2$-G.

To the resulting polymer suspension, 1.5 liters of methanol containing a small amount of hydrochloric acid were added to precipitate a polymer. The polymer was filtered over a glass filter to remove the solvent, then washed with methanol and vacuum dried at 80° C. for 10 hours. Thus, 0.691 g of polypropylene was obtained. Mn (in terms of PP) as measured by GPC was 78,000, Mw/Mn was 1.15, and Tm was 134.8° C.

Example 28

Polymerization was conducted in the same manner as described above, except that the polymerization time was changed to 5 hours. Thus, 1.125 g of polypropylene was obtained. Mn (in terms of PP) as measured by GPC was 138,000, Mw/Mn was 1.11, and Tm was 130.5° C.

Example 29

In a 500 ml glass autoclave thoroughly purged with nitrogen, 250 ml of toluene was placed, and a mixed gas of ethylene and butene (ethylene: 40 l/hr, butene: 60 l/hr) was blown into the autoclave for 20 minutes. Thereafter, 1.25 mmol (in terms of aluminum atom) of methylaluminoxane and then 0.001 mmol of the titanium compound (1) were added to initiate polymerization. After the reaction was conducted at 25° C. for 5 minutes with blowing the mixed gas into the autoclave, a small amount of methanol was added to terminate the polymerization. After the polymerization was completed, the reaction product was introduced into methanol containing a small amount of hydrochloric acid dissolved therein to precipitate a polymer, followed by filtration over a glass filter. The resulting polymer was vacuum dried at 130° C. for 10 hours to obtain 0.056 g of an ethylene/butene copolymer. The polymerization activity was 0.67 kg based on 1 mmol of titanium. The number-average molecular weight (Mn) of the polymer was 49,100, the molecular weight distribution (Mw/Mn) was 1.14, and the butene content was 8.4% by mol.

Examples 30–33

Polymerization was conducted in the same manner as in Example 29, except that the feed rates of ethylene and butene, the polymerization time and the polymerization temperature were changed as shown in Table 2. The polymerization activity, molecular weight of the resulting polymer and molecular weight distribution are set forth in Table 2.

was passed through, followed by stirring for 60 minutes. Then, 20 ml of isobutyl alcohol was added to terminate the reaction. Subsequently, 10 ml of a 1N hydrochloric acid aqueous solution was added, followed by stirring for 30 minutes in a stream of nitrogen. The polymer solution was poured into 1.5 liters of methanol to precipitate a polymer, followed by stirring for one night by a magnetic stirrer. The polymer was filtered over a glass filter and dried at 80° C. for 10 hours under reduced pressure to obtain 1.79 g of an ethylene/1-butene copolymer. As a result of GPC analysis, the number-average molecular weight was 29,000, and Mw/Mn was 1.15 (in terms of polyethylene). As a result of IR analysis, the 1-butene content was 22.8% by mol.

Example 35

In a 500 ml glass autoclave thoroughly purged with nitrogen, 200 ml of dry toluene was placed, and 1-butene was passed through the autoclave for 40 minutes at a rate of 100 l/hr. Then, the polymerization temperature was maintained at 25° C., and 5.00 mmol (in terms of aluminum) of methylaluminoxane was added. Subsequently, 0.05 mmol of a catalyst was added, and a mixed gas of ethylene and 1-butene (ethylene: 40 l/hr, 1-butene: 60 l/hr) was passed through, followed by stirring for 30 minutes Then, 20 ml of isobutyl alcohol was added to terminate the reaction. Subsequently, 10 ml of a 1N hydrochloric acid aqueous solution was added, followed by stirring for 30 minutes in a stream of nitrogen. The polymer solution was poured into 1.5 liters of methanol to precipitate a polymer, followed by stirring for one night by a magnetic stirrer. The polymer was filtered over a glass filter and dried at 80° C. for 10 hours under reduced pressure to obtain 5.15 g of an ethylene/1-butene copolymer. As a result of GPC analysis, the number-average molecular weight was 73,000, and Mw/Mn was 1.16 (in terms of polyethylene). As a result of IR analysis, the 1-butene content was 14.5% by mol.

Example 36

In a 500 ml glass autoclave thoroughly purged with nitrogen, 200 ml of dry toluene was placed, and 1-butene was passed through the autoclave for 40 minutes at a rate of 10° C. l/hr. Then, the polymerization temperature was maintained at 25° C., and 5.00 mmol (in terms of aluminum) of

TABLE 2

| Ex. | Titanium compound | amount (mmol) | Time (min) | Ethylene/butene feed rate (L/h) | Yield (g) | Activity (kg/mmol-Ti · h) | Mn ($\times 10^4$) | Mw ($\times 10^4$) | Mw/Mn | Butene content (mol %) |
|---|---|---|---|---|---|---|---|---|---|---|
| 29 | 1 | 0.001 | 5 | 40/60 | 0.056 | 0.67 | 4.91 | 5.61 | 1.14 | 8.4 |
| 30 | 1 | 0.001 | 10 | 40/60 | 0.087 | 0.52 | 6.90 | 7.82 | 1.13 | 10.5 |
| 31 | 1 | 0.001 | 5 | 70/30 | 0.258 | 3.10 | 16.1 | 18.9 | 1.17 | 3.7 |
| 32 | 1 | 0.001 | 10 | 70/30 | 0.456 | 2.74 | 22.4 | 27.9 | 1.24 | 3.7 |
| 33 | 1 | 0.001 | 5 | 50/50 | 0.088 | 1.06 | 7.31 | 8.28 | 1.13 | 5.9 |

Example 34

In a 500 ml glass autoclave thoroughly purged with nitrogen, 200 ml of dry toluene was placed, and 1-butene was passed through the autoclave for 40 minutes at a rate of 100 l/hr. Then, the polymerization temperature was maintained at 25° C., and 5.00 mmol (in terms of aluminum) of methylaluminoxane was added. Subsequently, 0.05 mmol of the titanium compound (1) was added, and a mixed gas of ethylene and 1-butene (ethylene: 20 l/hr, 1-butene: 80 l/hr)

methylaluminoxane was added. Subsequently, 0.05 mmol of a catalyst was added, and a mixed gas of ethylene and 1-butene (ethylene: 60 l/hr, 1-butene: 40 l/hr) was passed through, followed by stirring for 10 minutes. Then, 20 ml of isobutyl alcohol was added to terminate the reaction. Subsequently, 10 ml of a 1N hydrochloric acid aqueous solution was added, followed by stirring for 30 minutes in a stream of nitrogen. The polymer solution was poured into 1.5 liters of methanol to precipitate a polymer, followed by stirring for one night by a magnetic stirrer. The polymer was filtered over a glass filter and dried at 80° C. for 10 hours under reduced pressure to obtain 2.38 g of an ethylene/1-butene copolymer. As a result of GPC analysis, the number-average molecular weight was 38,800, and Mw/Mn was 1.18 (in terms of polyethylene). As a result of IR analysis, the 1-butene content was 11.3% by mol.

Example 37

In a 500 ml glass autoclave thoroughly purged with nitrogen, 200 ml of toluene and 50 ml of 1-hexene were placed, and ethylene was fed to saturate the liquor phase and the gas phase with stirring. Thereafter, 1.25 mmol (in terms of aluminum atom) of methylaluminoxane and then 0.0025 mmol of the titanium compound (1) were added to initiate polymerization. After the reaction was conducted at 25° C. for 5 minutes with blowing ethylene into the autoclave, a small amount of methanol was added to terminate the polymerization. After the polymerization was completed, the reaction product was introduced into methanol containing a small amount of hydrochloric acid dissolved therein to precipitate a polymer, followed by filtration over a glass filter. The polymer was vacuum dried at 130° C. for 10 hours to obtain 0.304 g of an ethylene/hexene copolymer. The polymerization activity was 1.46 kg based on 1 mmol of titanium. The number-average molecular weight (Mn) of the resulting polymer was 95,600, Mw/Mn was 1.17, and the hexene content was 2.7% by mol.

Example 38

An ethylene/hexene copolymer of 0.241 g was obtained in the same manner as in Example 37, except that the amount of the titanium compound (1) was changed to 0.001 mmol, the amount of toluene was changed to 225 ml, and the amount of 1-hexene was changed to 25 ml. The polymerization activity was 2.89 kg based on 1 mmol of titanium. The number-average molecular weight (Mn) of the resulting polymer was 152,000, Mw/Mn was 1.22, and the hexene content was 1.7% by mol.

Example 39

In a 500 ml glass autoclave thoroughly purged with nitrogen, 250 ml of toluene was placed, and ethylene was fed to saturate the liquid phase and the gas phase temporarily. Then, only the gas phase was purged with nitrogen. Thereafter, 2.5 mmol (in terms of aluminum atom) of methylaluminoxane and then 0.01 mmol of the titanium compound (1) were added to initiate polymerization. After the reaction was conducted at 25° C. for 5 minutes, a small amount of methanol was added to terminate the polymerization. Then, hydrochloric acid and a large amount of methanol was added to precipitate a polymer. The polymer was filtered, washed with methanol and vacuum dried to obtain 0.800 g of polyethylene (PE). The number-average molecular weight (Mn, in terms of PP) of the resulting polyethylene was 115,000, and Mw/Mn was 1.10. Conversion from the polymer yield showed that ethylene in the system was quantitatively consumed.

Example 40

In Example 39, after the reaction was conducted at 25° C. for 5 minutes to completely consume ethylene, a propylene gas (30 l/hr) was blown into the system to perform reaction for 20 minutes. Then, feeding of propylene was stopped, followed by further reaction for 280 minutes. Then, a small amount of methanol was added to terminate the reaction, and the reaction product was introduced into 1 liter of methanol containing a small amount of hydrochloric acid to precipitate a polymer. The polymer was filtered, washed with methanol and vacuum dried at 130° C. for 10 hours to obtain 1.135 g of a polymer. The number-average molecular weight (Mn, in terms of PP) of the resulting polymer was 136,000, Mw/Mn was 1.15, and the propylene content was 14.6% by mol.

In comparison with the polyethylene prepolymer prepared in Example 39, this polymer was increased in the molecular weight with keeping a narrow molecular weight distribution, and propylene was incorporated into the polymer. From this, it can be seen that a polyethylene-polypropylene diblock copolymer was quantitatively produced.

Example 41

In Example 39, after the reaction of ethylene was conducted at 25° C. for 5 minutes, an ethylene gas (25 l/hr, and a propylene gas (75 l/hr) were blown into the system to perform reaction for 3 minutes. Then, feeding of the mixed gas was stopped, followed by further reaction for 3 minutes. Then, a small amount of methanol was added to terminate the reaction, and the reaction product was introduced into 1 liter of methanol containing a small amount of hydrochloric acid to precipitate a polymer. The polymer was filtered, washed with methanol and vacuum dried at 130° C. for 10 hours to obtain 1.700 g of a polymer. The number-average molecular weight (Mn, in terms of PP) of the resulting polymer was 211,000, the molecular weight distribution (Mw/Mn) was 1.16, and the propylene content was 6.4% by mol.

In comparison with the polyethylene prepolymer prepared in Example 39, this polymer was increased in the molecular weight with keeping a narrow molecular weight distribution, and propylene was incorporated into the polymer. From this, it can be seen that a polyethylene-ethylene/propylene diblock copolymer was quantitatively produced. The propylene content in the second block component (ethylene/propylene copolymer portion), as calculated from the molecular weight and the propylene content in the whole polymer, was 14.6% by mol.

Example 42

In Example 39, after the reaction of ethylene was conducted at 25° C. for 5 minutes, an ethylene gas (25 l/hr) and a propylene gas 175 l/hr) were blown into the system to perform reaction for 3 minutes. Then, feeding of the mixed gas was slopped, followed by further reaction for 3 minutes. Subsequently, propylene (30 l/hr) was blown into the system for 20 minutes to perform reaction. Then, feeding of propylene was stopped, followed by further reaction for 280 minutes. Then, a small amount of methanol was added to terminate the reaction, and the reaction product was introduced into 1 liter of methanol containing a small amount of hydrochloric acid to precipitate a polymer. The polymer was filtered, washed with methanol and vacuum dried at 130° C. for 10 hours to obtain 1.814 g of a polymer. The number-average molecular weight (Mn, in terms of PP) of the resulting polymer was 235,000, the molecular weight distribution (Mw/Mn) was 1.15, and the propylene content was 14.1% by mol.

In comparison with the polyethylene-ethylene/propylene diblock copolymer prepolymer prepared in Example 41, this polymer was increased in the molecular weight with keeping a narrow molecular weight distribution, and propylene was incorporated into the polymer. From this, it can be seen that a polyethylene-ethylene/propylene copolymer-polypropylene triblock copolymer was quantitatively produced. The increase of the propylene content agreed with the value calculated or the assumption that the third block component introduced in this example was polypropylene.

Example 43

In Example 39, after the reaction of ethylene was conducted at 25° C. for 5 minutes, an ethylene gas (25 l/hr) and a propylene gas (75 l/hr) were blown into the system to perform reaction for 3 minutes. Then, feeding of the mixed gas was stopped, followed by further reaction for 3 minutes. Subsequently, an ethylene gas (100 l/hr) was blown into the system to perform reaction for 1 minute. Then, a small amount of methanol was added to terminate the reaction, and the reaction product was introduced into 1 liter of methanol containing a small amount of hydrochloric acid, followed by stirring, to precipitate a polymer. The polymer was filtered, washed with methanol and vacuum dried at 130° C. for 10 hours to obtain 1.998 g of a polyethylene-ethylene/propylene copolymer-LLDPE block polymer. The number-average molecular weight (Mn, in terms of PP) of the resulting polymer was 272,000, Mw/Mn was 1.13, and the propylene content was 6.6% by mol.

In comparison with the polyethylene-ethylene/propylene diblock copolymer prepolymer prepared in Example 41, this polymer was increased in the molecular weight with keeping a narrow molecular weight distribution, and the ethylene content in the polymer was increased. From this, it can be seen that a polyethylene-ethylene/propylene copolymer-LLDPE triblock copolymer was quantitatively produced. The propylene content in the third block component (LLDPE portion), as calculated from the molecular weight and the propylene content in the whole polymer, was 7.3% by mol.

Example 44

Polymerization was conducted in the same manner as in Example 39, except that the catalytic amount was changed to 0.02 mmol. Thus, 0.800 g of polyethylene (PE) was obtained. The number-average molecular weight (Mn, in terms of PP) of the resulting polyethylene was 78,200, and the molecular weight distribution (Mw/Mn) was 1.14.

In this example, after the reaction of ethylene was conducted at 25° C. for 5 minutes, an ethylene gas (20 l/hr) and a butene gas (80 l/hr) were blown into the system to perform reaction for 3 minutes. Then, feeding of the mixed gas was stopped, followed by further reaction for 3 minutes. Then, a small amount of methanol was added to terminate the reaction, and the reaction product was introduced into 1 liter of methanol containing a small amount of hydrochloric acid, followed by stirring, to precipitate a polymer. The polymer was filtered, washed with methanol and vacuum dried at 130° C. for 10 hours to obtain 1.416 g of a polyethylene-ethylene/butene copolymer block polymer. The number-average molecular weight (Mn, in terms of PP) of the resulting polymer was 120,600, the molecular weight distribution (Mw/Mn) was 1.13, and the butene content in the whole polymer was 1.9% by mol.

In comparison with the polyethylene prepolymer prepared in Example 39, this polymer was increased in the molecular weight with keeping a narrow molecular weight distribution, and butene was incorporated into the polymer. From this, it can be seen that a polyethylene-ethylene/LLDPE diblock copolymer was quantitatively produced. The butene content in the second block component (LLDPE portion), as calculated from the molecular weight and the butene content in the whole polymer, was 5.6% by mol.

Example 45

In Example 39, after the reaction of ethylene was conducted at 2500 for 5 minutes, an ethylene gas (20 l/hr) and a butene gas (80 l/hr) were blown into the system to perform reaction for 3 minutes. Then, feeding of the mixed gas was stopped, followed by further reaction for 3 minutes. Subsequently, an ethylene gas (100 l/hr) was blown into the system to perform reaction for 1 minute. Then, a small amount of methanol was added to terminate the reaction, and the reaction product was introduced into 1 liter of methanol containing a small amount of hydrochloric acid, followed by stirring, to precipitate a polymer, The polymer was filtered, washed with methanol and vacuum dried at 130° C. for 10 hours to obtain 1.921 g of a polyethylene-LLDPE-HDPE block polymer. The number-average molecular weight (Mn, in terms of PP) of the resulting polymer was 141,400, the molecular weight distribution (Mw/Mn) was 1.14, and the butene content in the whole polymer was 2.0% by mol.

In comparison with the polyethylene-LLDPE diblock copolymer prepolymer prepared in Example 44, this polymer was increased in the molecular weight with keeping a narrow molecular weight distribution, and the ethylene content in the polymer was changed. From this, it can be seen that a polyethylene-LLDPE-HDPE triblock copolymer was quantitatively produced. The butene content in the third block component (HDPE portion), as calculated from the molecular weight and the butene content in the whole polymer, was 2.6% by mol.

Example 46

In a 500 ml glass autoclave thoroughly purged with nitrogen, 250 ml of toluene was placed, and propylene was fed at 25° C. to saturate the liquid phase and the gas phase. Thereafter, 2.5 mmol (in terms of aluminum atom) of methylaluminoxane and then 0.01 mmol of the titanium compound (1) were added to initiate polymerization. After the reaction was conducted at 25° C. for 180 minutes, a small amount of methanol was added to terminate the polymerization. Then, the reaction product was added to methanol containing a small amount of hydrochloric acid, followed by stirring, to precipitate a polymer. The polymer was filtered, washed with methanol and vacuum dried at 130° C. for 8 hours to obtain 0.100 g of polypropylene. The number-average molecular weight (Mn, in terms of PP) of the resulting polymer was 17,200, and Mw/Mn was 1.5.

Example 47

In Example 46, after the reaction of propylene was conducted for 180 minutes, an ethylene gas (20l/hr) was blown into the system to perform reaction for 3 minutes, and a small amount of methanol was added to terminate the reaction. Then, the reaction product was introduced into 1 liter of methanol containing a small amount of hydrochloric acid, followed by stirring, to precipitate a polymer. The polymer was filtered, washed with methanol and vacuum dried to obtain 0.481 g of a polypropylene-ethylene/propylene copolymer block polymer. The number-average molecular weight (Mn, in terms of PP) of the resulting polymer was 99,000, Mw/Mn was 1.06, and the ethylene content was 70.9% by mol.

In comparison with the polyethylene prepolymer prepared in Example 39, this polymer was increased in the molecular weight with keeping a narrow molecular weight distribution, and ethylene was incorporated into the polymer. From this, it can be seen that a polypropylene-ethylene/propylene diblock copolymer was quantitatively produced. The ethylene content in the second block component (ethylene/propylene copolymer portion), as calculated from the molecular weight and the propylene content in the whole polymer, was 18.4% by mol.

Example 48

In a 500 ml glass autoclave thoroughly purged with nitrogen, 250 ml of toluene was placed, and propylene was passed through the autoclave at a rate of 100 l/hr to saturate the system. Thereafter, 2.5 mmol (in terms of aluminum atom) of methylaluminoxane and then 0.02 mmol of the titanium compound (1) were added to initiate polymerization at room temperature (24° C.). After the polymerization was conducted for 5 hours, feeding of propylene was stopped, and feeding of ethylene at a rate of 1.5 l/hr was started. After the polymerization was conducted at room temperature for 40 minutes, a small amount of isobutanol was added to terminate the polymerization. The whole amount of the resulting polymer slurry was introduced into 1.5 liters of methanol, and a small amount of hydrochloric acid was added. Then, the mixture was filtered to collect a polymer. The polymer was washed with methanol and then vacuum dried at 80° C. for 10 hours. The yield of the polymer after drying was 2.53 g. As a result of GPC measurement, the number-average molecular weight of the polymer was 160,300, and Mw/Mn was 1.51.

Of the whole amount of the resulting polymer, 50 mg of the polymer was dissolved in 0.5 ml of a mixed solvent of orthodichlorobenzene/deutero benzene (mixing ratio: 8/1 by volume) at 110° C., and the following measurements were made in the proton decoupling mode under the following conditions using a JEOL LA500 type nuclear magnetic resonance device.

Pulse angle: 45°, Pulse repetition: 5.5 sec, Spectral width: 22000 Hz, Number of scans: 16000, Temperature: 120° C., Data points: 32 K As a result, $[M^1]$ was 59.7% by mol, $[M^2]$ was 40.3% by mol, $[M^1 \cdot M^2]$ was 43.4%. by mol, $[M^1 \cdot M^1]$ was 38.1% by mol, $[M^2 \cdot M^2]$ was 18.6% by mol, the value of $[M^1 \cdot M^2]/(2\times[M^1]\times[M^2])$ was 0.90, and the value of $[M^1 \cdot M^2]^2/(4\times[M^1 \cdot M^1]\times[M^2 \cdot M^2])$ was 0.66, with the proviso that the monomer unit $M^1$ is ethylene, and the monomer unit $M^2$ is propylene.

The distribution of n of continuous n methylenes is as follows.

[n=1]: 37.87% by mol

[n=2]: 14.59% by mol

[n=3]: 9.96% by mol

[n=4]: 6.94% by mol

[n=5]: 7.41% by mol

[n>6]: 23.23% by mol

Methylenes of n=3, n=5 and n≦26 mean that an isolated monomer unit $M^1$ is detected, two continuous monomer units $M^1$ are detected, and three or more continuous monomer units $M^1$ are detected, respectively.

Example 49

In a 500 ml glass autoclave thoroughly purged with nitrogen, 250 ml of dry toluene was placed, and propylene was passed through the autoclave for 20 minutes at a rate of 100 l/hr. Then, the polymerization temperature was maintained at 25° C., and 5.00 mmol (in terms of aluminum) of methylaluminoxane was added. Subsequently, 0.05 mmol of the titanium compound (1) was added, and a mixed gas of ethylene and propylene (ethylene: 35 l/hr, propylene: 65 l/hr) was passed through, followed by stirring for 3 minutes and 20 seconds. Then, 20 ml of isobutyl alcohol was added to terminate the reaction. Subsequently, 10 ml of a 1N hydrochloric acid aqueous solution was added, followed by stirring for 30 minutes in a stream of nitrogen. The polymer solution was poured into 1.5 liters of methanol to precipitate a polymer, followed by stirring for one night by a magnetic stirrer. The polymer was filtered over a glass filter and dried at 80° C. for 10 hours under reduced pressure to obtain 1.19 g of an ethylene/propylene copolymer. As a result of GPC analysis, Mn was 25,100, and Mw/Mn was 1.07. As a result of IR analysis, the propylene content was 24.4% by mol.

Example 50

In a 500 ml glass autoclave thoroughly purged with nitrogen, 250 ml of dry toluene was placed, and propylene was passed through the autoclave for 20 minutes at a rate of 100 l/hr. Then, the polymerization temperature was maintained at 25° C., and 5.00 mmol (in terms of aluminum) of methylaluminoxane was added. Subsequently, 0.05 mmol of the titanium compound (1) was added, and a mixed gas of ethylene and propylene (ethylene: 35 l/hr, propylene: 65 l/hr) was passed through, followed by stirring for 3 minutes and 20 seconds. Then, a mixed gas of ethylene and propylene having different composition (ethylene: 60 l/hr, propylene: 40 l/hr) was passed through, followed by stirring for 1 minute and 50 seconds. Thereafter, 20 ml of isobutyl alcohol was added to terminate the reaction. Subsequently, 10 ml of a 1N hydrochloric acid aqueous solution was added, followed by stirring for 30 minutes in a stream of nitrogen. The polymer solution was poured into 1.5 liters of methanol to precipitate a polymer, followed by stirring for one night by a magnetic stirrer. The polymer was filtered over a glass filter and dried at 80° C. for 10 hours under reduced pressure to obtain 2.29 g of an A-B diblock copolymer. As a result of GPC analysis, the number-average molecular weight was 40,600, and Mw/Mn was 1.09. As a result of IR analysis, the propylene content was 23.1% by mol.

Example 51

In a 500 ml glass autoclave thoroughly purged with nitrogen, 250 ml of dry toluene was placed, and propylene was passed through the autoclave for 20 minutes at a rate of 100 l/hr. Then, the polymerization temperature was maintained at 25° C., and 5.00 mmol (in terms of aluminum) of methylaluminoxane was added. Subsequently, 0.05 mmol of the titanium compound (1) was added, and a mixed gas of ethylene and propylene (ethylene: 35 l/hr, propylene: 65 l/hr) was passed through, followed by stirring for 3 minutes and 20 seconds. Then, a mixed gas of ethylene and propylene having different composition (ethylene: 60 l/hr, propylene: 40 l/hr) was passed through, followed by stirring for 1 minute and 30 seconds. Then, an ethylene gas was passed through at a rate of 100 l/hr, followed by stirring for 1 minute and 10 seconds. Thereafter, 20 ml of isobutyl alcohol was added to terminate the reaction. Subsequently, 10 ml of a 1N hydrochloric acid aqueous solution was added, followed by stirring for 30 minutes in a stream of nitrogen. The polymer solution was poured into 1.5 liters of methanol to precipitate a polymer, followed by stirring for one night by a magnetic stirrer. The polymer was filtered over a glass filter and dried at 80° C. for 10 hours under reduced pressure to obtain 3.79 g of an A-B-C triblock copolymer. As a result of GPC analysis, the number-average molecular weight was 59,000, and Mw/Mn was 1.11. As a result of IR analysis, the propylene content: was 19.5% by mol.

Example 52

In a 500 ml glass autoclave thoroughly purged with nitrogen, 250 ml of toluene was placed, and ethylene was fed to saturate the liquid phase and the gas phase. Thereafter, 1.25 mmol (in terms of aluminum atom) of methylaluminoxane and then 0.0002 mmol of the titanium compound (2) were added to initiate polymerization. After the reaction was conducted at 50° C. for 2 minutes in an ethylene gas atmosphere at ordinary pressure, a small amount of methanol was added to terminate the polymerization. After the polymerization was completed, to the reaction product were added a small amount of hydrochloric acid and a large amount of methanol to precipitate the whole polymer, followed-by filtration. The polymer was vacuum dried at 80° C. for 10 hours to obtain 0.213 g of polyethylene (PE). The polymerization activity was 3.20 kg based on 1 mmol of titanium. The number-average molecular weight (Mn) and the weight-average molecular weight (Mw) of the resulting PE were 73,300 and 79,900, respectively, and Mw/Mn was 1.08.

Example 53

In a 500 ml glass autoclave thoroughly purged with nitrogen, 250 ml of toluene was placed, and ethylene (100 l/hr) and hydrogen (5 l/hr) were blown into the autoclave for 10 minutes with stirring. Thereafter, 1.25 mmol (in terms of aluminum atom) of methylaluminoxane and then 0.0002 mmol of the titanium compound (2) were added to initiate polymerization. After the reaction was conducted at 50° C. for 2 minutes with blowing ethylene and hydrogen into the autoclave, a small amount of methanol was added to terminate the polymerization. After the polymerization was completed, to the reaction product were added a small amount of hydrochloric acid and a large amount of methanol to precipitate the whole polymer, followed by filtration. The polymer was vacuum dried at 80° C. for 10 hours to obtain 0.195 g of polyethylene (PE). The polymerization activity was 2.93 kg based on 1 mmol of titanium. The number-average molecular weight (Mn) and the weight-average molecular weight (Mw) of the resulting PE were 59,500 and 69,700, respectively, and Mw/Mn was 1.17.

Examples 54–58

Polymerization was conducted in the same manner as in Example 53, except that the catalytic amount, the feed rate of hydrogen and the polymerization time were changed as shown in Table 3. The polymerization activity, molecular weight of the resulting polymer and molecular weight distribution are set forth in Table 3. With increase of the amount of hydrogen, the molecular weight of the resulting polymer was decreased, and even when the polymerization time was prolonged, the molecular weight of the resulting polymer was hardly increased. From this, it can be seen that hydrogen functioned as a chain transfer agent. Even when the polymerization time was prolonged, the polymerization activity was not lowered. From this, it can be seen that polymerization was further promoted by the active species produced by the chain transfer reaction.

TABLE 3

| Example | Titanium Compound | amount (mmol) | Amount of MAO (mmol) | Temp (° C.) | Time (min.) | Monomer | $H_2$ (L/h) | yield (g) | Activity (kg/mmol-Ti · h) | Mn ($\times 10^4$) | Mw ($\times 10^4$) | Mw/Mn |
|---|---|---|---|---|---|---|---|---|---|---|---|---|
| 53 | 2 | 0.002 | 1.25 | 50 | 2 | Ethylene | None | 0.213 | 3.20 | 7.37 | 7.99 | 1.08 |
| 54 | 2 | 0.002 | 1.25 | 50 | 2 | Ethylene | 5 | 0.195 | 2.93 | 5.95 | 6.97 | 1.17 |
| 55 | 2 | 0.002 | 1.25 | 50 | 2 | Ethylene | 10 | 0.180 | 2.70 | 4.28 | 5.59 | 1.31 |
| 56 | 2 | 0.002 | 1.25 | 50 | 2 | Ethylene | 20 | 0.170 | 2.55 | 2.82 | 4.27 | 1.52 |
| 57 | 2 | 0.001 | 1.25 | 50 | 5 | Ethylene | 20 | 0.203 | 2.44 | 3.55 | 5.78 | 1.63 |
| 58 | 2 | 0.001 | 1.25 | 50 | 15 | Ethylene | 20 | 0.612 | 2.45 | 3.93 | 6.69 | 1.70 |

Example 59

In a 500 ml glass autoclave thoroughly purged with nitrogen, 250 ml of toluene was placed, and ethylene was fed to saturate the liquid phase and the gas phase. Thereafter, 1.25 mmol (in terms of aluminum atom) of methylaluminoxane, 0.08 mmol of diethylzinc and then 0.002 mmol of the titanium compound (2) were added to initiate polymerization. After the reaction was conducted at 50° C. for 2 minutes in an ethylene gas atmosphere at ordinary pressure, a small amount of methanol was added to terminate the polymerization. After the polymerization was completed, to the reaction product were added a small amount of hydrochloric acid and a large amount of methanol to precipitate the whole polymer, followed by filtration. The polymer was vacuum dried at 80° C. for 10 hours to obtain 0.209 g of polyethylene (PE). The polymerization activity was 3.14 kg based on 1 mmol of titanium. The number-average molecular weight (Mn) and the weigh-average molecular weight (Mw) of the resulting PE were 51,500 and 70,300, respectively, and Mw/Mn was 1.37.

Examples 60–62

Polymerization was conducted in the same manner as in Example 59, except that the amount of diethylzinc and the polymerization time were changed as shown in Table 4. The polymerization activity, molecular weight of the resulting polymer and molecular weight distribution are set forth in Table 4.

With increase of the amount of the zinc compound, the molecular weight of the resulting polymer was decreased, and even when the polymerization time was prolonged, the molecular weight of the resulting polymer was hardly increased. From this, it can be seen that the zinc compound functioned as a chain transfer agent. Even when the polymerization time was prolonged, the polymerization activity was not lowered. From this, it can be seen that polymerization was further promoted by the active species produced by the chain transfer reaction.

TABLE 4

| Example | Titanium Compound | amount (mmol) | Amount of MAO (mmol) | Temp (° C.) | Time (min.) | Monomer | $Et_2Zn$ (mmol) | yield (g) | Activity (kg/mmol-M · h) | Mn ($\times 10^4$) | Mw ($\times 10^4$) | Mw/Mn |
|---|---|---|---|---|---|---|---|---|---|---|---|---|
| 59 | (2) | 0.002 | 1.25 | 50 | 2 | Ethylene | 0.08 | 0.209 | 3.14 | 5.15 | 7.03 | 1.37 |
| 60 | (2) | 0.002 | 1.25 | 50 | 2 | Ethylene | 0.16 | 0.209 | 3.14 | 4.18 | 6.06 | 1.45 |
| 61 | (2) | 0.002 | 1.25 | 50 | 5 | Ethylene | 0.16 | 0.511 | 3.07 | 8.17 | 12.6 | 1.54 |
| 62 | (2) | 0.002 | 1.25 | 50 | 15 | Ethylene | 0.16 | 1.324 | 2.65 | 11.2 | 19.0 | 1.69 |

Example 63

In a 500 ml glass autoclave thoroughly purged with nitrogen, 250 ml of toluene was placed, and ethylene was fed to saturate the liquid phase and the gas phase. Thereafter, 1.25 mmol (in terms of aluminum atom) of methylaluminoxane and then 0.002 mmol of the titanium compound (3) were added to initiate polymerization. After the reaction was conducted at 50° C. for 10 minutes in an ethylene gas atmosphere at ordinary pressure, a small amount of methanol was added to terminate the polymerization. After the polymerization was completed, to the reaction product were added a small amount of hydrochloric acid and a large amount of methanol to precipitate a polymer. The polymer was filtered, washed with methanol and vacuum dried at 80° C. for 10 hours to obtain 0.247 g of polyethylene (PE). The polymerization activity was 0.74 kg based on 1 mmol of titanium. The number-average molecular weight (Mn) and the weight-average molecular weight (Mw) of the resulting PE were 88,500 and 98,800, respectively, and Mw/Mn was 1.12.

Example 64

Polymerization was conducted in the same manner as in Example 63, except that the amount of the titanium compound (3) was changed to 0.001 mmol and the polymerization time was changed to 15 minutes. Thus, 0.161 g of polyethylene (PE) was obtained. The polymerization activity was 0.64 kg based on 1 mmol of titanium. The number-average molecular weight (Mn) and the weight-average molecular weight (Mw) of the resulting PE were 145,000 and 167,000, respectively, and Mw/Mn was 1.15.

Comparative Example 1

In a 500 ml glass autoclave thoroughly purged with nitrogen, 250 ml of toluene was placed, and ethylene was fed to saturate the liquid phase and the gas phase. Thereafter, 1.25 mmol (in terms of aluminum atom) of methylaluminoxane and then 0.0005 mmol of zirconocene dichloride were added to initiate polymerization. After the reaction was conducted at 25° C. for 0.5 minute in an ethylene gas atmosphere at ordinary pressure, a small amount of methanol was added to terminate the polymerization. After the polymerization was completed, to the reaction product were added a small amount of hydrochloric acid and a large amount of methanol to precipitate the whole polymer, followed by filtration over a glass filter. The polymer was vacuum dried at 80° C. for 10 hours to obtain 0.229 g of polyethylene (PE). The polymerization activity was 55.0 kg based on 1 mmol of zirconium. The number-average molecular weight (Mn) of the resulting PE was 114,000, and Mw/Mn was 1.99.

Comparative Example 2

Polymerization was conducted in the same manner as in Comparative Example 1, except that the polymerization time was changed to 1 minute. Thus, 0.433 g of polyethylene (PE) was obtained. The polymerization activity was 52.0 kg based on 1 mmol of zirconium. The number-average molecular weight (Mn) of the resulting PE was 136,000, and Mw/Mn was 2.26.

Comparative Example 3

Polymerization was conducted in the same manner as in Comparative Example 1, except that 0.00025 mmol of the titanium compound (9) was used instead of the zirconium compound and the polymerization time was changed to 1 minute. Thus, 0.253 g of polyethylene (PE) was obtained. The polymerization activity was 60.7 kg based on 1 mmol of titanium. The number-average molecular weight (Mn) and the weight-average molecular weight (Mw) of the resulting PE were 184,000 and 370,000, respectively, and Mw/Mn was 2.01.

Comparative Example 4

Polymerization was conducted in the same manner as in Comparative Example 1, except that 0.0005 mmol of the titanium compound (10) was used instead of the zirconium compound and the polymerization time was changed to 1 minute. Thus, 0.267 g of polyethylene (PE) was obtained. The polymerization activity was 32.0 kg based on 1 mmol of titanium. The number-average molecular weight (Mn) and the weight-average molecular weight (Mw) of the resulting PE were 129,000 and 229,000, respectively, and Mw/Mn was 1.78.

Comparative Example 5

In a 100 ml reactor thoroughly purged with nitrogen, 50 ml of toluene was placed. The system was cooled to 0° C., and ethylene was fed to saturate the liquid phase and the gas phase. Thereafter, 0.0125 mmol of dimethylaniliniumtetrakis(pentafluorophenyl)borate and then 0.0125 mmol of the hafnium compound (11) were added to initiate polymerization. After the reaction was conducted at 0° C. for 1 minute in an ethylene atmosphere at ordinary pressure, a small amount of methanol was added to terminate the polymerization. The reaction product was introduced into a large amount of methanol to precipitate a polymer. The polymer was filtered, then washed with methanol and vacuum dried at 80° C. for 10 hours to obtain 0.290 g of polyethylene (PE). The number-average molecular weight (Mn) of the resulting PE was 132,400, and Mw/Mn was 1.85.

Comparative Example 6

Polymerization was conducted in the same manner as in Comparative Example 5, except that the amount of the hafnium compound (11) and the amount of the dimethylaniliniumtetrakis(pentafluorophenyl)borate were each changed to 0.005 mmol and the polymerization temperature was changed to 50° C. Thus, 0.148 g of polyethylene (PE) was obtained. The number-average molecular weight (Mn) of the resulting PE was 98,800, and Mw/Mn was 1.91.

Calculation Examples of Complex Structure Parameters (1)

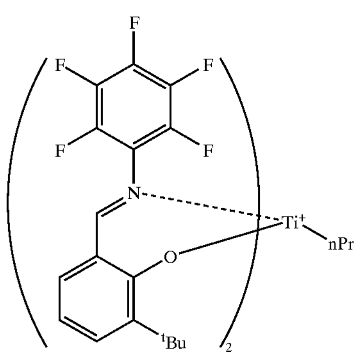

(4)

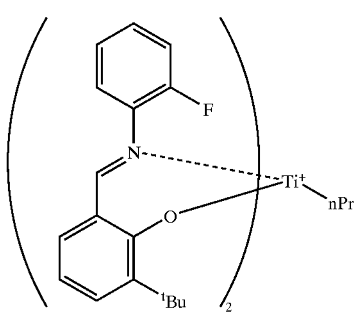

(5)

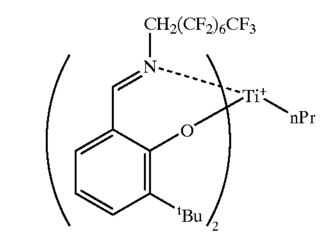

(8)

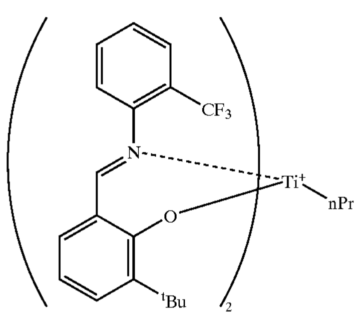

(9)

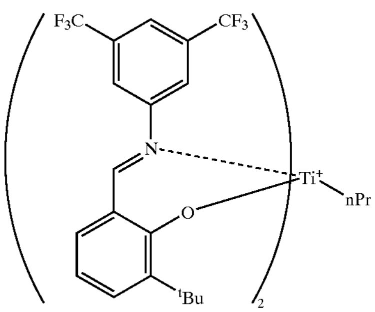

(10)

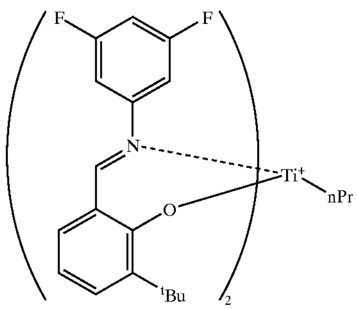

$H^{\beta}Z$ Distance ($r(H^{\beta}$-Z)) and electrostatic interaction energy ($ES_p(H^{\beta}$-Z) of each catalyst

| Compound | (1) | (4) | (5) | (8) | (9) | (10) |
|---|---|---|---|---|---|---|
| $r(H^{\beta}$-Z) (Å) | 2.275 | 2.329 | 2.234 | 2.498 | 2.246 | 4.812 |
| $ES_p(H^{\beta}$-Z) (KJ/mol) | −37.1 | −41.1 | −42.9 | −33.1 | −12.0 | −10.2 |

What is claimed is:

1. An olefin polymer having the ratio of number average molecular weight and weight average molecular weight (Mw/Mn) of not more than 1.5, selected from the group consisting of:

polypropylene having number average molecular weight of not less than 500, melting point of not lower than 70° C. and a racemic diad (R), as measured by $^{13}$C-NMR, of not less than 0.85, polybutene having number average molecular weight of not less than 500, melting point of not lower than 70° C. and a racemic diad (R), as measured by $^{13}$C-NMR, of not less than 0.85, a copolymer of propylene, and at least one olefin selected from the group consisting of olefins of 4 to 20 carbon atoms, dienes and cycloolefins having number average molecular weight of not less than 500.

2. A molded product comprising the olefin polymer of claim 1.

3. A process for preparing an olefin polymer, comprising polymerizing propylene or butene or copolymerizing propylene and at least one olefin selected from the group consisting of olefins of 4 to 20 carbon atoms, dienes, and cycloolefins in the presence of an olefin polymerization catalyst comprising a transition metal compound which is represented by the following formula (II-a) or (II-b) and has the following properties: (i) in a β-agostic structure of a cationic complex wherein one of X in the formula (II-a) or (II-b) as replaced with a n-propyl group, said structure being measured by a density functional method, the distance between the heteroatom, which has no direct bond to the central metal M and is nearest to the central metal M and is selected from the group consisting of halogen, nitrogen, oxygen, phosphorus, sulfur and selenium, and hydrogen at the β-position is not more than 3.0 Å; and (ii) the electrostatic energy is not more than 10 KJ/mol;

(II-a)

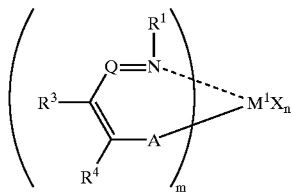

wherein $M^1$ is titanium atom, m is an integer of 1 to 5 and the sum of M and n is a number satisfying a valence of $M^1$, Q is a nitrogen atom or a carbon atom having a substituent $R^2$, A is an oxygen atom, a sulfur atom, a selenium atom or a nitrogen atom having a substituent $R^5$, $R^1$ is a hydrocarbon group having one or more fluorine atoms or a hydrocarbon group having one or more fluorine-containing groups, $R^2$ to $R^5$ may be the same or different and are each a hydrogen atom, a halogen atom, a hydrocarbon group, a hydrocarbon-substituted silyl group, an oxygen-containing group, a nitrogen-containing group, a sulfur-containing group, a boron-containing group, an aluminum-containing group, a phosphorus-containing group, a halogen containing group, a heterocyclic compound residue, a silicon-containing group, a germanium-containing group or a tin-containing group, two or more of $R^2$ to $R^5$ may be bonded to form a ring, and when m is 2 or greater, $R^1$s, $R^2$s, $R^3$s, $R^4$s and $R^5$s may be the same or different, and one group of $R^2$ to $R^5$ contained in one ligand and one group of $R^2$ to $R^5$ contained in other ligands may be bonded, and X is an oxygen atom, a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or greater, plural groups indicated by X may be the same or different, and plural groups indicated by X may be bonded to form a ring;

(II-b)

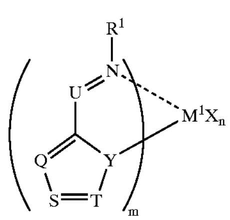

wherein $M^1$ is titanium atom, m is an integer of 1 to 5 and the sum of M and n is a number satisfying a valence of $M^1$, Y is a nitrogen atom or a phosphorus atom, U is a carbon atom having a substituent $R^6$, a nitrogen atom or a phosphorus atom, Q is a carbon atom having a substituent $R^7$, a nitrogen atom or a phosphorus atom, S is a carbon atom having a substituent $R^8$, a nitrogen atom or a phosphorus atom, T is a carbon atom having a substituent $R^9$, a nitrogen atom or a phosphorus atom, $R^1$ is a hydrocarbon group having one or more fluorine atoms or a hydrocarbon group having one or more fluorine-containing groups, $R^6$ to $R^9$ may be the same or different and are each a hydrogen atom, a halogen atom, a hydrocarbon group, a hydrocarbon-substituted silyl group, an oxygen-containing group, a nitrogen-containing group, a sulfur-containing group, a boron-containing group, an aluminum-containing group, a phosphorus-containing group, a halogen containing group, a heterocyclic compound residue, a silicon-containing group, a germanium-containing group or a tin-containing group, two or more of $R^6$ to $R^9$ may be bonded to form a ring, and when m is 2 or greater, $R^1$s, $R^6$s, $R^7$s, $R^8$s and $R^9$s may be the same or different, and one group of $R^6$ to $R^9$ contained in one ligand and one group of $R^6$ to $R^9$ contained in other ligands may be bonded, and X is an oxygen atom, a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or greater, plural groups indicated by X may be the same or different, and plural groups indicated by X may be bonded to form a ring.

4. A process for preparing an olefin polymer, comprising polymerizing propylene or butene or copolymerizing propylene and at least one olefin selected from the group consisting of olefins of 4 to 20 carbon atoms, dienes and cycloolefins in the presence of an olefin polymerization catalyst comprising a transition metal compound which is represented by formula (II-a) or (II-b) in claim 3, wherein $R^1$ is an aromatic hydrocarbon group, an aliphatic hydrocarbon group or an alicyclic hydrocarbon group, wherein said aromatic hydrocarbon group is a phenyl group having, at least one position of the 2-position and the 6-position, when the position of the carbon atom bonded to nitrogen is the 1-position, one or more substituents selected from a fluorine atom and a fluorine-containing group, or a phenyl group having, at least one position of the 3-position, the 4-position and the 5-position, at least one substituent selected from a fluorine-containing group having one carbon atom and not more than two fluorine atoms and a fluorine-containing group having two or more carbon atoms, an aromatic hydrocarbon group other than a phenyl group having at least one substituent selected from a fluorine atom and a fluorine-containing group, an aliphatic hydrocarbon group having at least one substituent selected from a fluorine atom and a fluorine-containing group, or an alicyclic hydrocarbon group having at least one substituent selected from a fluorine atom and a fluorine-containing group.

5. A process for preparing an olefin polymer, comprising polymerizing propylene or butene or copolymerizing propylene and at least one olefin selected from the group consisting of olefins of 4 of 20 carbon atoms, dienes and cycloolefins in the presence of an olefin polymerization catalyst comprising a transition metal compound which is represented by the following formula (III);

(III)

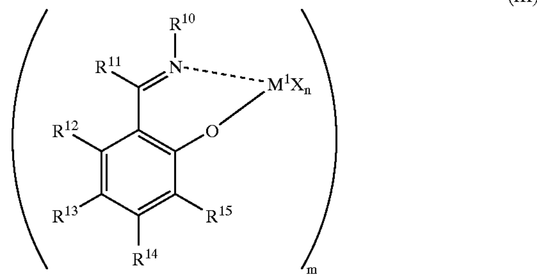

wherein $M^1$ is titanium atom, m is 1 or 2 and the sum of m and n is a number satisfying a valence of $M^1$, $R^{10}$ is an aromatic hydrocarbon group, an aliphatic hydrocarbon group or an alicyclic hydrocarbon group, when $R^{10}$ is a phenyl group and the position of the carbon atom bonded to nitrogen is the 1-position, the phenyl group has, at least one position of the 2-position and the 6-position, one or more substituents selected from a fluorine and a fluorine-containing group, or has, at least one position of the 3-position, the 4-position and the 5-position, at least one substituent selected from a fluorine-containing group having one carbon atom and not more that two fluorine atoms and a fluorine-containing group having two or more carbon atoms, and when $R^{10}$ is an aromatic hydrocarbon group other than a phenyl group, an aliphatic hydrocarbon group or an alicyclic group, the group has at least one substituent selected from a fluorine and a fluorine-containing, group, $R^{11}$ to $R^{14}$ may be the same or different and are each a hydrogen atom, a halogen atom, a halogen-containing group, a hydrocarbon group, a hydrocarbon-substituted silyl group, an oxygen-containing group, a nitrogen-containing group or a sulfur-containing group, $R^{15}$ is a halogen atom, a halogen-containing group, a hydrocarbon group or a hydrocarbon-substituted silyl group, and X is an oxygen atom, a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or greater, plural groups indicated by X may be the same or different, and plural groups indicated by X may be bonded to form a ring.

6. The process of claims 3, 4 and 5, wherein the hydrocarbon group is selected from the group consisting of alkyl, $C_{3-30}$ cycloalkyl, alkenyl, arylalkyl, aryl and $C_{1-20}$ halogenated hydrocarbons wherein at least one hydrogen is replaced with a halogen.

7. The process of claims 3 and 5, wherein the oxygen containing group is selected from the group consisting of hydroxy, alkoxy, aryloxy, arylalkoxy, acetoxy and carbonyl group.

8. The process of claims 3 and 5, wherein the nitrogen containing group is selected from the group consisting of amino, alkylamino, arylamino and alkylarylamino.

9. The process of claims 3 and 5, wherein the sulfur containing group is selected from the group consisting of sulfonato groups, sulfinato groups, alkylthio groups and arylthio groups.

10. The process of claims 3 and 5, wherein the boron containing group is $BR_4$ wherein R is hydrogen, halogen, an alkyl group or an optionally substituted aryl group.

11. The process of claims 3 and 5, wherein the aluminum containing group is $AlR_4$ wherein R is hydrogen, halogen, an alkyl group or an optionally substituted aryl group.

12. The process of claims 3 and 5, wherein the phosphorus containing group is selected from the group consisting of trialkylphosphine, triarylphosphine, phosphite, phosphonic acid and phosphinic acid.

13. The process of claims 3, 4 and 5, wherein the halogen containing group is selected from the group consisting of fluorine containing groups, chlorine containing groups and iodine containing groups.

14. The process of claims 3 and 5, wherein the heterocyclic compound residue is selected from the group consisting of optionally substituted residues of nitrogen containing groups, optionally substituted residues of oxygen containing groups and optionally substituted residues of sulfur containing groups, wherein the substituent is an $C_{1-30}$ alkyl group or alkoxy group.

15. The process of claims 3 and 5, wherein the silicon containing group is selected from the group consisting of hydrocarbon-substituted silyl groups, hydrocarbon-substituted silyl ether groups, silicon-substituted alkyl groups and silicon-substituted aryl groups.

16. The process of claims 3 and 5, wherein the germanium containing group is selected from the group consisting of hydrocarbon-substituted germanium groups, hydrocarbon-substituted germanium ether groups, germanium-substituted alkyl groups and germanium-substituted aryl groups.

17. The process of claims 3 and 5, wherein the tin containing group is selected from the group consisting of hydrocarbon-substituted tin groups, hydrocarbon-substituted tin ether groups, tin-substituted alkyl groups and tin-substituted aryl groups.

* * * * *